United States Patent
Oh et al.

(10) Patent No.: US 9,398,341 B2
(45) Date of Patent: *Jul. 19, 2016

(54) APPARATUS AND METHOD FOR PROCESSING AN INTERACTIVE SERVICE

(71) Applicant: LG ELECTRONICS INC., Seoul (KR)

(72) Inventors: Sejin Oh, Seoul (KR); Jinpil Kim, Seoul (KR); Seungjoo An, Seoul (KR); Jinwon Lee, Seoul (KR); Kyungho Kim, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,447

(22) Filed: Feb. 25, 2015

(65) Prior Publication Data

US 2015/0172782 A1    Jun. 18, 2015

Related U.S. Application Data

(63) Continuation of application No. 14/025,227, filed on Sep. 12, 2013.

(60) Provisional application No. 61/700,310, filed on Sep. 12, 2012, provisional application No. 61/703,749, filed on Sep. 20, 2012.

(51) Int. Cl.
*H04N 7/10* (2006.01)
*H04N 7/025* (2006.01)
(Continued)

(52) U.S. Cl.
CPC ............ *H04N 21/478* (2013.01); *H04N 21/235* (2013.01); *H04N 21/23892* (2013.01);
(Continued)

(58) Field of Classification Search
CPC ............ H04N 21/812; H04N 21/8126; H04N 21/8133; H04N 21/814; H04N 21/8545; H04N 21/8547; H04N 21/858; H04N 21/8583; H04N 21/8586; H04N 21/4784; H04N 21/4884; H04N 21/4331; H04N 21/4722; H04N 21/4725; H04N 21/47214
USPC .............................. 725/23–24, 32–36, 60–61
See application file for complete search history.

(56) References Cited

U.S. PATENT DOCUMENTS

2002/0056129 A1    5/2002  Blackketter et al.
2002/0162118 A1*  10/2002  Levy et al. ................. 725/110
(Continued)

FOREIGN PATENT DOCUMENTS

CA    2838788 A1    1/2013
JP    201256712 A    8/2012
(Continued)

*Primary Examiner* — Yassin Alata
(74) *Attorney, Agent, or Firm* — Dentons US LLP

(57) ABSTRACT

A method of processing an interactive service and an apparatus thereof are disclosed. The present invention includes receiving uncompressed audio content or uncompressed video content from an external decoding unit, extracting identifiers of frames from the received content periodically, submitting requests containing the identifiers and receiving a trigger for the content when a new segment is detected or when an event activation needs to be communicated to the receiver, wherein the trigger indicates the current time of the contents and references a particular interactive event in an application parameter table or signals that the event is to be executed now or at a specified future time, wherein the application parameter table includes information about at least one of applications.

20 Claims, 30 Drawing Sheets

(51) Int. Cl.

| | |
|---|---|
| *H04N 21/478* | (2011.01) |
| *H04N 21/43* | (2011.01) |
| *H04N 21/845* | (2011.01) |
| *H04N 21/8547* | (2011.01) |
| *H04N 21/434* | (2011.01) |
| *H04N 21/81* | (2011.01) |
| *H04N 21/235* | (2011.01) |
| *H04N 21/2389* | (2011.01) |
| *H04N 21/435* | (2011.01) |
| *H04N 21/44* | (2011.01) |
| *H04N 21/462* | (2011.01) |
| *H04N 21/8358* | (2011.01) |
| *H04N 21/858* | (2011.01) |

(52) U.S. Cl.
CPC ......... *H04N21/435* (2013.01); *H04N 21/4307* (2013.01); *H04N 21/4348* (2013.01); *H04N 21/44008* (2013.01); *H04N 21/4622* (2013.01); *H04N 21/8126* (2013.01); *H04N 21/8358* (2013.01); *H04N 21/8455* (2013.01); *H04N 21/8456* (2013.01); *H04N 21/8547* (2013.01); *H04N 21/8586* (2013.01)

(56) References Cited

U.S. PATENT DOCUMENTS

| | | |
|---|---|---|
| 2003/0192060 A1 | 10/2003 | Levy |
| 2005/0210526 A1 | 9/2005 | Levy et al. |
| 2007/0074079 A1 | 3/2007 | Forster et al. |
| 2007/0162399 A1 | 7/2007 | Medvinsky et al. |
| 2010/0058423 A1 | 3/2010 | Yaussy et al. |
| 2011/0154404 A1 | 6/2011 | Piepenbrink et al. |
| 2012/0047531 A1 | 2/2012 | Eyer |
| 2013/0024897 A1 | 1/2013 | Eyer |
| 2014/0040968 A1* | 2/2014 | Kitazato et al. ............... 725/115 |

FOREIGN PATENT DOCUMENTS

| | | |
|---|---|---|
| WO | 2012/070903 A2 | 5/2012 |
| WO | 2012/091322 A1 | 7/2012 |

* cited by examiner

FIG. 1

| Segment of Show A | Ad 1 | Ad 2 | Segment of Show B | Ad 3 | Ad 4 | Segment of Show B | Ad 5 |
|---|---|---|---|---|---|---|---|

FIG. 4

```
Trigger      = locator_part [ "?" terms ]

locator_part = hostname "/" path_segments hostname     = *( domainlabel "." ) toplabel
domainlabel  = alphanum | alphanum *( alphanum | "-" ) alphanum
toplabel     = alpha | alpha *( alphanum | "-" ) alphanum path_segments = segment *( "/" segment )
segment       = 1*alphanum terms       = ( event_time | media_time ) [ "&" spread ] [ "&" others ]
event_time  = "e=" 1*digit [ "&t=" 1*7hexdigit ]
media_time  = "m=" 1*7hexdigit
others      = other [ "&" other ]
other       = resv_cmd "=" 1*alphanum
spread      = "s=" 1*digit
resv_cmd    = <any alphanum except "e", "E", "m", "M", "s", "S", "t", or "T"> alphanum = alpha | digit
alpha    = lowalpha | upalpha lowalpha = "a" | "b" | "c" | "d" | "e" | "f" | "g" | "h" | "i" |
           "j" | "k" | "l" | "m" | "n" | "o" | "p" | "q" | "r" |
           "s" | "t" | "u" | "v" | "w" | "x" | "y" | "z"
upalpha  = "A" | "B" | "C" | "D" | "E" | "F" | "G" | "H" | "I" |
           "J" | "K" | "L" | "M" | "N" | "O" | "P" | "Q" | "R" |
           "S" | "T" | "U" | "V" | "W" | "X" | "Y" | "Z"
digit    = "0" | "1" | "2" | "3" | "4" | "5" | "6" | "7" |
           "8" | "9"
hexdigit = "0" | "1" | "2" | "3" | "4" | "5" | "6" | "7" |
           "8" | "9" | "a" | "b" | "c" | "d" | "e" | "f"
```

FIG. 5

Table 8.1 TDO Parameters Table Structure

| Element/Attribute (with @) | No. allowed | Data Type | Description & Value |
|---|---|---|---|
| TPT | | | |
| @majorProtocolVersion | 1 | Integer, range 0..15 | Major Protocol Version |
| @minorProtocolVersion | 0..1 | integer, range e 0..15 | Minor Protocol version |
| @id | 1 | anyURI | segment_id = domain_name/program_id |
| @tptVersion | 1 | unsignedByte | Data version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
| @URL | 1 | anyURI | URL of server for live triggers |
| @pollPeriod | 0..1 | unsignedByte | Short polling period in seconds |
| TDO | 1..N | | TDO (app) for the segment associated with this TPT |
| @appID | 1 | unsignedShort | Application ID of this app, unique within the scope of this TPT |
| @appType | 0..1 | integer, range 0-15 | Application type (default: 1="TDO") |
| @appName | 0..1 | string | Display name (for viewer launch consent) |
| @globalID | 0..1 | anyURI | Globally unique app ID |
| @appVersion | 0..1 | unsignedByte | Version of this app |
| @cookieSpace | 0..1 | unsignedByte | Persistent storage needed; default=0 |
| @frequencyOfUse | 0..1 | integer, range 0..15 | code values per Table 8.2 |
| @expireDate | 0..1 | dateTime | Expire date for caching this app |

FIG. 6

| | | | | |
|---|---|---|---|---|
| @testTDO | | 0..1 | boolean | Flag for test app; default="false" |
| @availInternet | | 0..1 | boolean | Default="true" |
| @availBroadcast | | 0..1 | boolean | Default="true" |
| URL | | 1..N | anyURI | App URL(s) |
| | @entry | 0..1 | boolean | Indicator of entry point; default = "false" |
| Capabilities | | 0..1 | nrt:CapabilitiesType | Essential capabilities to present this app |
| ContentItem | | 0..N | | Content item used by this app |
| | URL | 1..N | anyURI | URL(s) of content item |
| | @entry | 0..1 | boolean | Indicator of entry point ; default = "false" |
| | @updatesAvail | 0..1 | boolean | Default="false" |
| | @pollPeriod | 0..1 | unsignedByte | Short polling period in seconds |
| | @size | 0..1 | 24-bit integer | Size of content item, in kilobytes |
| | @availInternet | 0..1 | boolean | Default="true" |
| | @availBroadcast | 0..1 | boolean | Default="true" |
| Event | | 1..N | | Event targeted to this TDO |
| | @eventID | 1 | unsignedShort | Unique identifier of this Event element within the scope of the TDO element. |
| | @action | 1 | string | Allowed values are "prep", "exec", "susp", and "kill" |
| | @destination | 0..1 | unsignedByte | Device to which the event is directed (primary screen, second screen, or both) |
| | @diffusion | 0..1 | unsignedByte | Period for applying diffusion, in seconds |
| | Data | 0..N | base64Binary | Data to be used for this event |
| | @dataID | 1 | unsignedShort | Unique identifier of this Data element within the scope of the Event element. |

FIG. 7

Table 8.2 Meaning of Frequency of Use attribute values

| "frequencyOfUse" value | Meaning |
|---|---|
| 0 | One - time use only |
| 1 | Hourly |
| 2 | Daily |
| 3 | Weekly |
| 4 | Monthly |
| 5-15 | Reserved |

FIG. 8

Table 8.3 Meaning of "destination" attribute values

| "destination" value | Meaning |
|---|---|
| 0 | reserved |
| 1 | primary device only |
| 2 | one or more secondary devices only |
| 3 | Primary device and/or one or more secondary devices |

FIG. 9

| Syntax | No. Bits | Format |
|---|---|---|
| binary_tdo_parameters_table { | | |
|     reserved | 2 | '11' |
|     expire_date_included | 1 | bslbf |
|     segment_id_length | 5 | uimsbf |
|     segment_id | var | bslbf |
|     base_URL_length | 8 | uimsbf |
|     base_URL | var | bslbf |
|     If (expire_date_included=='1') { | | |
|         expire_date | 32 | usmsbf |
|     } | | |
|     trigger_server_URL_length | 8 | uimsbf |
|     trigger_server_URL | var | bslbf |
|     If (trigger_server_URL_length != 0) { | | |
|         reserved | 7 | '1111' |
|         trigger_delivery_type | 1 | uimsbf |
|         if (trigger_delivery_type == 0) { | | |
|             poll_period | 8 | uimsbf |
|         } | | |
|     } | | |
|     num_apps_in_table | 8 | uimsbf |
|     for (k=0; k< num_apps_in_table; k++) { | | |
|         app_id | 16 | uimsbf |
|         app_type_included | 1 | bslbf |
|         app_name_included | 1 | bslbf |

FIG. 10

| | | |
|---|---|---|
| global_id_included | 1 | bslbf |
| app_version_included | 1 | bslbf |
| cookie_space_included | 1 | bslbf |
| frequency_of_use_included | 1 | bslbf |
| expire_date_included | 1 | bslbf |
| reserved | 1 | '1' |
| If (app_type_included=='1') { | | |
|     app_type | 8 | uimsbf |
| } | | |
| If (app_name_included == '1') { | | |
|     app_name_length | 8 | uimsbf |
|     app_name | Var | bslbf |
| } | | |
| If (global_id_included == '1') { | | |
|     global_id_length | 8 | uimsbf |
|     global_id | Var | bslbf |
| } | | |
| If (app_version_included=='1') { | | |
|     app_version | 8 | uimsbf |
| } | | |
| If (cookie_space_included=='1') { | | |
|     cookie_space | 8 | uimsbf |
| } | | |
| if (frequency_of_use_included) { | | |
|     frequency_of_use | 8 | uimsbf |

FIG. 11

| | | |
|---|---|---|
| } | | |
| if (expire_date_included) { | | |
|     expire_date | 32 | uimsbf |
| } | | |
| test_app | 1 | bslbf |
|     available_on_internet | 1 | bslbf |
|     available_in_broadcast | 1 | bslbf |
| reserved | 1 | '1' |
| number_URLs | 4 | |
| for (j=0; j<number_URLs; j++) { | | |
|     URL_length | 8 | uimsbf |
|     URL | var | |
| } | | |
| number_content_items | 8 | uimsbf |
| for (j=0; j<number_content_items;j++) { | | |
|     updates_avail | 1 | bslbf |
|     avail_internet | 1 | bslbf |
|     avail_broadcast | 1 | bslbf |
|     content_size_included | 1 | bslbf |
|     number_URLs | 4 | uimsbf |
|     for (i=0; i<number_URLs; i++) { | | |
|         URL_length | 8 | uimsbf |
|         URL | var | bslbf |
|     } | | |
|     if (content_size_included) { | | |

FIG. 12

| | | |
|---|---|---|
| content_size | 24 | uimsbf |
| } | | |
| num_content_descriptors | 8 | uimsbf |
| for (i=0; i<num_content_descriptors; i++) { | | |
|     content_descriptor() | var | bslbf |
| } | | |
| } | | |
| number_events | 16 | uimsbf |
| for (i=0; i<num_events; i++) { | | |
|     event_id | 16 | uimsbf |
|     action | 5 | uimsbf |
|     destination_included | 1 | bslbf |
|     diffusion_included | 1 | bslbf |
|     data_included | 1 | bslbf |
|     If (destination_included == ??) { | | |
|         destination | 8 | |
|     } | | |
|     If (diffusion_included == ??) { | | |
|         diffusion | | |
|     } | | |
|     If (data_included == ??) { | | |
|         data_size | 8 | |
|         data_bytes | var | bslbf |
|     } | 8 | uimsbf |
| } | | |

FIG. 13

| | | |
|---|---|---|
| num_app_descriptors | 8 | uimsbf |
| for (i=0; i<num_app_descriptors; i++) { | | |
|     app_descriptor() | var | bslbf |
| } | | |
| } | | |
| num_TPT_descriptors | 8 | uimsbf |
| for (i=0; i<num_TPT_descripto+) { | | |
|     TPT_descriptor() | var | bslbf |
| } | | |
| } | | |

FIG. 14

Table 8.4 Activation Messages Table Structure

| Element/Attribute (with @) | No. allowed | Data Type | Description & Value |
|---|---|---|---|
| AMT | | | |
|   @majorProtocolVersion | 1 | integer 0-15 | Major protocol version |
|   @minorProtocolVersion | 0..1 | Integer 0-15 | Minor protocol version |
|   @segmentId | 1 | anyURI | domain_name/program_id = segment id |
|   @beginMT | 0..1 | unsignedInt | Start time of this segment time scope |
|   Activation | 1..N | | Activation message |
|     @targetTDO | 1 | unsignedShort | appID of target TDO |
|     @targetEvent | 1 | unsignedShort | eventID of target Event in target TDO |
|     @targetData | 0..1 | unsignedShort | dataID of target Data in target Event |
|     @startTime | 1 | unsignedInt | Start time of action period |
|     @endTime | 0..1 | unsignedInt | End time of action period |

FIG. 15

Table 8.5 URL List Structural Diagram

| Element/Attribute (with @) | No. allowed | Data Type | Description & Value |
|---|---|---|---|
| UrlList | | | List of potentially useful URLs |
|   TptUrl | 0..N | anyURI | URL of TPT for future segment |
|   NrtSignalingUrl | 0..1 | anyURI | URL of NRT Signaling Server |
|   UrsUrl | 0..1 | anyURI | URL of Usage Reporting Server |
|   PdiUrl | 0..1 | anyURL | URL of PDI-Q table |

FIG. 16

| Syntax | No. Bits | Format |
|---|---|---|
| tpt_section () { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   table_id_extension { | | |
|     protocol_version | 8 | uimsbf |
|     sequence_number | 8 | uimsbf |
|   } | | |
|   reserved | 2 | '11' |
|   TPT_data_version | 5 | uimsbf |
|   current_next_indicator | 1 | '1' |
|   section_number | 8 | uimsbf |
|   last_section_number | 8 | uimsbf |
|   service_id | 16 | uimsbf |
|   tpt_bytes() | var | bslbf |
| } | | |

FIG. 17

```xml
<?xml version="1.0" encoding="UTF-8"?>
<xs:schema xmlns:xs="http://www.w3.org/2001/XMLSchema">
    <xs:element name="UrlList">
        <xs:complexType>
            <xs:sequence>
                <xs:element name="TptUrl" type="xs:anyURI" minOccurs="0" maxOccurs="unbounded"/>
                <xs:element name="NrtSignalingUrl" type="xs:anyURI" minOccurs="0"/>
            </xs:sequence>
        </xs:complexType>
    </xs:element>
</xs:schema>
```

FIG. 18

| Void addTriggerEventListener(Number eventId, EventListener listener) | | |
|---|---|---|
| Description | Add a listener for the Event designated by eventId within the scope of the currently executing TDO in the TPT. When this Event is activated by an Activation Trigger, the listener shall be called, and an object of type TriggerEvent type shall be passed to it. | |
| Arguments | eventId | The eventId of the Event element in the TPT |
| | listener | The listener for the event |

FIG. 19

| Void removeTriggerEventListener(Number eventId, EventListener listener) | | |
|---|---|---|
| Description | Remove the designated listener for the Event designated by eventId. | |
| Arguments | eventId | The eventId of the Event element in the TPT |
| | listener | The listener for the event |

FIG. 20

Interface EventListener {
    handleEvent(in TriggerEvent event);
};

FIG. 21

| Interface TriggerEvent : Event {<br>  readonly attribute String eventId;<br>  readonly attribute String data;<br>  readonly attribute DOMString status;<br>} | | |
|---|---|---|
| Properties | eventId | The eventId of the Event element in the TPT |
| | data | The data for this activation of the event, in hexadecimal |
| | status | Status of the event, equal to "trigger" when the Event is activated in response to an Activation Trigger, or "error" when some kind of error occurred. |

APPARATUS AND METHOD FOR PROCESSING AN INTERACTIVE SERVICE

This application is a continuation application of U.S. patent application Ser. No. 14/025,227 filed Sep. 12, 2013 which claims the benefit of US Provisional Application Nos. 61/700,310 filed on Sep. 12, 2012 and 61/703,749 filed on Sep. 20, 2012, which are hereby incorporated by reference as if fully set forth herein.

BACKGROUND OF THE INVENTION

1. Field of the Invention

The present invention relates to a method and apparatus for providing, receiving and processing a broadcast service, and more particularly, to a method and apparatus for providing a supplementary service related to broadcast content.

2. Discussion of the Related Art

TVs first appeared at the end of the 19th century and have become the most popular information delivery apparatus since the end of the 20th century as a screen display method or design thereof has been continuously developed. However, TVs generally enable viewers to receive unidirectional information from a broadcast station. Such TV limitations have become problematic as personal computers (PCs) and the Internet have come into widespread use since the 1990s. Therefore, TVs have been developed to be able to provide an interactive service.

However, currently, there is no system for providing an interactive service between a content provider and a viewer. In particular, in order to provide such an interactive service, there is a need for a method of executing an application related to broadcast content, which is currently being broadcast, at a specific time and providing related information to a viewer through special information processing.

SUMMARY OF THE INVENTION

An object of the present invention devised to solve the problem lies on supplementary information related to broadcast content at an appropriate time during a period when the broadcast content is played back.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The object of the present invention can be achieved by providing a method of processing an interactive service at a receiver according to the present invention includes receiving uncompressed audio contents or uncompressed video contents from an external decoding unit, extracting identifiers of frames from the received contents periodically, submitting requests containing the identifiers and receiving a trigger for the content when a new segment is detected or when an event activation needs to be communicated to the receiver, wherein the trigger indicates the current time of the contents and references a particular interactive event in an application parameter table or signals that the event is to be executed now or at a specified future time, wherein the application parameter table includes information about at least one of applications.

Preferably, the trigger is a time base trigger when the identifier corresponds to the new segment, and the time base trigger is used to enable the receiver to obtain a new application parameter table associated with the new segment.

Preferably, the trigger is an activation trigger whenever the event is due to be activated, and the activation trigger sets an activation time for the event.

Preferably, the activation trigger is received ahead of the time when the receiver needs to apply the activation trigger.

Preferably, the event is activated immediately upon receipt of the activation trigger, when the activation trigger is received after the activation time.

Preferably, the method further comprises downloading a new application parameter table immediately, unless the receiver has already retrieved the new application parameter table using URL information delivered with the application parameter table, when the trigger includes an application parameter table identifier which identifies the new application parameter table.

Preferably, the activation trigger is applied once, when the receiver receives more than one activation trigger for same event activation.

Preferably, the time is a media time, and the media time is a parameter referencing a point in the playout of a content item.

Preferably, the application is a Declarative Object, a Triggered Declarative Object, a Non-Real Time Declarative Object or an Unbound Declarative Object.

In another aspect of the present invention, provided herein is an apparatus for processing an interactive service according to the present invention includes a receiving module configured to receive uncompressed audio contents or uncompressed video contents from an external decoding unit, an identifier extracting module configured to extract identifiers of frames from the received contents periodically, and a network interface configured to submit requests containing the identifiers and receive a trigger for the content when a new segment is detected or when an event activation needs to be communicated to the apparatus, wherein the trigger indicates the current time of the contents and references a particular interactive event in an application parameter table or signals that the event is to be executed now or at a specified future time, wherein the application parameter table includes information about at least one of applications.

Preferably, the trigger is a time base trigger when the identifier corresponds to the new segment, and the time base trigger is used to enable the apparatus to obtain a new application parameter table associated with the new segment.

Preferably, the trigger is an activation trigger whenever the event is due to be activated, and the activation trigger sets an activation time for the event.

Preferably, the activation trigger is received ahead of the time when the apparatus needs to apply the activation trigger.

Preferably, the event is activated immediately upon receipt of the activation trigger, when the activation trigger is received after the activation time.

Preferably, the network interface is further configured to download a new application parameter table immediately, unless the apparatus has already retrieved the new application parameter table using URL information delivered with the application parameter table, when the trigger includes an application parameter table identifier which identifies the new application parameter table.

Preferably, the activation trigger is applied once, when the apparatus receives more than one activation trigger for same event activation.

Preferably, the time is a media time, and the media time is a parameter referencing a point in the playout of a content item.

Preferably, the application is a Declarative Object, a Triggered Declarative Object, a Non-Real Time Declarative Object or an Unbound Declarative Object.

According to the present invention, it is possible to provide supplementary information related to broadcast content using a conventional broadcast system.

According to the present invention, it is possible to detect a time at which supplementary information related to broadcast content needs to be displayed and provide the supplementary information to a user at an appropriate time.

According to the present invention, it is possible to provide supplementary information related to broadcast content for receivers that have Internet connections and that only have access to uncompressed audio and video from broadcast streams.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram showing an embodiment of a typical broadcast stream;

FIG. 4 is a diagram showing an embodiment of trigger syntax;

FIG. 5 is a diagram showing an embodiment of a TDO parameter table;

FIG. 6 is a diagram showing an embodiment of a TDO parameter table;

FIG. 7 is a diagram showing the meaning of "Frequency of Use" attribute values;

FIG. 8 is a diagram showing the meaning of "destination" attribute values;

FIG. 9 is a diagram showing an embodiment of the syntax of binary form of a TDO Parameters Table;

FIG. 10 is a diagram showing an embodiment of the syntax of the binary form of a TDO Parameters Table;

FIG. 11 is a diagram showing an embodiment of the syntax of the binary form of a TDO Parameters Table;

FIG. 12 is a diagram showing an embodiment of the syntax of the binary form of a TDO Parameters Table;

FIG. 13 is a diagram showing an embodiment of the syntax of the binary form of a TDO Parameters Table;

FIG. 14 is a diagram showing an embodiment of an activation message table structure;

FIG. 15 is a diagram showing an embodiment of a URL List structural diagram;

FIG. 16 is a diagram showing an embodiment of the binary format for the private sections containing TPTs;

FIG. 17 is a diagram showing an embodiment of a list of URLs encoded as an XML document;

FIG. 18 is a diagram showing an embodiment of addTriggerEventListener;

FIG. 19 is a diagram showing an embodiment of removeTriggerEventListener;

FIG. 20 is a diagram showing an embodiment of the definition of the EventListener type;

FIG. 21 is a diagram showing an embodiment of the definition of the TriggerEvent type;

DETAILED DESCRIPTION OF THE INVENTION

Figure 2:
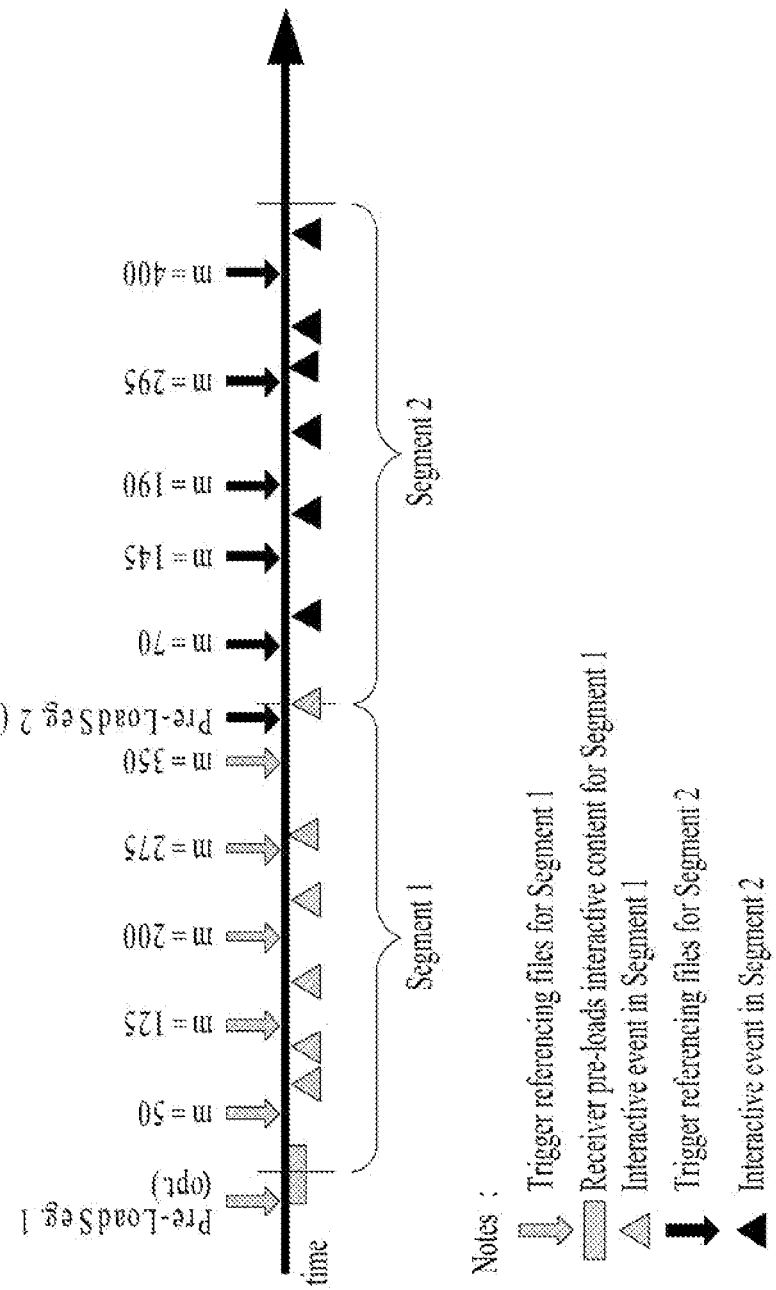
FIG. 2 is a diagram showing an embodiment of trigger timing in case of pre-produced content.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

In the present specification, the term media time stands for a parameter referencing a point in the playout of an audio/video or audio content item. ACR stands for Automatic Content Recognition. AMT stands for Activation Messages Table.

API stands for Application Programming Interface. DAE stands for Declarative Application Environment. DO stands for Declarative Object. FLUTE stands for File Delivery over Unidirectional Transport. GPS stands for Global Positioning System. HTTP stands for Hypertext Transfer Protocol. IP stands for Internet Protocol. IPTV stands for Internet Protocol Television. iTV stands for Interactive Television. MIME stands for Internet Media Type. NDO stands for NRT Declarative Object. NRT stands for Non-Real Time. SMT stands for Service Map Table. SSC stands for Service Signaling Channel. TDO stands for Triggered Declarative Object. TPT stands for TDO Parameters Table. UDO stands for Unbound Declarative Object. UPnP stands for User Plug and Play. URI stands for Uniform Resource Identifier. URL stands for Uniform Resource Locator. XML stands for eXtensible Markup Language. TFT stands for Text Fragment Table. Details thereof will be described below.

In this specification, DO, TDO, NDO, UDO, Link and Packaged App have the following meanings.

DO (Declarative Object) can be a collection constituting an interactive application. (For example, HTML, JavaScript, CSS, XML and multimedia files)

The term "Triggered Declarative Object" (TDO) is used to designate a Declarative Object that has been launched by a Trigger in a Triggered interactive adjunct data service, or a DO that has been launched by a DO that has been launched by a Trigger, and so on iteratively.

The term "NRT Declarative Object" (NDO) is used to designate a Declarative Object that has been launched as part of an NRT service that is not a Triggered interactive data service.

The term "Unbound Declarative Object" (UDO) is used to designate a Declarative Object that is not bound to a service, such as a Packaged App or a DO launched by a Link, or a DO that has been launched by such a DO, and so on iteratively.

The "Link" is a broadcaster-provided URL that points to a web site which provides on-line information or functionality related to the current TV programming or NRT service.

The "Packaged App" is a broadcaster-provided Declarative Object (DO) that provides information or functionality which the broadcaster wants to offer viewers, and that is packaged up into a single file for viewers to download and install.

Details thereof will be described below.

In this specification, a time base message includes a time base trigger and an equivalent thereof. Accordingly, the term "time base message" may be used interchangeably with the term "time base trigger".

In this specification, an activation message includes all information delivery causing activation, such as an activation element in an AMT and/or an activation trigger.

FIG. 1 is a diagram showing an embodiment of a typical broadcast stream.

A typical broadcast stream includes a sequence of TV programs. Each TV program includes an underlying show, which is typically broken up into blocks separated by ads and/or other interstitial material.

In FIG. 1, Segment of Show A, Ad1, Ad2, Segment of Show B, etc. are sequentially included in the broadcast stream. Segments configuring each show may be referred to as show content and Ads may be referred to as interstitial content.

Each show or piece of interstitial material might or might not have an interactive adjunct data service associated with it.

The term "interactive service segment," or just "segment," will be used in this specification to refer to a portion of an interactive adjunct service that is treated by the broadcaster as an integrated unit. An interactive service segment is typically, but not necessarily, associated with a single show or a single piece of interstitial material.

In order to execute such an interactive adjunct data service, there are two models: Direct execution model and triggered declarative object (TDO) model.

In the direct execution model, a declarative object (DO) can be launched automatically as soon as the virtual channel is selected. It can communicate over the Internet with a back-end server to get detailed instructions for providing interactive features—creating displays in specific locations on the screen, conducting polls, launching other specialized DOs, etc., all synchronized with the audio-video program.

In the TDO model, signals can be delivered in the broadcast stream or via the Internet in order to initiate TDO events, such as launching a TDO, terminating a TDO, or prompting some task by a TDO. These events can be initiated at specific times, typically synchronized with the audio-video program. When a TDO is launched, it can provide the interactive features it is programmed to provide.

A basic concept behind the TDO model is that the files that make up a TDO, and the data files to be used by a TDO to take some action, all need some amount of time to be delivered to a receiver, given their size. While the user experience of the interactive elements can be authored prior to the broadcast of the content, certain behaviors must be carefully timed to coincide with events in the program itself, for example the occurrence of a commercial advertising segment.

The TDO model separates the delivery of declarative objects and associated data, scripts, text and graphics from the signaling of the specific timing of the playout of interactive events.

The element that establishes the timing of interactive events is the Trigger.

The information about the TDOs used in a segment and the associated TDO events that are initiated by Triggers is provided by a data structure called the "TDO Parameters Table" (TPT).

FIG. 2 is a diagram showing an embodiment of trigger timing in case of pre-produced content.

Trigger is a signaling element whose function is to identify signaling and establish timing of playout of interactive events.

The trigger includes a time base trigger which serves to indicate a media time of a segment related to an interactive service and an activation trigger which serves to indicate an event occurrence time of an application related to an interactive service.

Triggers can perform various timing-related signaling functions in support of interactive services. Triggers can be multi-functional; depending on their structure, a particular Trigger instance can perform one or more of the following functions:

1. Signal the location of a TPT (accessible via a FLUTE session in the emission stream, via an Internet server, or both);

2. Indicate that interactive content for an upcoming program segment is available to be pre-loaded;

3. Indicate the current Media Time of associated audio/video or audio-only content;

4. Reference a particular interactive event in a TPT and signal that the event is to be executed now or at a specified future Media Time;

5. Indicate that accesses to an Internet server are to be spread out randomly over a specified time interval in order to avoid a peak in demand.

FIG. 2 illustrates Triggers delivered in association with two programming segments. In this example, both segments are "pre-produced," meaning that the content is not from a live broadcast; interactive elements have been added in post-production.

As shown, a short time prior to the occurrence of programming segment 1, a "pre-load" Trigger can be delivered to allow receivers an opportunity to acquire the TPT and interactive content associated with programming segment 1. If a pre-load Trigger is not transmitted, receivers can be expected to use the first Trigger they see within the segment to acquire the content.

Triggers can be sent throughout segment 1, as shown, to indicate the current Media Time (labeled "m" in the figure) relative to the segment. Periodic delivery of Media Time Triggers can be necessary to allow receivers who are just encountering the channel to synchronize and acquire the interactive content.

Just prior to the beginning of segment 2, a pre-load Trigger for that upcoming segment is sent.

In the case of pre-produced content (non-live), the TPT that the receiver can acquire after processing the first Trigger can define the timing of all elements of the interactive experience for that segment. All that is needed for the receiver and TDO to play out the interactive elements can be the knowledge of the media timing; the TPT can describe interactive events relative to Media Time.

Figure 3:
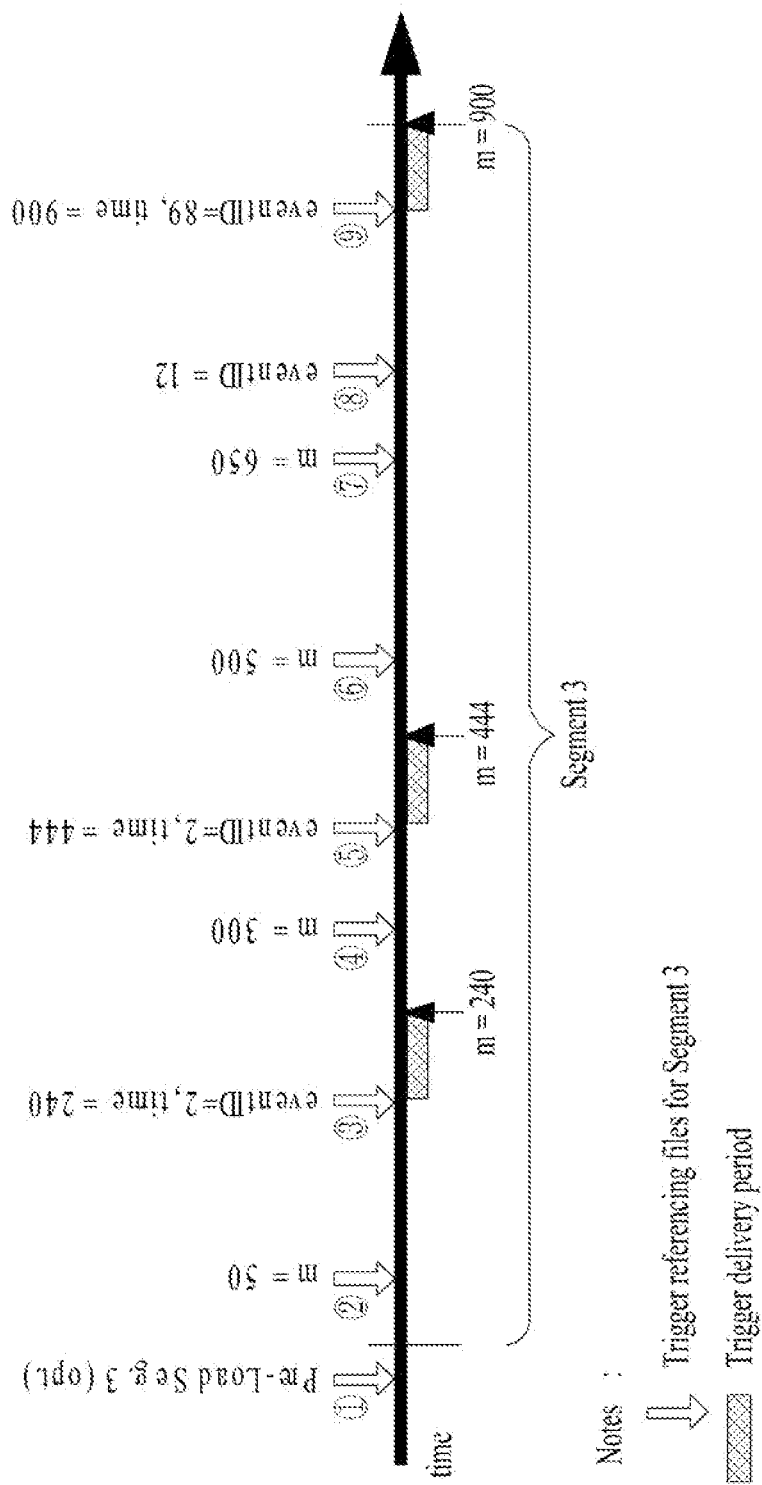
FIG. 3 is a diagram showing an embodiment of trigger timing in case of live content.

FIG. 3 is a diagram showing an embodiment of trigger timing in case of live content.

For the case of live content, the TPT still contains data and information pertinent to different interactive events, however the timing of playout of those events cannot be known until the action in the program unfolds during the broadcast. For the live case, the "event-timing" function of the Trigger is utilized. In this mode, the Trigger can signal that a specified interactive event is to be re-timed to a specified new value of Media Time. Alternatively, the Trigger can indicate that a certain event is to be executed immediately.

In FIG. 3, the functions of triggers of segment 3 will now be described.

A first trigger is a pre-load trigger, which refers to a directory capable of files of segment 3.

A second trigger is a media time trigger which is used to indicate the playout timing of segment 3.

A third trigger is an event re-timing trigger and indicates that the event with eventID=2 in the TPT is to be re-timed to occur at Media Time 240. The hatched area indicates the time interval prior to 240 over which Trigger #3 may be delivered to receivers.

A fourth trigger is a media time trigger.

A fifth trigger is an event re-timing trigger and indicates that the event with eventID=5 in the TPT is to be re-timed to occur at Media Time 444.

A sixth and seventh triggers are media time triggers.

An eighth trigger is an event Trigger and indicates that the event with eventID=12 in the TPT is to be executed immediately.

A ninth trigger is an event re-timing Trigger and indicates that the event with eventID=89 in the TPT is to be re-timed to occur at Media Time 900.

Hereinafter, the life cycle, state and state changing event of the TDO will be described.

A TDO can exist in four different states: Released, Ready, Active and Suspended. A number of different factors can cause a transition from one state to another (trigger, user action, changing channels, etc.).

The TDO may include the following four states. The four states are Ready, Active, Suspended and Released. Ready state means that TDO is downloaded and prepared for execution, but not yet executing. Active state means that TDO is executing. Suspended state means that TDO is temporarily suspended from execution, with its state saved. Released state means that TDO is not Ready, Active or Suspended.

The followings are some of the events that can cause a change of state for a TDO:

1. Trigger "prepare"—Device receives a trigger (in the currently selected primary virtual channel) which requests that the TDO be prepared to execute (allocate resources, load into main memory, etc.)

2. Trigger "execute"—Device receives a trigger (in the currently selected primary virtual channel) which requests that the TDO be activated 3. Trigger "suspend"—Device receives a trigger (in the currently selected primary virtual channel) which directs that the TDO be suspended 4. Trigger "kill"—Device receives a trigger (in the currently selected primary virtual channel) which directs that the TDO be terminated FIG. 4 is a diagram showing an embodiment of trigger syntax.

Both Activation messages and Time Base messages can have the general "Trigger" format under certain delivery circumstances.

The syntactic definition here is described using the Augmented Backus-Naur Form (ABNF) grammar, except that the vertical bar symbol "|" is used to designate alternatives. Rules are separated from definitions by an equal "=", indentation is used to continue a rule definition over more than one line, literals are quoted with " ", parentheses "("and")" are used to group elements, optional elements are enclosed in "[" and "]" brackets, and elements may be preceded with <n>* to designate n or more repetitions of the following element; n defaults to 0. And elements may be preceded with <n>*<m> designate n or more repetitions and m or less repetitions of the following element.

This Trigger syntax is based on the Uniform Resource Identifier (URI): Generic Syntax, excluding the <scheme> and "://" portion, with additional restrictions.

The trigger may include locator_part and terms. Terms may be omitted. If terms are present, locator_part and terms may be connected by "?".

The locator_part may include a hostname part and a path_segments part, which may be connected by '/'.

The hostname may include domainlabel and toplabel, and domainlabel may be repeated 0 times or more along with '.'. That is, hostname may include repeated domainlabel connected with toplabel or include only toplabel.

domainlabel may include one alphanum or include alphanum or "-" repeatedly inserted between alphanum and alphanum 0 times or more.

Here, alphanum may mean alpha or digit.

Here, alpha may be one of lowalpha or upalpha.

Here, lowalpha may be one of a, b, c, d, e, f, g, h, i, j, k, l, m, n, o, p, q, r, s, t, u, v, w, x, y, and z.

Here, upalpha may be one of A, B, C, D, E, F, G, H, I, J, K, L, M, N, O, P, Q, R, S, T, U, V, W, X, Y, and Z.

Here, digit may be one of 0, 1, 2, 3, 4, 5, 6, 7, 8, and 9.

toplabel includes one alpha or include alphanum or "-" repeatedly inserted between alpha and alphanum 0 times or more.

path_segments includes one segment, which is followed by segment repeated 0 times or more. At this time, segments may be connected by '/'.

Here, segment includes alphanum which is repeated once or more.

Terms may include one of event_time or media_time, which may be followed by spread or others. Spread and others may be omitted. If spread and others are present, '&' may be placed ahead of spread and others and spread and others may be placed after event_time or media_time.

Here, spread may include digit repeated once or more after 's='.

Event_time may include digit repeated once or more after 'e=' or include hexdigit repeated once or more or seven times or less after '&t='. '&t=' and the back part thereof may be omitted.

Here, hexdigit may be one of 0, 1, 2, 3, 4, 5, 6, 7, 8, 9, a, b, c, d, e and f.

Media_time may include hexdigit repeated once or more or less than seven times after 'm='.

Others may include one "other" or "other" followed by '&' and "other".

Here, other may include resv_cmd and alphanum which are repeated once or more and are connected by '='.

Here, resv_cmd may be alphanum excluding 'c', 'e', 'E', 'm', 'M', 's', 'S', 't', and 'T'.

The length of the trigger may not exceed 52 bytes. In addition, the hostname portion of the Trigger can be a registered Internet domain name.

A Trigger can be considered to include three parts.
<domain name part>/<directory path> [?<parameters>]

The <domain name part> can be a registered domain name, <directory path> can be a path as it would appear in a URI.

The <domain name part> can reference a registered Internet domain name. The <directory path> can be an arbitrary character string identifying a directory path under the control and management of the entity who owns rights to the identified domain name.

In the TDO model, the combination of <domain name part> and <directory path> can uniquely identify a TPT that can be processed by a receiver to add interactivity to the associated content.

The combination of <domain name part> and <directory path> can be the URL of an Internet location where the TPT for the current segment can be obtained.

That is, the trigger may identify the TPT using <domain name part> and <directory path>. Through <domain name part> and <directory path>, it is possible to confirm the TPT to which the trigger applies. The role performed by applying the trigger to the TPT depends on <parameters>.

Hereinafter, <parameters> will be described.

<parameters> may include one or more of "event_time", "media_time", or "spread"

Next, "event_time", "media_time" and "spread" of the syntax shown in FIG. 4 will be described.
event_time="e=" 1*digit ["&t=" 1*7hexdigit]
media_time="m=" 1*7hexdigit
spread="s=" 1*digit The "event_time" term can be used in an Activation trigger to identify the targeted event ("e=" term) and the time the event should be activated ("t=" term). When the "t=" term is absent, that means the event should be activated at the time the trigger arrives.

That is, "e=", which is an interactive event ID term, can reference the appID in the associated TPT of the TDO targeted by the event, the eventID of the specific event, and the dataID of the Data element to be used for this event activation.

"t=", which is an optional timing value term, can indicate a new media timing for the designated event. If the "t=" part is not present, that can mean the timing for the designated event is the arrival time of the Trigger.

The "media_time" term ("m=" term) can be used in a Time base trigger to identify the current time relative to the time base represented by the Time base trigger. Content identifier information ("c=" term) for identifying currently displayed content may be further included in media_time. For "c=" term, the direct execution model will be described below.

That is, "m=", which is a media timestamp term, followed by a character string of 1 to 8 characters in length representing a hexadecimal number, can indicate the current Media Time.

The "spread" term can be used to indicate that any action taken in response to a Time base trigger (such as retrieving a TPT from a server) or an Activation trigger (such as causing a TDO to access a server) should be delayed a random amount of time, to spread out the workload on the server.

"s=" term can indicate the number of seconds of time over which all receivers should attempt to access the Internet server identified in the Trigger. Each individual receiver can be expected to derive a random time within the designated interval and delay the access request by that amount, thereby spreading in time the peak in demand that might otherwise occur at the first appearance of a Trigger at the receiver.

A Trigger containing a <media time> parameter can be called a Time base trigger, since it is used to establish a time base for event times.

A Trigger containing an <event time> parameter can be called an Activation Trigger, since it sets an activation time for an event.

FIG. 5 and FIG. 6 are diagrams showing an embodiment of a TDO parameter table.

A TDO Parameters Table (TPT) contains metadata about the TDOs of a segment and the Events targeted to them.

Hereinafter, fields included in the table will be described. The sizes of the fields and the types of the fields included in the table may be added or changed according to designer's intention.

The detailed semantics of the fields in the TPT structure is as follows.

TDO parameter table (TPT) may include @majorProtocolVersion, @minorProtocolVersion, @id, @tptVersion, @expireDate, @updatingTime, @serviceID, @baseURL attributes, Capabilities, LiveTrigger, and/or TDO element.

TPT is the root element of the TPT. One TPT element describes all or a portion (in time) of one programming segment.

MajorProtocolVersion which can be 4-bit attribute can indicate the major version number of the table definition. The major version number can be set to 1. Receivers are expected to discard instances of the TPT indicating major version values they are not equipped to support.

When present, @MinorProtocolVersion which can be 4-bit attribute can indicate the minor version number of the table definition. When not present, the value defaults to 0. The minor version number can be set to 0. Receivers are expected to not discard instances of the TPT indicating minor version values they are not equipped to support. In this case they are expected to ignore any individual elements or attributes they do not support.

@id, which is URI, can uniquely identify the interactive programming segment which This TPT element pertains to. @id serves as an identifier of a segment. Accordingly, after a receiver parses the TPT, a trigger, an AMT, etc. related to one segment may match the TPT having @id for identifying the segment using @id information. Accordingly, a segment to which the trigger and the AMT will apply may be found. The details of the AMT will be described below.

@tptVersion, which can be 8-bit integer, can indicate the version number of the TPT element identified by the id attribute. The tptVersion can be incremented whenever any change is made to the TPT.

When present, @expireDate attribute of the TPT element can indicate the date and time of the expiration of the information included in this TPT instance. If the receiver caches the TPT, it can be re-used until the expireDate.

When present, @updatingTime which can be 16-bit element can indicate that the TPT is subject to revision, and it gives the recommended interval in seconds to download the TPT again and check whether the newly downloaded TPT is a new version.

When present, @serviceID which can be 16-bit integer can indicate the NRT service_id associated with the interactive service described in this TPT instance. This is needed for receivers to get FLUTE parameters from the Service Map Table when files for this interactive service are delivered in the broadcast stream.

When present, @baseURL attribute can give a base URL which, when concatenated onto the front of any relative URLs that appear in this TPT. It can give the absolute URLs of the files.

When present, Capabilities element can indicate capabilities that are essential for a meaningful presentation of the interactive service associated with this TPT. Receivers that do not have one or more of the required capabilities are expected not to attempt to present the service.

LiveTrigger element presents if and only if delivery of Activation Triggers via Internet is available. When present, it can provide information needed by a receiver to obtain the Activation Triggers. The child element and attribute of LiveTrigger will be described below.

TDO which is a child element of the TPT element can represent an application (for example, a TDO), that provides part of the interactive service during the segment described by this TPT instance. The child element and attribute of TDO will be described below.

LiveTrigger element may include @URL and/or @pollPeriod attribute.

As described above, LiveTrigger element presents if and only if delivery of Activation Triggers via Internet is available. When present, it can provide information needed by a receiver to obtain the Activation Triggers.

@URL, which is an attribute of the LiveTrigger element, can indicate the URL of a server that can deliver Activation Triggers via Internet. Activation Triggers can be delivered via Internet using HTTP short polling, HTTP long polling, or HTTP streaming, at the option of the interactive service provider.

When present, @pollPeriod, which is an attribute of the LiveTrigger element, can indicate that short polling is being used to deliver Activation Triggers, and the value of the pollPeriod attribute can indicate the recommended time in seconds for the receiver to use as a polling period.

If LiveTrigger element is present, the receiver may parse the TPT and obtain information used to deliver the activation trigger using the Internet. The URL of the server which may receive the activation trigger may be used using @URL information. Through @pollPeriod information or information indicating that @pollPeriod attribute is not present, a method of delivering the activation trigger via the Internet and information about the polling period may be obtained. @pollPeriod will be described in detail below.

TDO element may include @appID, @appType, @appName, @globalID, @appVersion, @cookieSpace, @frequencyOfUse, @expireDate, @testTDO, @availInternet, @availBroadcast attribute, URL, Capabilities, Contentitem, and/or Event element.

As described above, TDO which is a child element of the TPT element can represent an application (for example, a TDO), that provides part of the interactive service during the segment described by this TPT instance.

@appID, which can be 16-bit integer, can identify the application uniquely within the scope of the TPT. An Activation Trigger identifies the target application for the Trigger by means of a reference to the appID. @appID is an identifier of an application. One TPT may include several applications (such as TDO). Accordingly, after parsing the TPT, the application may be identified using @appID information. The trigger, AMT, etc. which will apply to one application may match an application having @appID for identifying the application. Accordingly, the application to which the trigger and the AMT will apply may be found. The AMT will be described in detail below.

@appType, which can be 8-bit integer, can indicate the application format type. The default value can be 1, which can represent a TDO. Other values can represent other formats.

@appName, which is attribute of the TDO element, can be a human readable name which can be displayed to a viewer when a viewer's permission is sought to launch the application.

@globalID, which is attribute of the TDO element, can be a globally unique identifier of the application. In many cases a receiver will cache an app that is going to be used again before too long. In order for this to be useful, the receiver must be able to recognize the app the next time it appears. A globalID is needed for the receiver to be able to recognize the app when it appears again in a new segment.

@appVersion, which is attribute of the TDO element, can be the version number of the application. The appVersion value can be incremented whenever the application (as identified by the globalID) changes. The appVersion attribute cannot be present if the globalID attribute is not present.

@cookieSpace, which can be 8-bit integer, can indicate how much space the application needs to store persistent data between invocations.

@frequencyOfUse, which can be 4-bit integer, can indicate approximately how frequently the application will be used in the broadcast, to provide guidance to receivers on managing their application code cache space. '@frequencyOfUse' will be described in detail below.

@expireDate, which is attribute of the TDO element, can indicate a date and time after which the receiver can safely delete the application and any related resources.

When present with value "true", @testTDO, which is Boolean attribute, can indicate that the application is for testing purposes only, and that it can be ignored by ordinary receivers.

The value "true" for @availInternet attribute can indicate that the application is available for downloading over the Internet. The value "false" can indicate that the application is not available for downloading over the Internet. When the attribute is not present, the default value can be "true".

The value "true" for @availBroadcast attribute can indicate that the application is available for extraction from the broadcast. The value "false" can indicate that the application is not available for extraction from the broadcast. When the attribute is not present, the default value can be "true".

Each instance of URL, a child element of the TDO element, can identify a file which is part of the application. URL element may include @entry attribute. @entry, an attribute of the URL element, has value "true", that can indicate that the URL is an entry point for the application—i.e., a file that can be launched in order to launch the application. When it has value "false", that can indicate that the URL is not an entry point for the application. The default value when the attribute does not appear can be "false". The URL element which is the child element of the TDO element identifies a file configuring the application as described above. The receiver parses the TPT to obtain URL information, accesses the server using the URL information, and downloads an application indicated by the URL information.

When present, Capabilities, which is child element of the TDO element, can indicate capabilities that are essential for a meaningful presentation of this application. Receivers that do not have one or more of the required capabilities are expected not to attempt to present launch the application.

ContentItem, a child element of the TDO element, can indicate a content item including one or more data files that are needed by the application. ContentItem element has information about data files required by an application indicated by the TDO element to which this element belongs. The receiver may download data files required by the application using URL information, etc. of ContentItem, if the ContentItem element is present after parsing. The child element and attribute of ContentItem will be described below.

Event, a child element of the TDO element can represent an event for the application. Event element indicates an event of an application to which this element belongs. The event element contains information indicating which events are present, which data is present, which action is present, etc. The receiver may parse the event element to obtain information about the event of the application. The child element and attribute of the event will be described below.

The receiver may receive and parse the TPT to obtain the child element of the TDO and the information about attributes.

ContentItem element which is the child element of the TDO element may include @updateAvail, @pollPeriod, @size, @availInternet, @availBroadcast attribute and/or URL element.

Here, URL element may include @entry attribute. Each instance of URL, a child element of the ContentItem element, can identify a file which is part of the content item. URL element may include @entry attribute. @entry, an attribute of the URL element, has value "true", that can indicate that the URL is an entry point for the content item—i.e., a file that can be launched in order to launch the content item. When it has value "false", that can indicate that the URL is not an entry point for the content item. The default value when the attribute does not appear can be "false". The receiver may download data files required by the application using URL information of ContentItem after parsing. In this process, the information such as the above-described other attributes may be used.

@updatesAvail, which is a boolean attribute of the ContentItem element, can indicate whether or not the content item will be updated from time to time—i.e., whether the content item includes static files or whether it is a real-time data feed. When the value is "true" the content item will be updated from time to time; when the value is "false" the content item will not be updated. The default value when this attribute does not appear can be false.

@pollPeriod, which is an attribute of the ContentItem element, may be present only when the value of the updatesAvail attribute is "true". The presence of the pollPeriod attribute can indicate that short polling is being used to deliver Activation Triggers, and the value of the pollPeriod attribute can indicate the recommended time in seconds for the receiver to use as a polling period.

@Size, which is an attribute of the ContentItem element, can indicate the size of the content item.

The value "true" for @availInternet attribute can indicate that the content item is available for downloading over the Internet. The value "false" can indicate that the content item is not available for downloading over the Internet. When this attribute is not present, the default value can be "true."

The value "true" for @availBroadcast attribute can indicate that the content item is available for extraction from the broadcast. The value "false" can indicate that the content item is not available for extraction from the broadcast. When this attribute is not present, the default value can be "true."

The event element contains information about the event of the application indicated by the TDO element to which the event element belongs. The receiver may parse the event element to obtain information about the event.

The event element which is the child element of the TDO element may include @eventID, @action, @destination, @diffusion attribute and/or Data element. Here, the data element may include @dataID attribute.

@eventID, which can be a 16-bit integer attribute of the Event element, can identify the event uniquely within the scope of the TDO element containing it. An Activation Trigger (or activation element in AMT) can identify the target application and event for the Trigger by the combination of appID and eventID. When an event is activated, receivers pass the event in to the application. @eventID serves as an identifier of an event. Using @eventID information, a trigger, AMT, etc. for activating the event may match an application having @eventID for identifying the event. That is, an Activation Trigger (or activation element in AMT) can identify the target application and event for the Trigger by the combination of appID and eventID. When an event is activated, receivers pass the event in to the application. The AMT will be described in detail below.

@action, which is an attribute of the Event element, can indicate the type of action to be applied when the event is activated. Allowed values can be "prep", "exec", "susp", and "kill".

"prep" can correspond to the "Trig prep" action. If the state of the targeted application is "Released," this action can cause a state change to "Ready."

"exec" can correspond to the "Trig exec" action. The state of the targeted application can become "Active" upon reception of this trigger.

"susp" can correspond to the "Trig susp" action. If the state of the targeted application is "Active," the state can change to "Suspended" upon reception of this trigger, otherwise there is no change.

"kill" can correspond to the "Trig kill" action. The state of the targeted application can become "Released" upon reception of this trigger.

@action can indicate the type of action to be applied when the event is activated.

@destination, which is an attribute of the Event element, can indicate the target device for the event. @destination will be described in detail below.

When present, @diffusion, which can be an 8-bit integer attribute of the Event element, can represent a period T of time in seconds. The purpose of the diffusion parameter is to smooth peaks in server loading. The receiver can be expected to compute a random time in the range 0-T, in increments of 10 milliseconds, and delay this amount before accessing an Internet server to retrieve content referenced by URLs in the TPT.

When present, Data which is a child element of the Event element can provide data related to the event. Different activations of the Event can have different Data elements associated with them. The data element may include @dataID attribute. @dataID, which is a 16-bit integer attribute, can identify the Data element uniquely within the scope of the Event element containing it. When an activation of an event has data associated with it, the Activation Trigger can identify the Data element by the combination of AppID, EventID, and DataID. The data element indicates data used for the event. One event element may have several data elements. Data is identified using @dataID attribute of the data element. In the receiver, if the event related to the data is activated, the Activation Trigger (or activation element in AMT) can identify the Data element by the combination of AppID, EventID, and DataID. AMT will be described in detail below.

FIG. 7 is a diagram showing the meaning of "Frequency of Use" attribute values.

The "Meaning" column indicates the frequency of occurrence of segments that contain this application. (An attribute can appear multiple times within a single segment, of course.) The frequencyOfUse attribute cannot be present if the globalID attribute is not present. If the app is going to be cached and used again later, the receiver needs to recognize that it is the same app when it appears again. This requires the globalId attribute.

FIG. 8 is a diagram showing the meaning of "destination" attribute values.

As shown in FIG. 8, the destination attribute value of 0 indicates "reserved", the destination attribute value of 1 indicates primary device only, the destination attribute value of 2 indicates one or more secondary devices only 2, and the destination attribute value of 3 indicates Primary device and/or one or more secondary devices.

FIG. 9, FIG. 10, FIG. 11, FIG. 12 and FIG. 13 are diagrams showing an embodiment of the syntax of binary form of a TDO Parameters Table.

This is the binary format of the above-described TPT structure. This structure is a format necessary when the TPT is transmitted in NRT and is made such that the XML structure of the TPT is suitably transmitted in NRT.

The following elements and/or attributes contained in the XML version of the TPT can be omitted from the binary version, since they can be provided by the encapsulation header for delivering the binary table in the broadcast stream: @protocolVersion (major/minor), @serviceID and/or @tptVersion.

The semantics of the fields are as follows. Fields of the binary format of TDO parameter table of FIG. 9, FIG. 10, FIG. 11, FIG. 12 and FIG. 13 will be sequentially described.

expire_date_included, which can be 1-bit field, can indicate whether the expire_date field is included. The value '1' can mean it is included; the value '0' can mean it is not included.

segment_id_length, which can be a 5-bit field, can indicate the length in bytes of the segment_id field.

segment_id, which is a variable length field, can contain the bytes of the segment id, which can have the same semantics as the "id" attribute of the TPT XML format.

base_URL_length, which can be a 8-bit field, can indicate the length in bytes of the base_URL field.

base_URL, which is a variable length field, can contain the bytes of the base URL, which can have the same semantics as the baseURL attribute of the TPT XML format.

When present, expire_date, which can be a 32-bit field, can indicate the date and time of the expiration of the information included in this TPT instance. If the receiver caches the TPT, it can be re-used until the expireDate. The unsigned integer can be interpreted as the number of GPS seconds since 00:00:00 UTC, 6 Jan. 1980, minus the GPS-UTC_offset. The GPS UTC offset can be an 8-bit unsigned integer that defines the current offset in whole seconds between GPS and UTC time standards.

trigger_server_URL_length, which can be an 8-bit field, can indicate the length in bytes of the trigger_server_URL field. When the value of this field is 0, it can indicate that internet delivery of individual Activation Triggers is not available.

trigger_server_URL, when the value of the trigger_server_URL_length field is not 0, can contain the bytes of the Trigger Server URL, which can have the same semantics as the URL attribute of the LiveTrigger element of the TPT XML format.

trigger_delivery_type, which can be a 1-bit field, can indicate the delivery mode of individual Activation Triggers over the Internet. The value '0' can indicate that HTTP short polling is being used; the value '1' can indicate that either HTTP long polling or HTTP streaming is being used.

poll_period, which can be an 8-bit integer, can indicate the recommended number of seconds between polls, when HTTP short polling is being used.

num_apps_in_table, which can be an 8-bit field, can indicate the number of applications (TDOs) described in this TPT instance.

app_id, which can be a 16-bit field, can contain an identifier for this application (the application described in this iteration of the num_apps_in_table loop). It can be unique within this TPT instance.

app_type_included, which can be a 1-bit field, can indicate whether the app_type field is included for this application. The value '1' can mean it is included; the value '0' can mean it is not included.

app_name_included, which can be a 1-bit field, can indicate whether the app_name field is included for this application. The value '1' can mean it is included; the value '0' can mean it is not included.

global_id_included, which can be a 1-bit field, can indicate whether the global_id field is included for this application. The value '1' can mean it is included; the value '0' can mean it is not included.

app_version_included, which can be a 1-bit field, can indicate whether the app_version field is included for this application. The value '1' can mean it is included; the value '0' can mean it is not included.

cookie_space_included, which can be a 1-bit field, can indicate whether the cookie_space field is included for this application. The value '1' can mean it is included; the value '0' can mean it is not included.

frequency_of_use_included, which can be a 1-bit field, can indicate whether the frequency_of_use field is included for this application. The value '1' can mean it is included; the value '0' can mean it is not included.

expire_date_included, which can be a 1-bit field, can indicate whether the expire_date field is included for this application. The value '1' can mean it is included; the value '0' can mean it is not included.

When present, app_type, which can be an 8-bit field, can indicate the format type of this application. The value 0 can indicate that the application is a TDO. If this field is not present, the value can default to 0. Other values can represent other formats.

When present, app_name_length, which can be an 8-bit field, can indicate the length in bytes of the app_name field immediately following it. The value 0 for this field can indicate that no app_name field is present for this application.

When present, app_name, which is a variable length field, can have the same semantics as the appName attribute of the TDO element in the TPT XML format.

When present, global_id_length, which can be an 8-bit field, can indicate the length in bytes of the global_id field immediately following it. The value 0 for this field can indicate that no global_id field is present for this application.

When present, global_id, which is a variable length field, can have the same semantics as the globalId attribute of the TDO element in the TPT XML format.

When present, app_version, which can be an 8-bit field, has the same semantics as the appVersion attribute of the TDO element in the TPT XML format.

When present, cookie_space, which can be an 8-bit field, can have the same semantics as the cookieSpace attribute of the TDO element in the TPT XML format.

When present, frequency_of_use, which can be an 8-bit field, can have the same semantics as the frequencyOfUse attribute of the TDO element in the TPT XML format.

When present, expire_date, which can be an 8-bit field, can have the same semantics as the expireDate attribute of the TDO element in the TPT XML format.

test_app, which can be a 1-bit field, can indicate whether or not this application is a test application, intended to be ignored by ordinary receivers. The value '1' can mean it is a test application; the value '0' can mean it is not a test application.

available_on_internet, which can be a 1-bit field, can indicate whether or not this application is available via the Internet or not. The value '1' can mean it is available via the Internet; the value '0' can mean it is not available via the Internet.

available_in_broadcast, which can be a 1-bit field, can indicate whether or not this application is available via the broadcast or not. The value '1' can mean it is available via the broadcast; the value '0' can mean it is not available via the broadcast. number_URLs, which can be a 4-bit field, can indicate the number of files that comprise this application.

URL_length, which can be an 8-bit field, can indicate the length of the URL field following it.

URL, which is a variable length field, can have the same semantics as the URL attribute of the TDO element in the TPT XML format.

number_content_items, which can be an 8-bit field, can indicate the number of content items that are to be downloaded for use by this application.

updates_avail, which can be a 1-bit field, can indicate whether this content item will be updated from time to time— i.e., whether it a set of static files or a real-time data feed. The value '1' can indicate that it will be updated; the value '0' can indicate that it will not be updated.

avail_internet, which can be a 1-bit field, can indicate whether the file(s) that comprise this content item can be downloaded via the Internet or not. The value '1' can mean that they are available for downloading via the Internet; the value '0' can mean they are not available.

avail_broadcast, which can be a 1-bit field, can indicate whether the file(s) that comprise this content item can be downloaded via the broadcast or not. The value '1' can mean that they are available for downloading via the broadcast; the value '0' can mean they are not available.

content_size_included, which can be a 1-bit field, can indicate whether or not the content_size field is included or not for this application. The value '1' can mean it is included; the value '0' can mean it is not included.

number_URLs, which can be a 4-bit field, can indicate the number of files that comprise this content item.

URL_length, which can be an 8-bit field, can indicate the length of the URL field following it.

URL, which is a variable length field, can have the same semantics as the URL attribute of the ContentItem, child element of the TDO element in the TPT XML format.

content_size, which can be a 24-bit field, can have the same semantics as the contentSize attribute of the ContentItem child element of the TDO element in the TPT XML format.

num_content_descriptors, which can be an 8-bit field, can indicate the number of content descriptors in the descriptor loop immediately following it.

content_descriptor( ), which is a variable length field, can be a descriptor conforming to the MPEG-2 descriptor format (tag, length, data). It can provide additional information about this content item. Among the descriptors that may be included in this descriptor loop can be the Capabilities descriptor, indicating receiver capabilities needed for a meaningful presentation of this content item.

number_events, which can be an 8-bit field, can indicate the number of events defined for this TDO.

event_id, which can be a 16-bit field, can contain an identifier for this event (the event described in this iteration of the number_events loop). It can be unique within the scope of this application. The event can be referenced within Activation Triggers by the combination of app_id and event_id.

action, which can be a 5-bit field, can have the same semantics as the action attribute of the Event child element of the TDO element in the TPT XML format.

destination_included, which can be a 1-bit field, can indicate whether or not the destination field is included for this event. The value '1' can indicate that it is included; the value '0' can indicate that it is not included.

diffusion_included, which can be a 1-bit field, can indicate whether or not the diffusion field is included for this event. The value '1' can indicate that it is included; the value '0' can indicate that it is not included.

data_included, which can be a 1-bit field, can indicate whether or not the data_size and data_bytes fields are included for this event. The value '1' can indicate that they are included; the value '0' can indicate that they are not included.

When present, the semantics of destination field can be the same as the semantics of the destination attribute of the Event child element of the TDO element in the TPT XML format.

When present, the semantics of diffusion field can be the same as the semantics of the diffusion attribute of the Event child element of the TDO element in the TPT XML format.

When present, the data_size field can indicate the size of the data_bytes field immediately following it.

When present, the data_bytes field can provide data related to this event. Whenever the event is activated, the target application will be able to read the data and use it to help carry out the desired action. The content of this field can be identical to the content of the corresponding Data child element of the corresponding Event child element of the corresponding TDO element in the TPT XML format, except that this field can contain the raw binary value, and the Data element in the TPT XML format can contain a base64 encoding of the binary value.

num_app_descriptors, which can be an 8-bit field, can indicate the number of descriptors in the descriptor loop immediately following it.

app_descriptor( ), which is a variable length field, can be a descriptor conforming to the MPEG-2 descriptor format (tag, length, data). It can provide additional information about this application (TDO). Among the descriptors that may be included in this descriptor loop is the Capabilities descriptor, indicating receiver capabilities needed for a meaningful presentation of this application.

num_TPT_descriptors, which can be an 8-bit field, can indicate the number of descriptors in the descriptor loop immediately following it.

TPT_descriptor( ), which is a variable length field, can be a descriptor conforming to the MPEG-2 descriptor format (tag, length, data). It can provide additional information about this TPT. Among the descriptors that may be included in this descriptor loop is the Capabilities descriptor, indicating receiver capabilities needed for a meaningful presentation of the interactive service represented by this TPT.

FIG. 14 is a diagram showing an embodiment of an activation message table structure. Hereinafter, fields included in the table will be described. The sizes of the fields and the types of the fields included in the table may be added or changed according to designer's intention.

An Activation Messages Table (AMT) can contain the equivalent of the Activation Triggers for a segment. Under certain circumstances it can be delivered to receivers in lieu of Activation Triggers. A trigger can be delivered in the closed caption stream, by ACR servers, by a "live trigger" server, and via AMT.

The detailed semantics of the fields in the AMT structure is as follows:

An Activation Messages Table (AMT) may include @majorProtocolVersion, @minorProtocolVersion, @segmentId, @beginMT attribute and/or Activation element.

@majorProtocolVersion, which can be a 4-bit attribute of the AMT element, can indicate the major version number of the AMT definition. The major version number can be set to 1. Receivers can be expected to discard instances of the AMT indicating major version values they are not equipped to support.

When present, @minorProtocolVersion, which can be a 4-bit attribute of the AMT element, can indicate the minor version number of the AMT definition. When not present, the value can default to 0. The minor version number can be set to 0. Receivers can be expected to not discard instances of the AMT indicating minor version values they are not equipped to support. In this case they can be expected to ignore any individual elements or attributes they do not support.

@segmentID, which is an identifier of the AMT, matches the identifier of the TPT which contains the applications and events to which the Activations in this AMT apply. @segmentId may serve as an identifier of the AMT. Accordingly, the receiver may receive and parse the AMT to identify the AMT via @segmentId information. @segmentId contains information indicating to which segment the AMT applies, matches @id of the TPT related to the segment, and serves to connect the AMT and the TPT. Further, the segment may be identified to provide basic information necessary to identify the target TDO and the event of the activation element of the AMT.

When present, @beginMT, which is an attribute of the AMT element, can indicate the beginning Media Time of the segment for which this AMT instance provides activation times. @beginMT may indicate beginning of the media time with respect to a segment to which the AMT will apply. Therefore, it is possible to decide a criterion of a time when activation indicated by the activation element occurs. Accordingly, if @beginMT is present, @startTime attribute in the activation element may be influenced by the beginning of the media time indicated by @beginMT.

Each instance of Activation element of the AMT can represent a command to activate a certain event at a certain time, with certain data associated with the event. A plurality of activation elements may be present in the AMT. Each activation element performs a role similar to that of the activation trigger. The activation element may apply to the segment indicated by @segmentId in the AMT. Attributes of the activation element may contain information about in which application activation occurs, in which event activation occurs, when activation occurs, etc. Attributes of the activation element will be described in detail below.

The activation element may include @targetTDO, @targetEvent, @targetData, @startTime and/or @endTime attribute.

@targetTDO, which is an attribute of the Activation element, can match the appID attribute of a TDO element in the TPT with which the AMT is associated, thereby identifying the target application for the activation command. @targetTDO may contain information to which application the activation element of the AMT applies. The receiver may receive and parse the AMT to obtain @targetTDO and find @appID in the TDO element of the matching TPT to identify the application to which the activation element will apply.

@targetEvent, which is an attribute of the Activation element, can match the eventID attribute of an Event element contained in the TDO element identified by the targetTDO attribute, thereby identifying the target event for the activation command. @targetEvent may contain information to which event of which application the activation element of the AMT applies. The receiver may receive and parse the AMT to obtain @targetEvent and find @eventID in the TDO element of the matching TPT to identify the event to which the activation element will apply.

@targetData, which is an attribute of the Activation element, can match the dataID attribute of a Data element contained in the Event element identified by the targetTDO and targetEvent attributes, thereby identifying the Data that is to be associated with the target event when the activation command applies. @targetData may identify data related to the target event when the activation command applies. The receiver may receive and parse the AMT to obtain @targetData and find @dataID in the event element of the TPT.

@startTime, which is an attribute of the event element, can indicate the start of the valid time period for the event relative to Media Time. Receivers can be expected to execute the command when Media Time reaches the value in startTime, or as soon thereafter as possible. @startTime may indicate a start time when the event occurs. This start time is based on the media time. The receiver may parse the AMT to obtain @startTime information and confirm the time when the event occurs using @startTime. The receiver may activate the event if the media time reaches the startTime based on the media time of the segment identified by @segmentId. If startTime has been already elapsed, the event may be activated as soon as possible.

When present, @endTime, which is an attribute of the event element, can indicate the end of the valid time period for the event relative to Media Time. The receiver can be expected to not execute the command when Media Time is past the value in endTime. @endTime may indicate the end time of the event. If the media time reaches the endTime, the receiver may not perform the event.

The Activation elements in the AMT can appear in order of ascending startTime values.

When a receiver is activating events according to the Activations in an AMT, it can be expected to apply each activation at its startTime, or as soon thereafter as possible (for example, in the case when a receiver joins the service and receives the AMT at some time after the startTime and before the end-Time). If the "action" attribute of the event element in TPT is "exec", then the receiver can be expected to pass a Trigger-Event in to the target application. TriggerEvent will be described below in the part related to the API.

FIG. 15 is a diagram showing an embodiment of a URL List structural diagram.

A URL List can contain certain URLs of potential use to a receiver. The URL list may include the following URLs, etc.

1. URL for TPTs for one or more future segments, allowing a receiver to pre-download files.

2. URL of an NRT Signaling Server from which information about stand-alone NRT services in the broadcast stream can be retrieved, allowing a receiver to access those services even if it does not have access to delivery of NRT service signaling in the broadcast stream.

3. URL of a Usage Reporting Server to which usage reports can be sent for a virtual channel, allowing a receiver to send in such reports even if it does not have access to delivery of this URL in the broadcast stream.

4. URL of the PDI-Q Table for a virtual channel, allowing a receiver to personalize the viewing experience even if it does not have access to the PDI-Q Table delivered in the broadcast stream. (The PDI-Q Table is related to personalization for providing a service customized for the user in provision of the interactive service. It is possible to inquire the user about personalization via the PDI-Q table.)

Among others, the URL list may be made with respect to the UrsUrl element so as to further indicate the URL of the server for usage reporting, in order to use preferred data and the type of content viewed and consumed currently through the receiver in business. The UrsUrl element included in the URL list may be variously interpreted as follows.

First, in case of a usage reporting server, the receiver may perform the usage reporting function of the receiver by a predetermined protocol (e.g., data structure, XML file, etc.) with the URL of the usage reporting server.

Second, there may be a TDO executed on the web browser of the receiver. In this case, this indicates the location of the Usage Reporting TDO. In this case, the TDO may directly collect and report information about content stored in the receiver or consumed currently using the API (e.g., file APIs or usage reporting APIs) of the web browser of the receiver. The TDO may transmit the collected data using Javascript API called XMLHttpRequest.

URLlist may include UrlList, TptUrl, UrsUrl, and/or Pdi-Url. The semantics of these elements is as follows.

TptUrl, which is an element of the UrlList element, can contain the URL of a TPT for a future segment in the current interactive adjunct service. When multiple TptUrl elements are included, they can be arranged in order of the appearance of the segments in the broadcast.

NrtSignalingUrl, which is an element of the UrlList element, can contain the URL of a server from which receivers can obtain NRT signaling tables for all the virtual channels in the current transport stream.

UrsUrl, which is an element of the UrlList element, can contain the URL of a server to which receivers can send usage (audience measurement) reports for the current virtual channel.

PdiUrl, which is an element of the UrlList element, can contain the URL of the PDI-Q table for the current virtual channel.

FIG. 16 is a diagram showing an embodiment of the binary format for the private sections containing TPTs. FIG. 16 illustrates a case in which a TPT is delivered in a broadcast stream in a delivery mechanism which will be described below. Details are described later.

A description will be given of a delivery mechanism for delivering a trigger, a TPT, etc. Output from Interactive Service Creation, Delivery of Triggers in the Broadcast Stream, Delivery of Time base triggers via the Internet, Delivery of Activation Triggers via Internet (ACR Scenario), Delivery of TPTs in Broadcast Stream, Delivery of TPTs via Internet, Moving TDOs and Content Items, Combining Multiple Segments into One Segment will be sequentially described.

Hereinafter, Output from Interactive Service Creation will be described.

The process of service creation for a segment can result in folder containing all TDOs and other content items, TPT file in XML format and AMT file in XML format. The other results may be created.

Hereinafter, Delivery of Triggers in the Broadcast Stream will be described.

When delivered in the broadcast stream, Triggers can be delivered in the DTV Closed Caption channel, in Service #6, in the URLString command.

If the Trigger is less than or equal to 26 characters in length, it can be sent non-segmented (Type=11). If the Trigger is 27 to 52 characters in length, it can be sent in two segments (the first segment in a Type=00 segment and the second segment in a Type=10 segment).

The type of URI delivered in any given instance of the command can be given by an 8-bit parameter.

For interactive services using the TDO model, the URI type of the URI data structure can be set to 0 (Interactive TV Trigger for TDO model). This delivery mechanism includes both Time base triggers and Activation Triggers.

In the case in which the time base trigger is delivered via a broadcast stream (in closed caption service #6.), if "m=" term is absent, Time base triggers can simply deliver URL of Signaling Server. And if "m=" term is absent, then "t=" term must be absent from Activation triggers.

In the case in which the activation trigger is delivered via a broadcast stream (in closed caption service #6.), that is, in the case of "Trigger" format, with "e=" term, with or without "t=" term, if "t=" term is present, activation time can be the timestamp relative to a time base. And if "t=" term is absent, activation time can be the arrival time of the message.

In the case in which the time base trigger and the activation trigger are delivered via CC service #6, there can be three possible ways for broadcasters to handle Time Base and Activation triggers. The three ways are 'Segment mode without explicit time base', 'Segment mode with explicit time base' and 'Service mode with explicit time base'.

These can be mixed within a broadcast, on a segment by segment basis.

In segment mode without explicit time base, Activation messages include no time stamp, so that the activation time of each message can be the delivery time of the message, and Time Base messages also include no time stamp, so that their only purpose can be to provide the URL of the Signaling Server that can deliver TPT files. Time Base messages can even be omitted entirely in this mode, relying on the URL in the Activation messages to provide the URL of the Signaling Server, but then receivers will not be able to retrieve a TPT and start downloading TDOs until after the first Activation message appears, delaying the response to the first Activation message by quite a bit.

In this case Time Base messages that can appear in CC service #6 can contain the "locator_part" of the "Trigger" format and possibly the "spread" term, but no "media_time" term, and Activation messages that can appear in CC service

6 can contain the "locator_part" of the "Trigger" format, the "event_time" term, and possibly the "spread" term, but with no "t=" part in the "event_time" term. The "locator_part" of both Time Base and Activation messages can be the current segmentId. This URL can also be used to retrieve the TPT for the segment via the Internet.

In segment mode with explicit time base, Time Base messages include a time stamp, to define a time base, and Activation messages might include a time stamp, to define the activation time relative to the time base, or they might include no time stamp, indicating that the activation time is the arrival time of the message.

In this case Time Base messages that can appear in CC service #6 can contain the "locator_part" of the "Trigger" format, the "media_time" term, and possibly the "spread" term, and Activation messages that can appear in CC service #6 can contain the "locator_part" of the "Trigger" format, the "event_time" term, and possibly the "spread" term, with or without the "t=" part in the "event_time" term. The "locator_part" of both Time Base and Activation messages can be the current segmentId, and the time base is specific to the segment. This URL can also be used to retrieve the TPT for the segment via the Internet.

In service mode with explicit time base, Time Base messages include a time stamp, to define a time base, and Activation messages might or might not include a time stamp. The time base can extend across multiple segments, rather than being specific to a single segment. The "locator_part" of the Time Base messages can be an identifier of the time base, and also a URL that can be used to retrieve TPTs for the service via the Internet.

In any case the Trigger Insertion Server that inserts the triggers into CC service #6 should work from the AMT, translating the Activation messages from the XML format in the AMT into the trigger format specified for delivery in CC service #6. In the case of an Activation element with no endTime attribute, a single trigger can be inserted with activation time equal to the startTime attribute. In the case of an Activation element with both startTime and endTime elements, a sequence of triggers can be inserted with same target. The first trigger in the sequence can have activation time equal to the startTime attribute, the last trigger in the sequence can have activation time equal to the endTime attribute, and there can be a fixed time interval between the activation times of the triggers in the sequence (except that the interval between the next-to-last and last trigger in the sequence can be shorter). The length of this fixed time interval can be configurable.

When the Time Base and Activation messages are in segment mode, the time base can be specific to the segment. It can start with the "beginMT" value at the beginning of the segment, and run through the segment. The "startTime" and "endTime" values of individual Activations can be relative to the "beginMT" value. When the Time Base and Activation messages are in service mode, the time base can span segments, and the "beginMT" value for each segment can be adjusted to take account of the service time base and the broadcast schedule.

Hereinafter, Delivery of Time base triggers via the Internet will be described.

Internet delivery of Time base triggers can be useful in so-called Automatic Content Recognition (ACR) situations, where the recipient of the Time base triggers has no access to Closed Caption service #6. In these situations the receiver needs to use ACR in order to recognize video frames and synchronize the time base with them. In ACR situations Time Base messages can be obtained from watermarks or from ACR servers. In case of reception from the ACR server, the Time Base messages are delivered as responses from an ACR server.

Hereinafter, Delivery of Activation Triggers via Internet (ACR Scenario) will be described.

Activation messages can be delivered via short polling, long polling or streaming, but all of these can impose a lot of overhead on the receivers and the server. Activation messages can also be delivered in the form of an AMT, but this can provide a good deal of information about the length of segments, facilitating ad killers. There might be other alternatives.

In the case in which the activation message is delivered in the form of the activation trigger, that is, in case of "Trigger" format with "e=" term, with or without "t=" term, this may be delivered via HTTP short polling, long polling or streaming.

When delivered via Internet, Activation messages can be delivered using either or both of the mechanisms, Individual Activation Trigger Delivery mechanism and Bulk Activation Trigger Delivery mechanism.

Hereinafter, Individual Activation Trigger Delivery will be described.

As described above, when individual Activation Triggers are delivered via the Internet, they can be delivered using HTTP short polling, long polling or streaming. The format of the Activation Trigger can be exactly the same as when they are delivered via DTVCC service #6.

In case of short polling, the polling period must be specified. In this period, a short polling operation may be set using pollPeriod included in the TPT as described below.

When Internet delivery of Activation Triggers is available, the URL attribute of the LiveTrigger element in the TPT can indicate the Activation Trigger Server which can deliver activation trigger. If the pollPeriod attribute of the LiveTrigger element is present in the TPT, this can indicate that HTTP short polling is being used, and it can indicate the polling period a receiver should use. If the pollPeriod attribute of the LiveTrigger element is not present in the TPT, this can indicate that either HTTP long polling or HTTP streaming is being used.

Regardless of which protocol is being used, the receiver can be expected to issue an HTTP request to the Activation Trigger Server with the query term:

?mt=<media_time> where <media_time> can be the current media time of the viewed content.

If short polling is being used, the response from the Activation Trigger Server can contain all the Triggers that have been issued within the time interval of length pollPeriod ending at <media_time>. If more than one Activation Trigger is returned, they can be separated by one or more white space characters. If no Activation Triggers are returned, the response can be empty.

If HTTP long polling or HTTP streaming is being used, the Activation Trigger Server can wait to return a response until the media time when an Activation Trigger would be delivered in the broadcast stream. At this time it can return the Activation Trigger.

If HTTP long polling is being used, the Activation Trigger Server can close the session after returning an Activation Trigger. The receiver can be expected to immediately issue another request, with an updated media time.

If HTTP streaming is being used, the Activation Trigger Server can keep the session open after returning each Activation Trigger, and it can deliver additional Activation Triggers over the session as the time arrives for them to be delivered.

In all cases the HTTP response can contain an HTTP Response Header Field of one of the following forms to signal the delivery mode:

ATSC-Delivery-Mode: ShortPolling [<poll-period>]
ATSC-Delivery-Mode: LongPolling
ATSC-Delivery-Mode: Streaming The <poll-period> parameter can indicate the recommended interval between polls for the succeeding polls. The <poll-period> can be omitted.

Hereinafter, Bulk Activation Trigger Delivery will be described.

When Activation Triggers are delivered via the Internet in bulk, the Activation Triggers for a segment can be delivered via HTTP along with the TPT for the segment, in the form of a multi-part MIME message, with the TPT as the first part of the message, and an Activation Messages Table (AMT) as the second part of the message.

Hereinafter, Delivery of TPTs in Broadcast Stream will be described.

When delivered in the broadcast stream, TPTs can be translated from their XML format into an equivalent binary NRT-style signaling table format and encapsulated in NRT-style private sections, one TPT per table instance. The TPT for the current segment is always present. TPTs for one or more future segments may also be present. The TPT instance is defined by the value of its segment_id field. For reference, the binary format of the TDO parameter table was described above. Here, NRT-style private section may correspond to tpt_section( ) of FIG. 16.

In summary, in order to transmit the binary structure of the TPT in NRT, the TPT may have a section structure suitable for NRT transmission. Hereinafter, this process will be described in detail.

Each TPT can be encapsulated in NRT-style private sections by dividing each TPT into blocks and inserting the blocks into the tpt_bytes( ) fields of sections that have a common value of table_id, protocol_version TPT_data_version and sequence_number fields. The blocks can be inserted into the sections in order of ascending section_number field values. The private sections can be carried in the Service Signaling Channel (SSC) of the IP subnet of the virtual channel to which the TPT pertains. Here, "Service Signaling Channel" is defined in the ATSC-NRT standard and means a channel having a specific IP address and a port number. The sequence_number fields in the sections can be used to distinguish different TPT instances carried in the same SSC.

Hereinafter, the fields of FIG. 16 will be described.

The private section (tpt_section( )) may include table_id, protocol_version, sequence_number, TPT_data_version, current_next_indicator, section_number, last_section_number, service_id, and/or tpt_bytes( ) information.

table_id, which can be an 8-bit field, can identify this table section as belonging to a TDO Parameters Table instance.

protocol_version may be divided into two parts. The high order 4 bits of this 8-bit unsigned integer field can indicate the major version number of the definition of this table and the TPT instance carried in it, and the low order 4 bits can indicate the minor version number. The major version number can be set to 1. Receivers can be expected to discard instances of the AMT indicating major version values they are not equipped to support. The minor version number can be set to 0. Receivers can be expected to not discard instances of the AMT indicating minor version values they are not equipped to support. In this case they can be expected to ignore any descriptors they do not recognize, and to ignore any fields that they do not support.

sequence_number can be an 8-bit field. The value of sequence_number can be the same as the sequence_number of all other sections of this TPT instance and different from the sequence_number of all sections of any other TPT instance in this Service Signaling Channel. Accordingly, this field may perform a role different from that of the other TPT instance. sequence_number field may indicate an IP subnet associated with a service signaling channel in this section. The values of the sequence_number fields of the different TPT instances can reflect the order in which the segments appear in the broadcast stream.

TPT_data_version, which can be a 5-bit field, can indicate the version number of this TPT instance, where the TPT instance can be defined by its segment_id. Since the TPT version is known in advance in order to determine whether the received TPT section data is a new version TPT, the TPT_data_version field may be present in the section table. The version number can be incremented by 1 modulo 32 when any field in the TPT instance changes.

current_next_indicator, which can be a 1-bit indicator, can always be set to '1' for TPT sections, indicating that the TPT sent is always the current TPT for the segment identified by its segment_id.

section_number, which can be an 8-bit field, can give the section number of this TPT instance section, where the TPT instance can be identified by its segment_id. The section_number of the first section in an TPT instance can be 0x00. The section_number can be incremented by 1 with each additional section in the TPT instance.

last_section_number, which can be an 8-bit field, can give the number of the last section (i.e., the section with the highest section_number) of the TPT instance of which this section is a part.

service_id, which can be a 16-bit field, can specify the service_id associated with the interactive service offering the content items described in this table instance.

tpt_bytes( ), which is a variable length field, can include a block of the TPT instance carried in part by this section. When the tpt_bytes( ) fields of all the sections of this table instance are concatenated in order of their section_number fields, the result can be the complete TPT instance.

That is, after the binary format of the TPT is used or the XML format is changed to a binary format, the TPT may be divided to be suitable for NRT transmission, included in tpt_bytes( ) field of the private section, and transmitted in NRT. At this time, if one TPT is divided into several private sections, the private section may have the same table_id, protocol_version TPT_data_version and sequence_number value. The divided TPT blocks may be inserted in order of section_number field values.

The receiver may parse the received private sections. In order to combine the private sections into one TPT again, the private sections having the same table_id, protocol_version TPT_data_version and sequence_number values may be used. At this time, order information capable of being obtained from section_number and last_section_number information may be used. If tpt_bytes( ) of all private sections having the same table_id, protocol_version TPT_data_version and sequence_number values are sequentially connected, one TPT may be created.

Delivery of TPTs via Internet will be described in detail with reference to FIG. 17.

Hereinafter, Moving TDOs and Content Items will be described.

Networks and stations will often need to provide their own HTTP servers for delivering TDOs and content items (files)

used by TDOs. When this is done, the baseURL in the TPT can be adjusted to reflect the location of the server.

Hereinafter, Combining Multiple Segments into One Segment will be described.

In order to thoroughly obfuscate boundaries between segments, the TPTs and AMTs for multiple segments can be combined into a single TPT and AMT. The following steps may be performed.

1. Identify the set of segments to be combined.
2. Create a new TPT with a new segmentId.
3. If any of the segments being combined have live activations, provide a relay server that provides access to all of them, and put the parameters for this server in the "LiveTrigger" element.
4. Apply the baseURL for each segment as needed to get the full TDO and ContentItem URLs. (It may be possible to identify a shorter baseURL that is common to all the segments being combined, and retain that as a baseURL for the combined segment.)
5. Revise appId values as needed to remove conflicts.
6. Insert into the new TPT all the revised TDO elements for all the segments being combined
7. Create a new AMT with segmentId equal to the new segmentId of the combined TPT.
8. Select an appropriate new "beginMT" value for the new AMT.
9. Adjust the targetId values of all the Activation elements in the AMT files for the segments being combined to reflect any changes in appId values.
10. Adjust the startTime and endTime values of all the Activation elements in the AMT files for the segments being combined to reflect the new "beginMT" value and the broadcast schedule for the segments being combined.
11. Insert all the revised Activation elements into the new AMT.

FIG. 17 is a diagram showing an embodiment of a list of URLs encoded as an XML document.

Hereinafter, Delivery of TPTs via Internet will be described.

When delivered over the Internet, TPTs can be delivered via HTTP. The URL of the TPT for the current segment can be the "<domain name part>/<directory path>" in Time Base messages. The response to a request for a TPT can include just the TPT, or it can include a 2-part MIME message, with the requested TPT in the first part and a list of URLs in the second part, encoded as an XML document. (The response to a request will always include the TPT for the current segment. It may include TPTs for one or more future segments as well.)

The URLs as the second part of the above-described response may have the format shown in FIG. 17.

The semantics of the elements of FIG. 17 will be described.

"UrlList" can contain a list of URLs that are useful to a receiver.

"TptUrl" can contain the URL of a TPT for a future segment. When multiple TptUrl elements are included, they can be arranged in order of the appearance of the segments in the broadcast.

"NrtSignalingUrl" can contain the URL of a server where receivers can obtain NRT signaling tables for all the virtual channels in the current broadcast stream.

FIG. 18 is a diagram showing an embodiment of addTriggerEventListener.

Hereinafter, ATSC JavaScript APIs for an environment for executing DO will be described.

In order to support synchronization of Declarative Object actions to broadcast programming, additional methods can be supported for the video/broadcast object.

If the TPT is received via the DTVCC or the Internet, several events for executing the TDO may be present in the TPT and these events may be activated by the activation trigger.

In order to process this event, a Listener function may be registered on a per eventID basis. Accordingly, as the above-described 'additional methods', the two functions, addTriggerEventListener and removeTriggerEventListener, for registering the Listener function may be present.

In FIG. 18, addTriggerEventListener is described and format, arguments, etc. are shown.

addTriggerEventListener function can register a callback function (listener function) for processing an event generated on a per eventId basis. The addTriggerEventListener function may receive the listener of EventListener type and eventId of Number type as argument. The eventListener type will be described below. The addTriggerEventListener function may not have a return value (void). Here, eventId argument may be event ID in the event element of the TPT. Here, listener argument may be a listener for the event.

The trigger processing module of the receiver may register the listener function on a per eventId basis using the "addTriggerEventListener" function as soon as the activation message is received. If the event is activated, the registered listener function may be called. At this time, the object of TriggerEvent type may be delivered to the listener function. TriggerEvent type will be described below.

FIG. 19 is a diagram showing an embodiment of removeTriggerEventListener.

In FIG. 19, removeTriggerEventListener is described and format, arguments, etc. are shown.

The removeTriggerEventListener function can cancel registration of a callback function (listener function) for processing an event generated on a per eventId basis. The removeTriggerEventListener function may receive the listener of EventListener type and eventId of Number type as argument. The eventListener type will be described below. The removeTriggerEventListener function may not have a return value (void). Here, eventId argument may be event ID in the event element of the TPT. Here, listener argument may be a listener for the event.

In the javascript program, if the event which may be generated on a per eventId basis is desired to be no longer received or if the program "DestroyWindow" is finished, the listener function registered using "removeTriggerEventListener" may be cancelled.

FIG. 20 is a diagram showing an embodiment of the definition of the EventListener type.

Here, the definition of the EventListener type conforms to Web Interface definition Language (Weg IDL). Web IDL can be used to describe interfaces that are intended to be implemented in web browsers. Web IDL is an IDL variant with a number of features that allow the behavior of common script objects in the web platform to be specified more readily.

EventListener may be an interface object. EventListener type may have an event of TriggerEvent type as an argument.

FIG. 21 is a diagram showing an embodiment of the definition of the TriggerEvent type.

TriggerEvent type may contain information about the event.

TriggerEvent type may have eventId, data and status as properties. Here, eventId may be eventID in the event element of the TPT. Here, data may be data for this activation of the event. Here, data may be hexadecimal. Here, status may mean the status of the event. Here, if the status value is "trigger", this means a status in which the event is activated by the activation trigger. If the status value is "error", this means a status in which error occurs.

TDO model has been described. Hereinafter, Direct Execution model will be described.

In the Direct Execution model, a Declarative Object (DO) can be launched automatically as soon as the virtual channel is selected. It can communicate over the Internet with a backend server to get detailed instructions for providing interactive features—creating displays in specific locations on the screen, conducting polls, launching other specialized DOs, etc., all synchronized with the audio-video program.

Hereinafter, the trigger operation in the direct execution model will be described.

The role, function and syntax of the trigger are not largely changed in the direct execution model.

Performance of the trigger is equal to that described above.

Trigger syntax is equal to that described above.

A Trigger can be considered to include three parts.

<domain name part>/<directory path> [?<parameters>]

In the direct execution model, the combination of <domain name part> and <directory path> can uniquely identify the DO to be launched.

<parameters> may include one or more of "event_time", "media_time", or "spread"

In the direct execution model, an application is launched automatically as soon as the virtual channel is selected. Application can communicate over the Internet with a backend server via a "Synchronized Content Protocol". The server can give detailed instructions for providing interactive feature, which is all synchronized with the audio-video program.

In case of the direct execution model, since an application is immediately executed, information may be delivered to the currently executed application as a time base trigger is delivered. In this model, the application needs to continuously deliver information about currently broadcast content to the server for synchronization. To this end, the time base trigger may further include special information different from that of the TDO model. This special information may be an identifier of currently broadcast content.

Similarly, the content identifier may be present in the parameter part of the trigger in the form of a parameter.

Similarly, the content identifier may be present in media_time of the trigger in the form of one term. The content identifier term, which can be called content_id, which can be designated by "c=" followed by a character string, can represent an identifier for the content currently being viewed.

The content_id term can be intended to support the Direct Execution model of interactive service implementation.

As described above, in this model, Time base triggers with content_id term can be passed in to the application after it is launched, and the application can deliver the content_id to the backend server in order to identify the context for the interaction. Detailed operation thereof will be described below.

The delivery mechanism of the trigger in the direct execution module is equal to that described above.

However, in case of Delivery of Triggers in the Broadcast Stream, Triggers can be delivered in the DTV Closed Caption channel, in Service #6, in the URLString command. And for interactive services using the Direct Execution model, the URI_type field can be set to 2 (Interactive TV Trigger for Direct Execution model).

Hereinafter, overall operation of the direct execution module will be described.

As one model for executing interactive service, in the direct execution model, an application can be launched automatically as soon as the virtual channel is selected. The application can communicate over the Internet with a backend server via a "Synchronized Content Protocol." The server can give detailed instructions for providing interactive features—eating displays in specific locations on the screen, conducting polls, launching other specialized DOs, etc., all synchronized with the audio-video program.

Operation may be performed as follows.

First of all, an application can be launched. Then, a time base trigger is received. The time base trigger is delivered to the application after the application has been executed. The content_id term of the time base trigger may include content identification information of currently displayed content. The application can deliver the content_id to the backend server in order to identify the context for the interaction, and in order to identify the content currently being viewed.

Direct Execution Model has been described.

Figure 22:
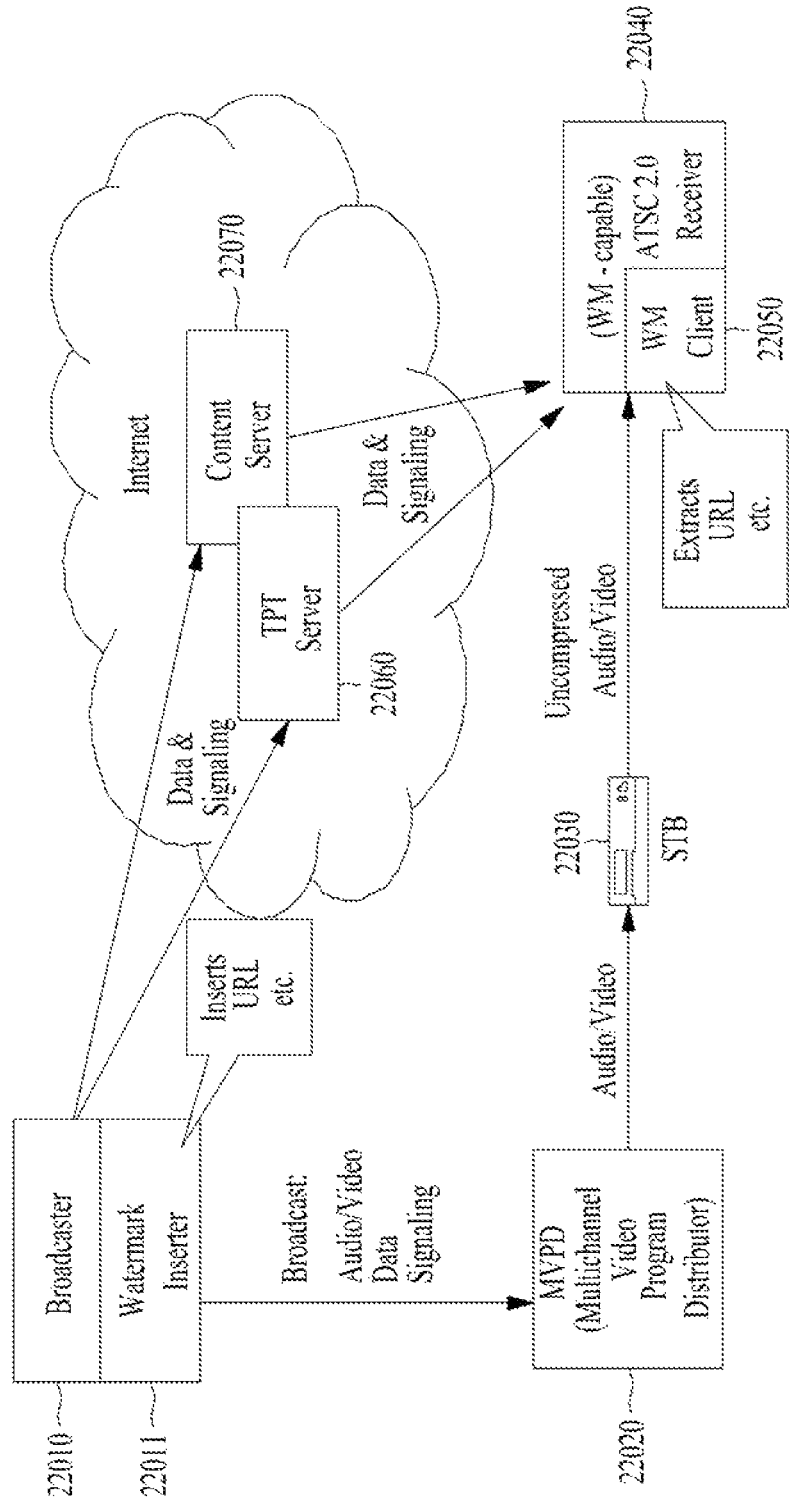
FIG. 22 is a diagram showing an embodiment of an architecture for a WM approach.

FIG. 22 is a diagram showing Architecture for WM approach.

A description will be given of Delivery via other interfaces.

Protocols and architecture enabling acquisition of an interactive service in environments (for example, as received from a cable or satellite set-top box) in which only uncompressed video and audio are accessible) are defined. The architecture and protocols can be designed for use by receivers that have Internet connections and that only have access to the uncompressed audio and video from the broadcast stream. Of course, the architecture and protocols can be used successfully if the interactive service provider chooses to support the same.

The architecture can be designed to support two basic approaches to identifying the content being viewed, so that any associated interactive service data enhancements can be delivered via Internet. Two basic approaches can be watermarking and fingerprinting.

In both the watermarking and fingerprinting approaches, the intent can be to allow receivers to find out what programming is currently being watched and obtain a URL that can be used as the starting point to get additional information about interactive services for the programming.

FIG. 22 illustrates an architecture for a WM approach.

In an architecture for a WM approach, the architecture may include a broadcaster 22010, a watermark inserter 22011, an MVPD 22020, an STB 22030, a receiver 22040, a WM client 22050, a TPT server 22060 and/or a content server 22070.

The broadcaster 22010 may be a source outputting audio/video streams and interactive services related to the audio/video streams. A TV station may be an example of the broadcaster 22010. The broadcaster 22010 may be a broadcast content producer or distributor. The broadcaster 22010 can deliver broadcast streams, audio/video content, interactive data, broadcast schedules or AMT.

The watermark inserter 22011 can insert watermarks into broadcast audio/video frames. The watermark inserter 22011 may be integrated with the broadcaster 22010 or may be a separate module. Watermarks may be information necessary for receivers. Watermarks may be information such as URL. Watermarks will be described in detail later.

The MVPD 22020 is an abbreviation for multiprogram video program distributor. The MVPD 22020 may be a cable operator, a satellite operator or an IPTV operator. The MVPD 22020 can receive the broadcast stream from the Broadcaster/Watermark Inserter, with the watermarks inserted by the Watermark Inserter 22011 in the case of a watermarking ACR system. MVPD 22020 often strips out all the program elements other than audio and video tracks, and sends the resulting stream to set-top boxes (STBs) in customer premises.

The STB 22030 typically decodes (decompresses) the audio and video and sends the same to a TV set for presentation to viewers. The STB can send uncompressed audio/video content to the receiver 22040. The STB may be an external decoding unit according to an embodiment of the present invention.

The receiver 22040 may include the WM client 22050. The WM client 22050 may be disposed outside the receiver 22040. Here, the receiver may be watermark-capable. The structure of the receiver 22040 will be described later.

The WM Client 22050 can obtain Activation Triggers from the ACR Server (not shown) and passes the same into the main receiver code, using an API provided for such purpose. Normally the WM Client 22050 would be built into the receiver, but other configurations are possible. The WM client 22050 can extract inserted watermarks from uncompressed audio/video content. Watermarks may be information such as a URL.

The TPT server 22060 may be a server capable of downloading an application such as a TPT. The receiver 22040 transmits the extracted watermarks to the ACR server. When the watermarks are matched to watermarks stored in a database (not shown), the receiver 22040 can receive a trigger or triggers as a response. When the received trigger or triggers have the above-described new locator_part or a TPT or application parameter table of a new version is discovered, the receiver 22040 may request the TPT server 22060 to download a new TPT or application parameter table.

The content server 22070 may provide applications and TDO necessary to provide interactive services. When a new application or TDO is needed, the new application can be downloaded using a URL in a TPT or application parameter table.

In the watermarking (WM) approach the broadcaster/watermark inserter can insert watermarks into the broadcast audio or video frames. These watermarks can be designed to carry a modest amount of information to receivers, while being imperceptible or at least minimally intrusive to viewers. Such watermarks might provide directly the information that receivers need, or they might only provide a code value that receivers can send via an Internet connection to a remote server in order to get the information they need.

Figure 23:
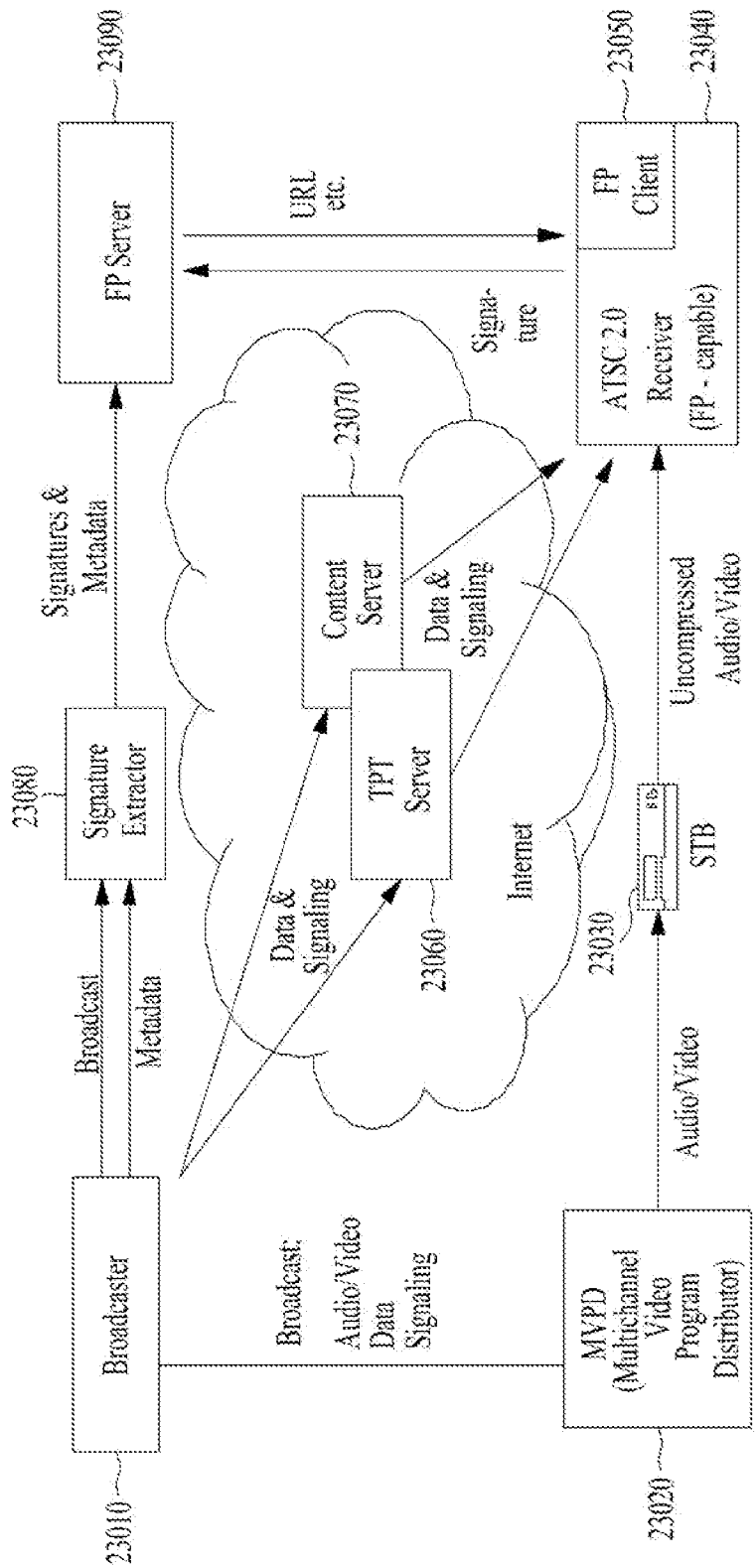
FIG. 23 is a diagram showing an embodiment of an architecture for an FP approach.

FIG. 23 is a diagram showing an embodiment of architecture for FP approach.

In the architecture for FP approach, the architecture may include a broadcaster 23010, an MVPD 23020, an STB 23030, a receiver 23040, an FP client 23050, a TPT server 23060, a content server 23070, a signature extractor 23080 and/or an FP server 23090.

The broadcaster 23010 may be a source outputting audio/video streams and interactive services related to the audio/video streams. A TV station may be an example of the broadcaster 22010. The broadcaster 22010 may be a broadcast content producer or distributor. The broadcaster 22010 can deliver broadcast streams, audio/video content, interactive data, broadcast schedules or AMT.

The MVPD 23020 is the abbreviation for multiprogram video program distributor. The MVPD 22020 may be a cable operator, a satellite operator or an IPTV operator. The MVPD 23020 often strips out all the program elements other than audio and video tracks, and sends the resulting stream to set-top boxes (STBs) on customer premises.

The STB 23030 typically decodes (decompresses) the audio and video and sends the same to a TV set for presentation to viewers. The STB can send uncompressed audio/video content to the receiver 23040. The STB 23030 may be an external decoding unit according to an embodiment of the present invention.

The receiver 23040 may include the FP client 23050. The FP client 23050 may be disposed outside the receiver 23040. Here, the receiver 23040 may be fingerprint-capable. The structure of the receiver 23040 will be described later.

The FP Client 23050 can obtain Activation Triggers from the FP Server 23090 and passes them into the main receiver code, using an API provided for such purpose. Normally the FP Client 23050 would be built into the receiver, but other configurations are possible. The FP client 23050 can extract a fingerprint from uncompressed audio/video content. The fingerprint will be described in detail later.

The TPT server 23060 may be a server capable of downloading an application such as a TPT. The receiver 23060 transmits the extracted fingerprint to the FP server 23090. When the fingerprint is matched to a signature of the signature extractor 23080, the receiver 23040 can receive a trigger or triggers as a response. When the received trigger or triggers have the above-described new locator_part or a TPT or application parameter table of a new version is discovered, the receiver 22040 may request the TPT server 23060 to download a new TPT or application parameter table.

The content server 23070 may provide applications and TDO necessary to provide interactive services. When a new application or TDO is needed, the new application can be downloaded using a URL in a TPT or application parameter table.

The signature extractor 23080 may receive metadata from the broadcaster 23010. The signature extractor 23080 may extract the signature of a frame from the received metadata. When the fingerprint transmitted to the FP server 23090 matches the signature of the signature extractor 23080, the signature extractor 23080 can deliver the metadata related to the signature to the FP server 23090.

The FP server 23090 may perform signature matching operation with the signature extractor 23080. The FP server 23090 can match the signature to the fingerprint received from the receiver 23040. When the signature is matched to the fingerprint, the FP server 23090 can receive the metadata related to the signature from the signature extractor 23080. The FP server 23090 can transmit the metadata to the receiver 23040.

In the fingerprinting (FP) approach, the FP Client 23050 can extract fingerprints (also can be called signatures) from audio or video frames and check the fingerprints against a database of fingerprints of broadcast frames from multiple broadcasters in the area to find the information the receivers 23040 need. Such checks can be done by signatures to a remote server and getting back a record with the desired information, or in some cases they can be done by checking against a database of signatures that has been downloaded into the receiver 23040. Here, the remote server may be the FP server 23090.

Although watermarking and fingerprinting can be distinct technologies, they are not necessarily exclusive of one another. Using a combination of the two technologies is quite conceivable. The term automatic content recognition (ACR) can be used to refer to either of these technologies separately or to any combination thereof.

An environment in which a receiver only has access to the uncompressed audio and video from the broadcast stream is called an "ACR environment."

In both WM and FP cases receivers can use the URL as a starting point to obtain interactive service content, including triggers.

In both WM and FP cases the timing information can be in the form of a timestamp relative to a broadcast side clock that is used for specification of the timing of time critical events for the channel, such as activation timestamps in triggers delivered over the Internet.

It is assumed that broadcasters can typically support delivery of interactive services directly in the broadcast stream, for the benefit of receivers that get TV signals from antennas, and also support delivery of interactive services over the Internet as described above, for the benefit of receivers that get uncompressed audio and video, but have an Internet connection. However, broadcasters can support either one of these two delivery mechanisms without the other.

A typical architecture for the watermarking approach in the case when the watermark provides only a code value would look something like a combination of the two architectures in FIG. 22 and FIG. 23. There would be a Watermark Inserter, as in FIG. 22, but it would insert a code, rather than the information needed by receivers. There would also be a WM Server, playing much the same role as the FP Server in FIG. 23. Receivers would send it codes, rather than signatures, and they would get back the information they need.

A description will be given of accessing interactive services.

Description of the accessing interactive services includes descriptions of Direct Execution Model, TDO Model with Activations Independent of ACR Server, TDO Model with Activations received from ACR Server. While the models are not shown, the models are not limited to the descriptions and may be changed according to the intention of a designer.

There are a number of different ways for a receiver in an ACR environment to access interactive services, depending on broadcaster choices and the nature of the ACR system. The interactive service model can be the Direct Execution model or the TDO model, and Activation In the case of the TDO model, Triggers can be delivered independently of the ACR Server, or they can be delivered by the ACR Server.

A description will be given of the Direct Execution Model.

An ACR process for a virtual channel that contains an interactive service which has the Direct Execution Model can provide to receivers viewing that channel the equivalent of Time Base Triggers that include the media_time ("m=") term and the content_id ("c=") term. These Triggers can be identified as Triggers for an interactive service with the Direct Execution model.

When a receiver first receives such a Trigger with a new locator_part, it can be expected to load into its browser the Declarative Object (DO) pointed to by the locator_part of the Trigger. Typically the DO will have been pre-installed or previously downloaded and cached. Otherwise the receiver can be expected to download the same, using an HTTP GET request.

Then, the DO can contact the appropriate back-end server and provide the interactive service as directed by the back-end server.

The receiver can be expected to make that initial Trigger and subsequent Triggers available to the DO as they are obtained until such time as it gets a Trigger from the ACR server that has a new locator_part and/or that is identified as a Trigger for an interactive service with the TDO model (either of which typically indicates a channel change).

A description will be given of the TDO Model with Activations Independent of ACR Server.

An ACR process for a virtual channel that can contain an interactive service which has the TDO model, and which provide event activations independently of the ACR Server, can provide to receivers viewing that channel the equivalent of Time Base Triggers that can include the media_time ("m=") term. These Triggers can be identified as Triggers for an interactive service with the TDO model.

When a receiver first receives such a Trigger with a new locator_part, it can be expected to retrieve the current TDO Parameters Table (TPT) from the TPT Server can be pointed to by the locator_part of the Trigger, and to use the media time in that Trigger and subsequent Triggers to establish a reference time base for event activations, relative to the audio or video frames can be identified by the ACR process.

If an (Activation Messages Table) AMT is delivered along with the TPT, the receiver can be expected to use the individual Activation elements in the table to activate events at the correct times relative to the time base established by the media-time terms in the Triggers. (These events can include loading and executing a TDO, causing a TDO to take a particular synchronized action, suspend a TDO, etc.)

If a LiveTrigger element is included in the TPT, the receiver can be expected to retrieve Activation Triggers from the Live Trigger Server identified by the URL in the LiveTrigger element, using the polling method signaled in the LiveTrigger element, and to use these Activation Triggers to activate events at the correct times relative to the time base established by the media-time terms in the Triggers.

Both an AMT and a Live Trigger Server can be used for the same service, typically with the former providing static activations and the latter providing dynamic activations. Alternatively, an AMT can be used alone when all activations for the segment are static, or a Live Trigger Server can be used alone to deliver both static and dynamic activations.

A description will be given of the TDO Model with Activations Received from the ACR server.

How activation triggers for a TDO interactive service model are delivered without a separate trigger server in an ACR environment is described.

Fingerprinting ACR systems can include an ACR server. Receivers can send frame signatures to an ACR server, and the ACR server can identify the frame represented by the signature and send back the information needed by the receivers. Watermarking ACR systems can include an ACR server in the case when the watermarks include no more that codes that can be sent to an ACR server to get the information needed by receivers. Watermarking ACR systems may not include an ACR server in the case when the watermarks themselves contain the information needed by receivers. In those ACR systems that include an ACR server, two different models can be used for communication between the ACR servers and receivers: a request/response model and an event-driven model.

It is assumed that the broadcaster supports the TDO interaction model.

Three cases of an ACR server using a request/response model, an ACR server using an event driven model and a watermarking ACR system inserting information directly may be assumed.

In the case of an ACR server, the ACR method could be fingerprinting, in which case receivers compute some sort of signature (or fingerprint) of audio or video frames and submit the same to an ACR server for identification, or it could be watermarking, in which case receivers extract codes in the form of watermarks from the audio or video frames and submit the codes to an ACR server for identification.

Terms of fingerprinting signatures are described for convenience. However, the system operates in the same manner as the case of watermarking codes and the present invention is not limited to fingerprinting.

Figure 24:
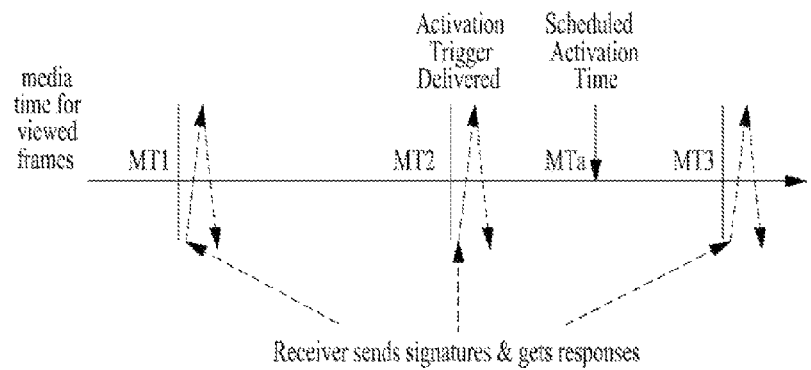
FIG. 24 is a diagram showing an embodiment of static activation in a request/response ACR case.

FIG. 24 is a diagram showing an example of static activation in a request/response ACR case.

A description will be given of a case in which an ACR server uses the request/response model.

In the request/response ACR model, the receiver can be expected to generate signatures of the content periodically (e.g. every 5 seconds, which is merely exemplary and can be changed by a designer) and send requests containing the signatures to the ACR server. When the ACR server gets a request from a receiver, it can return a response. The communications session may not kept open between request/response instances. In this model, it may not be feasible for the ACR server to initiate messages to the client.

For an ACR server that is using this request/response model and is delivering Activation Triggers to receivers, each response from the ACR server can be one of Null, Time Base Trigger and Activation Trigger.

A Null response can indicate that the signature is not recognized, or (if the ACR Ingest Module includes signatures for frames in program segments with no interactive service) that the signature represents a frame which belongs to a segment that does not have an interactive service associated therewith. The ACR ingest module will be described below.

A Time Base Trigger response can indicate that no event activation is scheduled to take place before the client's next request. The client can be expected to use the Time Base Triggers to maintain a media-time clock.

An Activation Trigger response can indicate that an activation is due to take place soon, with the time of the activation indicated by the "t=" term in the Trigger.

Whenever a receiver gets a Trigger with a new locator_part, it can be expected to download the new TPT immediately, unless it has already retrieved the same using a URLList delivered with a previous TPT.

Whenever a receiver obtains an Activation Trigger, it can be expected to activate the event at the time indicated by the "t=" term in the Trigger, relative to the media time clock.

FIG. 24 illustrates how this scheme works for static activation (or for dynamic activation when the ACR system learns of the dynamic activation sufficiently ahead of time).

In FIG. 24, the receiver can send signatures for frames which the ACR server determines to have media times MT1, MT2 and MT3. For the frame with media time MT1 the receiver simply obtains a response that contains a Time Base Trigger. For the frame with media time MT2, a static activation is due at media_time MTa, so the receiver obtains a response that contains an Activation Trigger which has a "t=MTa" term. For the frame with media time MT3 the receiver just obtains a response that contains a Time Base Trigger.

It can happen that a receiver receives more than one Activation Trigger for the same event activation. However, the media times for each of them will be the same, so the receiver can identify them as duplicates, and only apply one of them.

Figure 25:
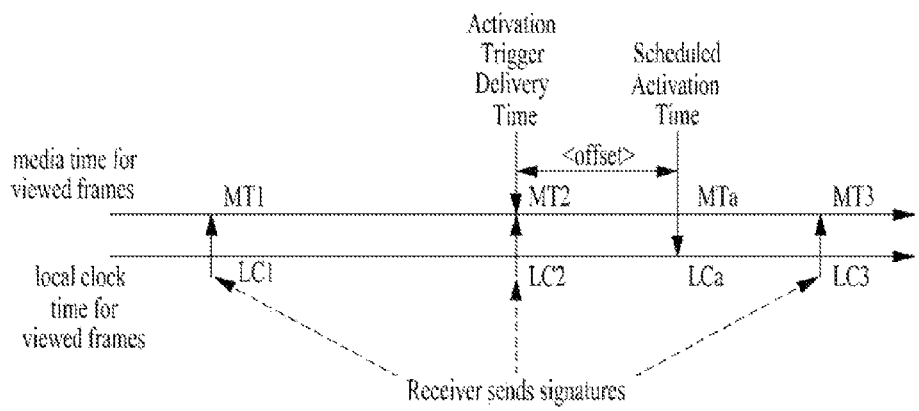
FIG. 25 is a diagram showing an embodiment of static activation in a request/response ACR case.

FIG. 25 is a diagram showing an embodiment of static activation in a request/response ACR case.

A description will be given of a case in which the ACR server uses the request/response model.

In FIG. 25, the receiver can be sending signatures for frames viewed at local clock times LC1, LC2, LC3, etc. The media_time for the frame viewed at local clock time LC1 can be determined by the ACR server to be MT1, and the receiver just gets a response that contains a Trigger with no media_time or event_time. The media_time for the frame viewed at local clock time LC2 can be determined by the ACR server to be MT2, and the ACR server knows that a static activation is due at media_time MTa, so the ACR server sends a response that contains an Activation Trigger which has a "d=<offset>" term, meaning that the media_time MTa for the activation is <offset> time units after MT2. The receiver then adds the <offset> to time LC2 and gets LCa as the local time it should activate the event.

Figure 26:
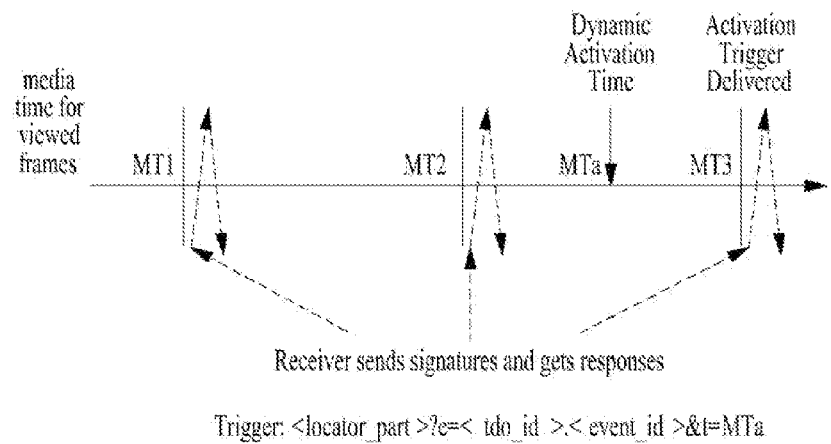
FIG. 26 is a diagram showing an embodiment of dynamic activation in a request/response case.

FIG. 26 is a diagram showing an embodiment of dynamic activation in a request/response ACR case.

A description will be given of a case in which dynamic activation occurs in the request/response ACR case.

For dynamic activations in situations when the ACR System does not learn of the event activation until it is too late to send the Trigger to the receiver ahead of time, the ACR Server needs to wait until the next request, and then sends an Activation Trigger. FIG. 26 illustrates this case. The effect of this is that dynamic activations can be delayed by as much as one request interval.

In FIG. 26, the receiver can be sending signatures for frames that the ACR server determines to have media times MT1, MT2 and MT3. For the frames with media times MT1 and MT2, the receiver just gets a response that contains a Time Base Trigger. When a dynamic activation with activation time MTa shows up at or shortly before media_time MTa, the ACR server cannot notify the receiver about it until the next request from the receiver, which occurs for the frame with media time MT3. At that time the ACR server response contains an Activation Trigger with activation time MTa (which is a little in the past). In this situation the receiver can be expected to apply the Activation Trigger as soon as it arrives.

Here again it is possible that a receiver receive more than one Activation Trigger for the same event activation. However, the media time for each of them will be the same, so the receiver can identify them as duplicates, and only apply one of them.

Figure 27:
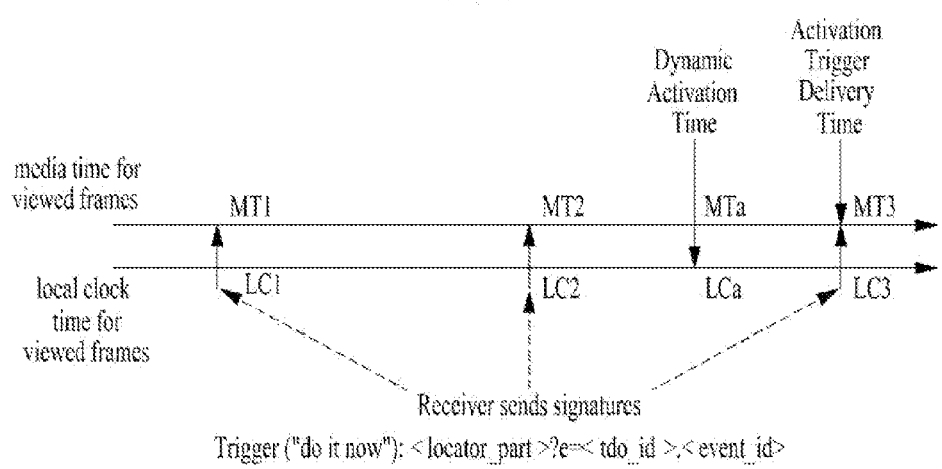
FIG. 27 is a diagram showing an embodiment of dynamic activation in a request/response case.

FIG. 27 is a diagram showing an embodiment of dynamic activation in a request/response ACR case.

A description will be given of a case in which dynamic activation occurs in the request/response ACR case.

In FIG. 27, the receiver can send signatures for frames viewed at local clock times LC1, LC2, LC3, etc. The media_time for the frame viewed at local clock time LC1 can be determined by the ACR server to be MT1, and the receiver just gets a response that contains a Trigger with no media_time or event_time. The media_time for the frame viewed at local clock time LC2 can be determined by the ACR server to be MT2, and the ACR server does not know that a dynamic activation will show up at media_time MTa, so the receiver just gets a response that contains a Trigger with no media_time or event_time. When a dynamic activation shows up at media_time MTa, the ACR server cannot notify the receiver about it until the next request from the receiver, which occurs at local time LC3. At that time the ACR server response can contain an Activation Trigger with a negative <offset> value or contains a "do it now" activation trigger.

A description will be given of an ACR server using an event driven model.

In the event driven ACR model the receiver can be expected to initiate a permanent connection to the ACR server, generate signatures of the content periodically (e.g., every 5 seconds), and submit the signatures over the connection. The ACR server does not respond to each signature. It can send a message to the receiver when a new segment is detected or when an event activation needs to be communicated to the receiver. In this model, it is possible for the ACR server to initiate messages to the client at any time.

For an ACR server that is using this event driven model and is delivering activations to receivers, the following rules can apply for messages from the ACR server.

First of all, when the ACR server receives a signature from a receiver that corresponds to a new segment, the ACR server can send a Time Base Trigger to the receiver immediately, just to enable the receiver to obtain the associated TPT.

Second of all, whenever an event is due to be activated, the ACR server can send an Activation Trigger to the receiver. If possible, it can send the Activation Trigger slightly ahead of the time when the receiver needs to apply the same. (This is very similar to the behavior in the request/response model.) If the ACR server learns of the activation so late that it cannot send an Activation Trigger very much ahead of time (which can happen in the case of a dynamic event activation), it still can send an Activation Trigger as soon as it can. In this latter case, it is possible that the client will get the message slightly after the activation time, because of message delays, in which case the receiver can be expected to activate the event immediately upon receipt of the message.

Whenever a receiver gets a Trigger with a new locator_part, it can be expected to download the new TPT immediately, unless it already retrieved it using a URLList delivered with a previous TPT.

A description will be given of a watermarking ACR system inserting information directly. While the watermarking ACR system is not shown, the watermarking ACR system is not limited to the following description and may be changed by a designer.

In the case of a watermarking system that inserts the information receivers need directly, the watermark associated with a frame can follow the same rules as stated above for what a request/response ACR server would return for that frame as follows. The request/response ACR server can return one of Null, Time Base Trigger and Activation Trigger.

A Null response can indicate that the signature is not recognized, or (if the ACR Ingest Module includes signatures for frames in program segments with no interactive service) that the signature represents a frame which belongs to a segment that does not have an interactive service associated with it.

A Time Base Trigger response can indicate that no event activation is scheduled to take place before the client's next request. The client can be expected to use the Time Base Triggers to maintain a media-time clock.

An Activation Trigger response can indicate that an activation is due to take place soon, with the time of the activation indicated by the "t=" term in the Trigger.

In the case of a watermarking ACR system that is delivering the information receivers need by including the same directly in the watermarks, so that no ACR server is needed, an Ingest Module can follow the same rules as described for the request/response server model above to determine the Trigger to associate with each frame, but then include the Trigger in the watermark for the frame, rather than associate the Trigger with the frame in a Database. The ingest module and database will be described later.

A description will be given of support of stand-alone NRT services. This is not shown but the present invention is not limited to the following description and may be changed by a designer.

In order for a receiver in an ACR environment to obtain access to stand-alone NRT services, the broadcaster may need to support Internet access to the NRT services, and the receiver may need to obtain the SMT and the NRT-IT instances for the services.

A description will be given of a query protocol for obtaining PSIP tables and NRT tables over the Internet.

If a broadcaster supports this protocol for a particular broadcast stream, then a receiver that knows the URL of the broadcaster's Signaling Server for that broadcast stream can take the following steps.

First, the receiver can issue a query for the "Basic NRT Set" of tables for the broadcast stream, for a specified future time interval (for example, the next 12 hours).

Second, This will produce the SMT and ILT for each of the stand-alone NRT virtual channels, and the NRT-IT and TFT instances covering the specified time interval.

One way a receiver can discover the URL of the Signaling Server for a broadcast stream can be that the provider of an interactive service segment in the broadcast stream can choose to provide the Signaling Server URL in a URLList element delivered along with the TPT.

Another way a receiver can discover URLs of Signaling Servers can be by pre-configuration. In the same way that a DTV receiver manufacturer can pre-configure a DTV receiver to know how to find an ACR Server covering any particular broadcast area, a DTV receiver manufacturer can pre-configure a DTV receiver to know how to find an "NRT Discovery Server" covering any particular broadcast area. Such an NRT Discovery Server would be able to give the receiver a list of the broadcast streams that contain stand-alone NRT services, along with the Signaling Server URL for each one.

Figure 28:
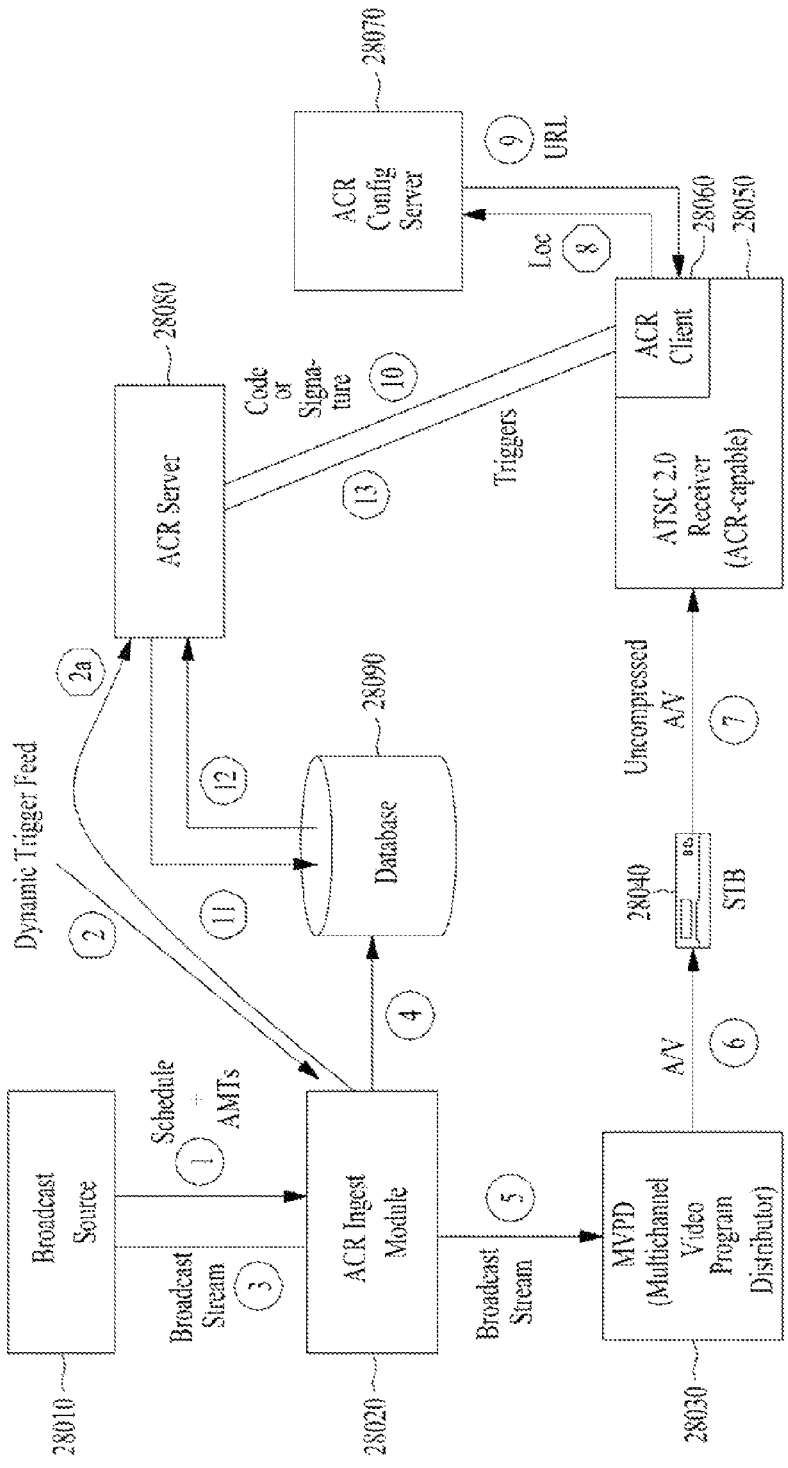
FIG. 28 is a diagram showing an embodiment of architecture for ACR server activations.

FIG. 28 is a diagram showing an embodiment of an architecture for ACR server activation.

Some ACR systems include an ACR server, and some ACR systems do not. In fingerprinting ACR systems, receivers can compute and send frame signatures to an ACR server, and the ACR server can send back the information needed by the receivers. Thus, fingerprinting ACR systems include an ACR server. In watermarking ACR systems, the watermarks may contain only codes that uniquely identify the frames, or the watermarks may contain the full information needed by receivers. When the watermarks contain only codes, receivers can extract the codes and send the same to an ACR server, and the ACR server sends back the information needed by the receivers. In the case when the watermarks include the full information, receivers can just extract the information they need directly from the watermarks, and no ACR server is needed.

In those ACR systems that include an ACR server, two different models can be commonly used for communication between the ACR servers and receivers: a request/response model and an event-driven model.

In the request/response ACR server model the receiver can be expected to compute signatures of, or extract codes from, the content periodically (e.g. every 5 seconds) and send requests containing the signatures or codes to an ACR server. When an ACR server gets a request from a receiver, it can return a response. The communications session is not kept open between request/response instances. In this model, it may not feasible for an ACR server to initiate messages to a receiver.

It is assumed that the broadcaster of the channel being processed is supporting the TDO interaction model.

There can be two general type of event activations: static activations in which the activation time is known before the broadcast of the segment begins, and dynamic activations in which the activation time in determined dynamically as the segment is being broadcast. In pre-recorded segments all of the event activations can be static. In segments that are broadcasting live shows, some or all of the event activations can be dynamic. Static activations are typically listed in the Activation Messages Table (AMT), although they might be delivered to receivers in the form of Activation Triggers. Dynamic activations can be delivered in the form of Activation Triggers, since their timing is not known at the time the AMT is generated.

FIG. 28 shows an architecture to support ACR systems that use an ACR server. This is a logical block diagram, not an implementation architecture. For example, the ACR Ingest Module could be co-located with the broadcast source, or it could be in a separate location.

In the architecture to support ACR systems that use an ACR server, the architecture may include a broadcast source 28010, an ACR ingest module 28020, an MVPD 28030, an STB 28040, a receiver 28050, an ACR client 28060, an ACR configuration server 28070, an ACR server 28080 and/or a database 28090.

The Broadcast Source 28010 can be a point from which the A/V stream and associated interactive services are transmitted, for example a network distribution point or a TV station.

The ACR Ingest Module 28020 can compute signatures (fingerprints) of frames, in the case of a fingerprinting ACR system, or insert watermarks including codes into frames, in the case of a watermarking ACR system that is based on codes. It can store in the database 28090 the media_time of each frame associated with a signature or code, together with other metadata. The ACR Ingest Module 28020 could handle a single channel in a broadcast stream, or an entire broadcast stream, or multiple broadcast streams, or any combination thereof. For the purposes, it is assumed that the ACR Ingest Module 28020 processes frames for program segments that contain an interactive service. However, it is possible to have ACR systems in which all frames are processed, but those that are not part of a segment with an interactive service have an indication in their database 28090 entry that they are not part of a segment with an interactive service.

A Multiprogram Video Program Distributor (MVPD) 28030 is typically a cable operator, satellite operator, or IPTV operator. It can receive the broadcast stream from the Broadcast Source in some way, with the watermarks inserted by the ACR Ingest Module 28020 in the case of a watermarking ACR system, such a system often strips out all the program elements other than audio and video tracks, and sends the resulting stream to set-top boxes (STBs) 28040 on customer premises.

The STB 28040 typically decodes (decompresses) the audio and video and sends the same to a TV set for presentation to viewers. We are assuming that DTV Closed Caption service #6, which contains interactive service Triggers, is not available to the TV Set.

The receiver 28050 may include the ACR client 28060. The ACR client 28060 may be disposed outside the receiver 28050. The structure of the receiver 28050 will be described later.

The ACR Client 28060 in the receiver 28050 can obtain Activation Triggers from the ACR Server 28080 and pass the same to the main receiver code, using an API provided for that purpose. Normally the ACR client 28060 would be built into the receiver 28050, but other configurations are possible.

The ACR Configuration Server 28070 can provide a way for ACR clients 28060 to determine the location of a suitable ACR Server 28080. This discovery process can be achieved in other ways.

The ACR Server 28080 can obtain signatures or codes from receivers and return Activation Triggers at appropriate times.

The database 28090 can be a data store of some kind, not necessarily a database in the strict sense of the term, in which information about audio or video frames (or both) is stored for the use of ACR servers 28080.

The architecture of an ACR system that uses direct delivery of information in watermarks could have no Database and no ACR Server. The ACR Ingest Module could insert information directly into the frames in the broadcast stream, in the form of watermarks, instead of inserting, into a database records that contain identifiers of frames and the information associated with the same. Receivers could then extract this information from the frames in the broadcast, instead of obtaining the same from an ACR server.

A description will be given of delivery of activation triggers via request/response ACR servers step by step. This is an embodiment of the present invention and a step may be omitted or new steps may be added or a sequence may be changed.

An efficient way to implement this ACR Server behavior is to follow the process described below, where the numbers of the actions in the process correspond to the numbers in the architecture diagram above, as shown in FIG. 28.

1) The broadcast schedule for the interactive service segments and the AMTs or their equivalents for each segment can be delivered to the ACR Ingest Module ahead of the time the segments are broadcast. The broadcast schedule can contain the segment ID, GPS start time and GPS end time of each segment that can contain an interactive service associated with it. If there are any last-minute changes to the broadcast schedule, the ACR Ingest Module can be notified of these changes immediately. The broadcast schedule could also contain the version number of the TPT for each segment, and the ACR Ingest Module could get notification in real time of any unscheduled changes in a TPT version, so that it can insert "version" ("v=") terms into Triggers when needed. The Ingest Module could also be configured to insert "spread" ("s=") terms into Triggers at suitable times, such as during a specified interval at the beginning of each segment (when many receivers are likely to be requesting new TPTs at the same time).

2) If there are any dynamic activations, links can be set up from sources of dynamic activations to the ACR Ingest Module.

3) The broadcast stream can be routed to the ACR Ingest Module.

4) The ACR Ingest Module can extract signatures from the frames (in the case of a fingerprint ACR system) or insert codes into the frames (in the case of a watermark ACR system), for all frames contained in segments that have an interactive service associated with them. (The ACR Ingest Module can determine whether a frame is in such a segment by using a GPS clock and the start times and end times of segments in the broadcast schedule.) For each such frame the ACR Ingest Module can insert a record in the Database that can include a Trigger and the signature or code associated with the frame. The rules for what Trigger gets inserted are described at the end of this list of actions in the process.

5) Broadcast Stream can continue on to the MVPD.

6) MVPD can route the Broadcast Stream to the STB at a subscriber's location (typically stripping out all of the interactive content first).

7) STB can decode the A/V and send the uncompressed A/V to the DTV receiver.

8) When the receiver is first turned on, it can send its location to an ACR Configuration Server. (The URL of the ACR Configuration Server can be built into the receiver.)

9) The ACR Configuration Server can send back the URL of an ACR Server for the receiver to use.

10) The ACR Client in the receiver can start extracting fingerprint signatures or watermark codes and sending them to the ACR Server.

11) When the ACR Server receives a signature or code, it can attempt to match it in the Database.

12) If the signature or code does not match any signature or code in the Database, then the ACR Server can get back a "no match" indicator. If the signature or code does match a signature or code in the Database, then the ACR Server can get back the record for the frame that has the matching signature or code. In the latter case the record in the Database can contain a Time Base Trigger, and/or it can contain one or more Activation Triggers, depending on what was inserted into the record for the frame by the ACR Ingest Module.

13) If the ACR Server gets back a "no match" indicator from the Database, it can return a NULL response to the ACR Client. Otherwise the ACR Server can return to the ACR Client the Trigger or Triggers it obtained.

The following rules can be used to determine what Trigger or Triggers the ACR Ingest Module inserts into each frame record in the Database.

Figure 29:
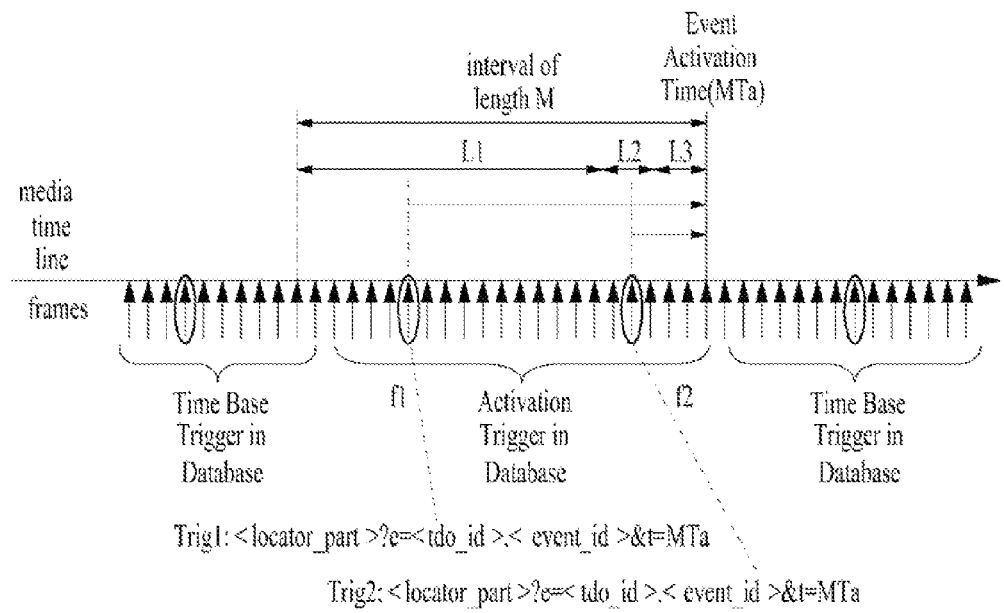
FIG. 29 is a diagram showing an embodiment of activation triggers in case (b) and case (a) without EndTime.

FIG. 29 is a diagram showing an embodiment of activation triggers in case (b) and case (a) without EndTime.

It can be assumed that there is some upper bound L1 on the length of the request intervals used by individual ACR clients in receivers. (It is not important whether the ACR clients know what this bound is, as long as they operate within it in practice.) Let L2 be the length of time it takes a typical ACR client to compute the signature or extract the watermark associated with a frame, counting from the time the frame arrives at the receiver. Let L3 be the typical round-trip time for a message to go from an ACR client to an ACR server and back. Let M=L1+L2+L3. (A slightly larger value of M could also be used—the advantage of a slightly larger value is that receivers get a little extra time to react to Activation Triggers; the disadvantage is that receivers are a little more likely to get multiple Activation Triggers for the same Event activation—which is not much of a problem, since they will be able to detect that they are duplicates, as explained below, and only apply the activation once.)

The ACR Ingest Module can insert only a Time Base Trigger in the record associated with a frame unless at least one of the following three conditions holds:

(a) There is an Activation element in the AMT such that the media_time of the frame is in the time interval beginning at time span M before the startTime of the Activation element and ending at the endTime of the Activation element. (If an Activation has no endTime, the endTime is considered equal to the startTime.)

(b) A dynamic Activation Trigger was received by the Ingest Module before the time interval of time span M immediately preceding the activation time of the Trigger ("t=<event_time>"), and the frame lies within that interval.

(c) A dynamic Activation Trigger was received by the Ingest Module later than the beginning of the interval of time span M immediately preceding the activation time of the Trigger, and the media_time of the frame is in the interval of time span L1 immediately following the receipt of the Trigger.

If any of the conditions (a), (b) or (c) holds, then an Activation Trigger can be included in the record, with an "e=" term to identify the Event to be activated, and a "t=" term to indicate the startTime of the Activation element in the AMT (for condition (a)) or the event_time of the dynamic Trigger (for condition (b)). The Trigger can also contain a version ("v=") term.

The reason for continuing to associate Activation Triggers with frames throughout the interval from the startTime to the endTime in case (a), is to accommodate receivers that join the channel partway through the interval.

Note that this approach requires no extra intelligence on the part of the ACR Server. It simply returns to the ACR Client the information it finds in the Database. All the intelligence can reside in the ACR Ingest Module. Moreover, the computations the ACR Ingest Module needs to do can be very simple.

With this scheme it is possible that a receiver can get more than one Activation Trigger (associated with different frames) for the same event activation. However, a receiver can easily see from the "t=" values that they all have the same activation time, so the receiver can determine that they are duplicates and activate the event only once.

In two of the situations above the "t=" term in the Activation Trigger can have an event_time earlier than the media_time of the frame with which it is associated. In situation (a), if the endTime of the Activation element is significantly later than the startTime, then a receiver can typically get multiple Activation Triggers throughout the interval between the startTime and the endTime, and they can all have the startTime as activation times. In situation (c), the Activation Triggers for the activation can get inserted into frame records so late that the Activation Trigger a receiver gets can come in response to a request with a signature for a frame that has media_time after the activation time. When a receiver gets an Activation Trigger with an event_time earlier than the media_time of the frame with which it is associated, it can be expected to activate the event immediately, unless it recognizes it as a duplicate of an Activation Trigger it has already seen and used to activate the event.

The purpose of using event_time values in the past, rather than "do it now" Triggers, for the situation when the frame media_time is later than the event_activation time is because a receiver can get more than one of these "after the fact" Activation Triggers. The "t=" values allow the receiver to determine that they all have the same activation time, and to activate the event only once.

FIG. 29 illustrates situation (b) and situation (a) when the Activation element in the AMT has no endTime attribute.

FIG. 29 shows an example of situation (a) in action (4) above, in the case when the Activation element in the AMT does not have an endTime. This can be also an example of situation (b) in step (4) above, where the ACR Ingest Module is sent a dynamic Activation Trigger at least M time units before its activation time.

FIG. 29 shows an event activation time above the time line, with an interval of length M preceding it, encompassing intervals of lengths L1, L2, and L3. The vertical arrows below the time line show the times of individual frames. Each frame preceding the beginning of the interval of length M, or following the event activation time, would have associated with it in the Database a Time Base Trigger. Each frame inside the interval of length M would have associated with it in the Database an Activation Trigger, such as the two examples (f1, f2) at the bottom of the figure. The "t=" term for each frame would indicate the event activation time relative to media_time (indicated by circled f1 and f2).

Four circled vertical arrows may represent an example when a typical receiver sends a request. In this example the receiver would get two Activation Triggers for the same event activation, but they would have the same event activation times, so the receiver would recognize them as duplicates and only apply the first one. Because the interval between receiver requests is less than L1, the receiver is guaranteed to make at least one request with a signature for a frame in the L1 interval shown in the diagram. This gives it time to compute the signature, send the request to the ACR server, and get the Activation Trigger back in response, all before the activation time. In this example, the first Activation Trigger the receiver gets would be delivered well ahead of time; the second Activation Trigger the receiver gets would barely arrive in time (it is a duplicate).

Figure 30:
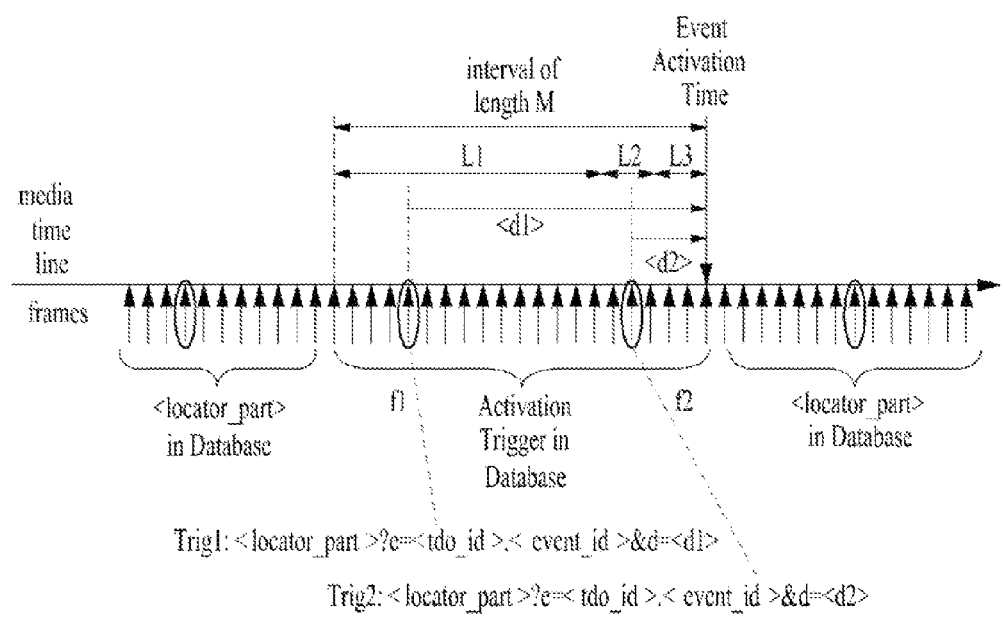
FIG. 30 is a diagram showing an embodiment of activation triggers in case (b) and case (a) without EndTime.

FIG. 30 is a diagram showing an embodiment of activation triggers in case (b) and case (a) without EndTime.

A description will be given of activation triggers in case (b) and case (a) without EndTime.

FIG. 30 shows an example of situation (a) in action (4) above, in the case when the Activation element in the AMT does not have an endTime. This is also an example of situation (b) in step (4) above, where the ACR Ingest Module is sent a dynamic Activation Trigger at least M time units before its activation time.

FIG. 30 shows an event activation time above the time line, with a preceding interval of length M, encompassing intervals of lengths L1, L2, and L3. The arrows below the time line show the times of individual frames. Each frame preceding the beginning of the interval of length M, or following the event activation time, would have associated with it in the Database a Trigger with no <media_time> or <event_time> terms. Each frame inside the interval of length M would have associated with it in the Database an Activation Trigger, such as the two examples at the bottom of the figure. The "d=" term for each frame would indicate the length of time between that frame and the event activation time (indicated by circled f1 and f2).

Four circled vertical arrows may represent an example when a typical receiver sends a request. In this example the receiver would get two Activation Triggers for the same event activation, but the activation times computed by adding the value <d1> to the receiver's local time for frame f1 or adding the value <d2> to the receiver's local time of frame f2 both give the same result, so the receiver would recognize them as duplicates and only apply the first one. Because the interval between receiver requests is less than L1, the receiver is guaranteed to make at least one request with a signature for a frame in the L1 interval shown in the diagram. This gives it time to compute the signature, send the request to the ACR server, and get the Activation Trigger in response, all before the activation time. In this example, the second Activation Trigger received by the receiver would arrive after the activation time.

Figure 31:
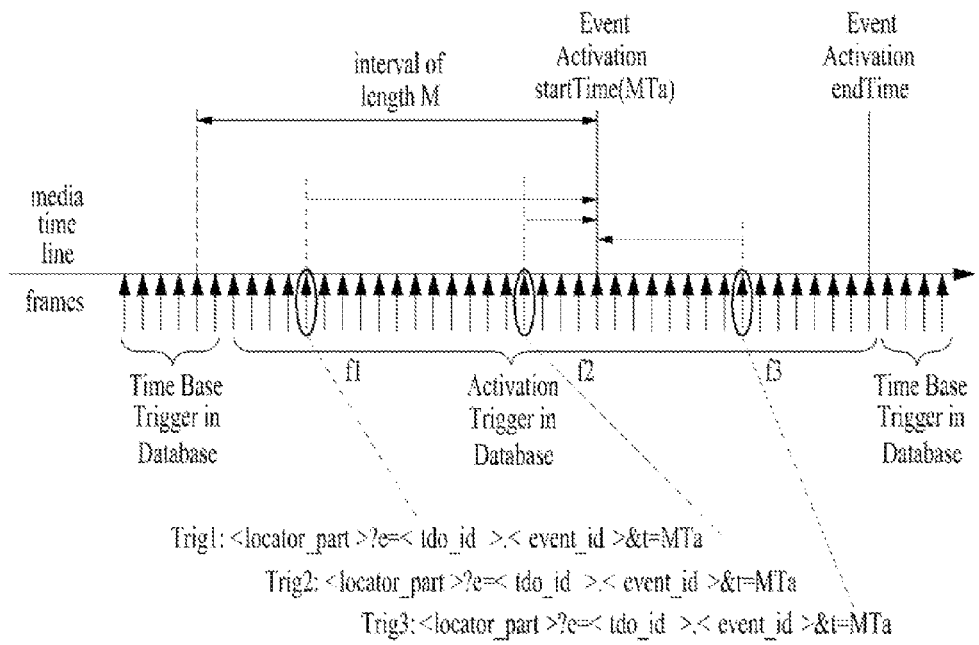
FIG. 31 is a diagram showing an embodiment of activation triggers in case (a) with EndTime.

FIG. 31 is a diagram showing an embodiment of activation triggers in case (a) with EndTime.

FIG. 31 illustrates situation (a) in action (4) above, in the case when the Activation element in the AMT has an endTime, as well as a startTime.

The figure shows an event activation startTime and endTime above the time line, with an interval of length M preceding the startTime. The arrows below the time line show the times of individual frames. Each frame preceding the beginning of the interval of length M, or following the event activation endTime, would have associated with it in the Database a Time Base Trigger. Each frame inside the interval of length M or between the startTime and endTime of the event activation would have an Activation Trigger associated with it in the Database, in the form shown by the three examples at the bottom of the figure. The "t=" term for each frame would indicate the event activation time, relative to the media_time line (indicated by circled f1, f2 and f3).

Three circled vertical arrows may represent an example when a typical receiver sends a request. In this case the receiver would get three Activation Triggers for the same event activation, but the activation times would all be the same, so the receiver would recognize the same as duplicates and only apply the first one.

Of course, the first two Activation Triggers shown in the diagram would not be seen at all by a receiver that joins the channel after the startTime and sends the signature of frame f3 with its first request.

Figure 32:
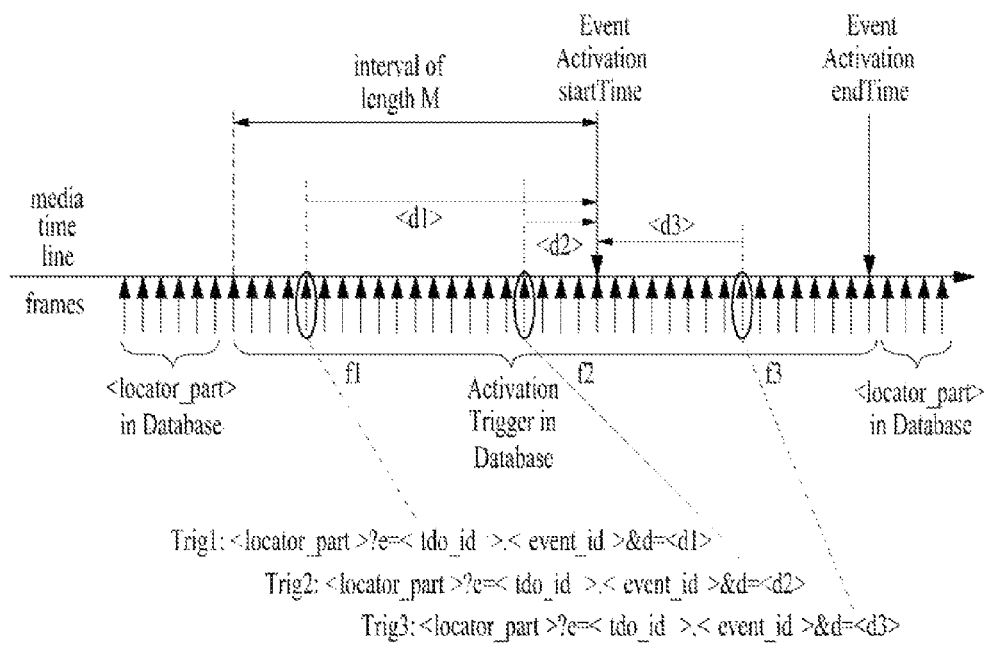
FIG. 32 is a diagram showing an embodiment of activation triggers in case (a) with EndTime.

FIG. 32 is a diagram showing an embodiment of activation triggers in case (a) with EndTime.

A description will be given of activation triggers in case (a) with EndTime.

FIG. 32 illustrates situation (a) in action (4) above, in the case when the Activation element in the AMT has an endTime, as well as a startTime.

The figure shows an event activation startTime and endTime above the time line, with an interval of length M preceding the startTime. The arrows below the time line show the times of individual frames. Each frame preceding the beginning of the interval of length M, or following the event activation endTime, would have associated with it in the Database a Trigger with no <media_time> or <event_time> terms. Each frame inside the interval of length M would have an Activation Trigger in the Database, in the form shown by the two examples at the bottom of the figure. The "d=" term for each frame would indicate the length of time between that frame and the event activation time (indicated by circled vertical arrows).

Circled vertical arrows may represent an example when a typical receiver sends a request. In this case the receiver would get three Activation Triggers for the same event activation, but the activation times computed by adding the value <d1> to the receiver's local time for frame f1 or adding the value <d2> to the receiver's local time of frame f2 or adding the (negative) value <d3> to the receiver's local time of frame f3 all give the same result, such that the receiver would recognize the same as duplicates and only apply the first one.

Of course, the first two Activation Triggers shown in the diagram would not be seen at all by a receiver that joins the channel after the startTime and sends the signature of frame f3 with its first request.

Figure 33:
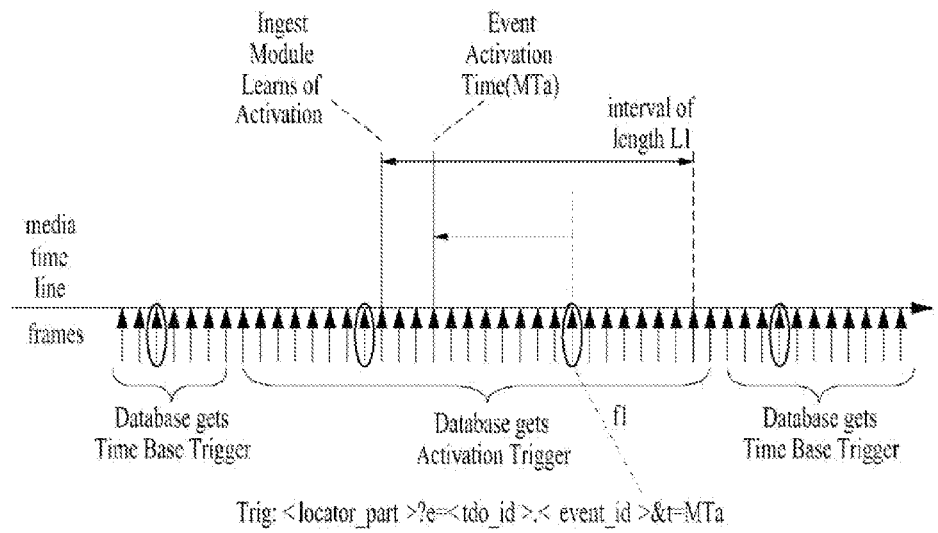
FIG. 33 is a diagram showing an embodiment of activation triggers for case (c)

FIG. 33 is a diagram showing an embodiment of activation triggers for case (c).

FIG. 33 illustrates situation (c) in action (4) above, where a dynamic Activation Trigger is sent to the ACR Ingest Module later than M time units before the Activation Time.

FIG. 33 shows a dynamic event activation time above the time line, and a time shortly preceding the event activation time when the ACR Ingest Module learns of the event actuation, with an interval of length L1 following the time when the ACR Ingest Module learns of the event activation. The vertical arrows below the time line show the times of individual frames. Each frame preceding the beginning of the interval of length L1, or following the end of the interval of length L1, would have a Time Base Trigger associated with it in the Database. Each frame inside the interval of length L1 would have an Activation Trigger in the Database, such as the one in the example at the bottom of the figure. The "t=" term for each frame would indicate the event activation time, relative to the media time line (indicated by circled vertical arrows). Circled vertical arrows may represent an example when a typical receiver sends a request. In this case the receiver would just one Activation Trigger for the event activation. Since the activation time of the Activation Trigger precedes the time it was received, the receiver would apply the Trigger immediately upon reception.

Figure 34:
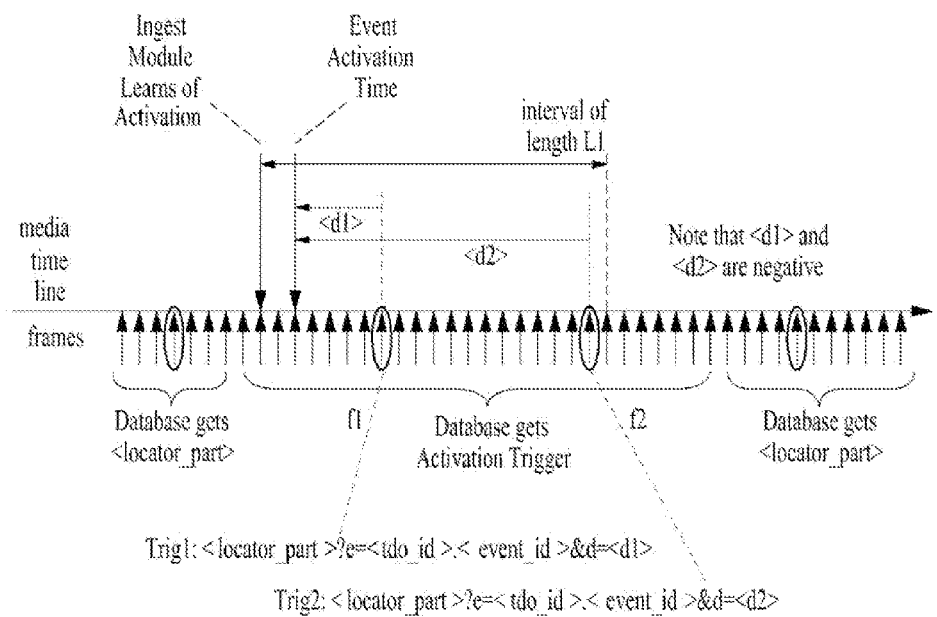
FIG. 34 is a diagram showing an embodiment of activation triggers for case (c)

FIG. 34 is a diagram showing an embodiment of activation triggers for case (c).

A description will be given of activation triggers for case (c).

FIG. 34 illustrates situation (c) in action (4) above, where a dynamic Activation Trigger is sent to the ACR Ingest Module later than M time units before the Activation Time.

FIG. 34 shows a dynamic event activation time above the time line, and a time shortly preceding the event activation time when the ACR Ingest Module learns of the event actuation, with an interval of length M following the time when the ACR Ingest Module learns of the event activation. The arrows below the time line show the times of individual frames. Each frame preceding the beginning of the interval of length M, or following the end of the interval of length M, would have a Trigger in the Database with no <media_time> or <event_time> terms. Each frame inside the interval of length M would have an Activation Trigger in the Database, such as those in the two examples at the bottom of the figure. The "d=" term for each frame would indicate the length of time between that frame and the event activation time (indicated by circled vertical arrows). Circled vertical arrows may represent an example when a typical receiver sends a request. In this case the receiver would get two Activation Triggers for the same event activation, but the activation times computed by adding the (negative) value <d1> to the receiver's local time for frame f1 and adding the (negative) value <d2> to the receiver's local time of frame f2 both give the same result, so the receiver would recognize them as duplicates, and only apply the first one it received. Since the activation time of the first Trigger is before the time it was received, the receiver would apply the Trigger immediately when it is received.

Figure 35:
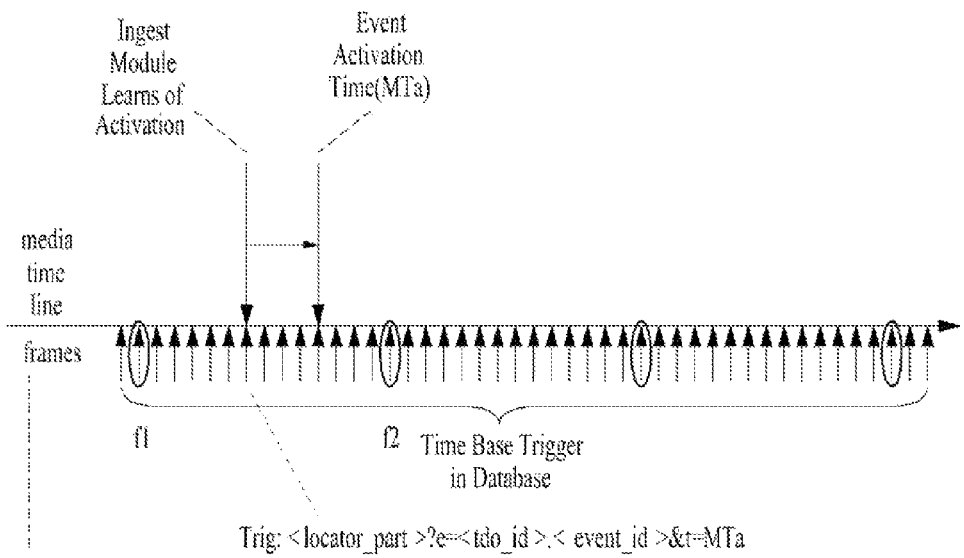
FIG. 35 is a diagram showing an embodiment of dynamic activation triggers delivered at last minute.

FIG. 35 is a diagram showing an embodiment of dynamic activation triggers delivered at Last Minute.

In the event driven ACR model the receiver can be expected to initiate a persistent connection to the ACR server, generate signatures associated with frames at regular intervals (e.g., every 5 seconds), and submit the signatures over the connection. The ACR server does not respond to each signature. It can send a message to the receiver when a new segment is detected or when an event activation needs to be communicated to the receiver. In this model, it is possible for the ACR server to initiate messages to the client at any time over the persistent connection.

Moreover, it is straightforward for the server to maintain a certain amount of information about each receiver, such as the segment ID (<locator_part> of a Trigger) corresponding to the most recent submission from the receiver and the recent Activation Triggers sent to the receiver.

For an ACR server that is using this event driven model and is delivering activations to receivers, the following rules can apply for messages from the ACR server.

First of all, when the ACR server receives a signature from a receiver that corresponds to a frame in a new segment, the ACR server can send a message to the receiver with a Time Base Trigger immediately, to enable the receiver to obtain the associated TPT.

Second, when the ACR server receives a signature from a receiver that corresponds to a frame in a part of a segment that has a new version number for the TPT (different from the most recent version the receiver has seen), the ACR server can send a message immediately to the receiver with a Time Base Trigger that has a "v=" term to enable the receiver to obtain the new version of the associated TPT.

Third, when an event is due to be activated, the ACR server can send an Activation Trigger to the receiver. If possible, it can send the Activation Trigger slightly ahead of the time when the receiver needs to apply it, with a "t=" term in the Activation Trigger to indicate the activation time relative to the media time line. (This is very similar to the behavior in the request/response model.) If the ACR server learns of the activation so late that it cannot send an Activation Trigger as far ahead of time as usual, it can send an Activation Trigger as soon as it does learn of the activation. (In this latter case, the receiver could get the Activation Trigger after its activation time, in which case it can be expected to activate the event as soon as it gets the Activation Trigger.)

The architecture for the Request/Response case shown in FIG. 28 is also suitable for this Event Driven case, with one difference. The difference is that for the Event Driven case there can be a new action (2a). If there are any dynamic Activation Triggers, then connections can be set up between the ACR Ingest Module and all ACR Servers that use the Database populated by the ACR Ingest Module, so that the ACR Ingest Module can send selected dynamic Activation Triggers to the ACR Servers.

The numbered actions for the Event Driven case can be similar to those for the Request/Response case. Besides the new action (2a), action (4) is a little different, action (13) is a little different, and a new action (14) is added.

In action (4) the ACR Ingest Module can extract signatures from the frames (in the case of a fingerprint ACR system) or insert codes into the frames (in the case of a watermark ACR system), for all frames contained in segments that have an interactive service associated with them. (The ACR Ingest Module can determine whether a frame is in such a segment by using a GPS clock and the start times and end times of segments in the broadcast schedule.) For each such frame the ACR Ingest Module can insert a record in the Database that can include the signature or code associated with the frame and a Trigger. The Trigger included in the record by the ACR Ingest Module can be a Time Base Trigger unless at least one of the following two conditions holds:

(a) There is an Activation element in the AMT such that the media_time of the frame is in the time interval beginning at time span M before the startTime of the Activation element and ending at the endTime of the Activation element. (If an activation has no endTime, the endTime is considered equal to the startTime.) (Same as condition (a) for the Request/Response ACR model)

(b) A dynamic Activation Trigger was received by the Ingest Module before the time interval of time span M immediately preceding the activation time of the Trigger ("t=<event_time>"), and the frame lies within that interval. (Same as condition (b) for the Request/Response ACR model)

If either of the conditions (a) or (b) holds, then an Activation Trigger can be included in the record, with an "e=" term to identify the Event to be activated, and a "t=" term to indicate the startTime of the Activation element in the AMT (for condition (a)) or the event_time of the dynamic Trigger (for condition (b)).

If a dynamic Activation Trigger is received by the Ingest Module during the interval of time span M immediately preceding the activation time of the Trigger (where M has the same meaning as in the request/response server case), then the Ingest Module can pass the Activation Trigger on to all the ACR Servers that are using the Database into which the Ingest Module can be inserting records, without putting anything in the Database concerning that dynamic Activation Trigger. (Variations on this architecture are possible in which dynamic Activation Triggers are passed directly from the dynamic Activation Trigger sources to the ACR servers without going through the Ingest Model, but the ACR servers get the dynamic Activation Triggers that arrive later than M time units ahead of the activation time, so that it can send a message to the relevant receivers immediately. It might be too late if it waits until the next receiver submissions.)

In action (13), if the ACR Server gets back a "no match" indicator from the Database after not receiving one for the immediately preceding submission, it can send a NULL message to the receiver. If it gets back a Trigger with a <locator_part> that is different from the <locator_part> it got back for the immediately preceding submission, it can send the Trigger to the receiver, In both cases this can tell the receiver that either the channel being viewed has been changed, or the segment being viewed has come to an end, so the receiver can terminate any TDO that is currently executing, and if necessary download a new TPT. If the ACR Server gets back one or more Activation Triggers, it can send them to the receiver, discarding any that are duplicates of Activation Triggers it has already sent to the receiver. Otherwise the ACR Server may do nothing.

In a new action (14), if an ACR Server receives a dynamic Activation Trigger, it can compare the <locator_part> of the dynamic Activation Trigger with the current <locator_part> for each of its ACR clients (where the current <locator_part> for a client is the <locator_part> of the Trigger that the ACR Server got from the Database for the most recent submission from the ACR client. For each client where the <locator_part> matches, the ACR Server can send the Activation Trigger to the client.

FIGS. 29 and 31 show the handling of Triggers for static activations and for dynamic activations that are delivered to the ACR Ingest Module at least M time units before their activation time. The difference is that the ACR Server can discard duplicate Activation Triggers, rather than sending them on to receivers.

FIG. 35 shows an example of the handling of a dynamic Activation Trigger received on short notice (less than M time units before its activation time).

FIG. 35 shows a dynamic event activation time above the time line, and a time shortly preceding the event activation time when the ACR Ingest Module learns of the event actuation. The vertical arrows below the time line show the times of individual frames. As soon as the ACR Server receives the Activation Trigger from the ACR Ingest Module, it can send the Activation Trigger to all receivers that are currently viewing the segment associated with the Activation Trigger (as identified by the <locator_part> of the Trigger).

Figure 36:
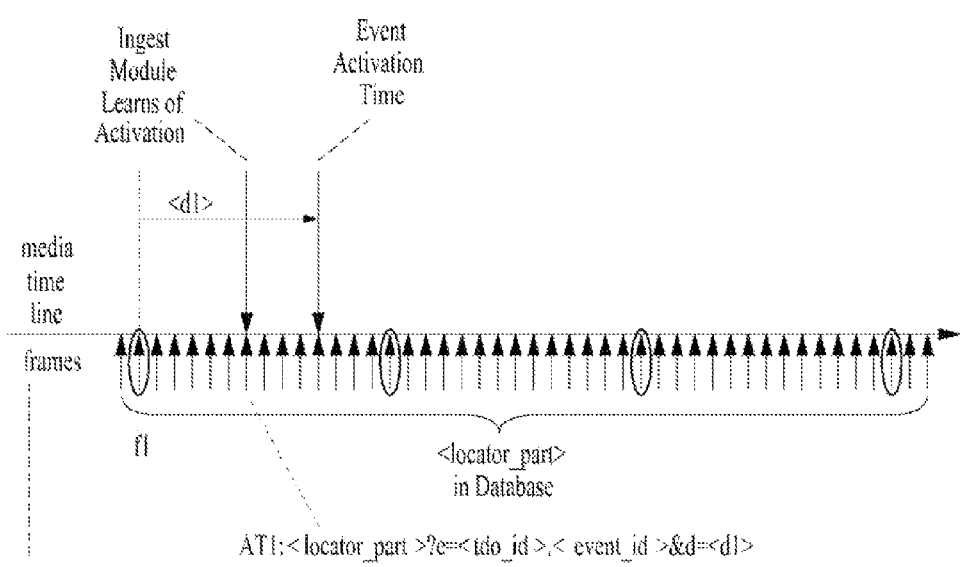
FIG. 36 is a diagram showing an embodiment of dynamic activation triggers delivered at last minute.

FIG. 36 is a diagram showing an embodiment of dynamic activation triggers delivered at Last Minute.

A description will be given of dynamic activation triggers delivered at Last Minute.

FIG. 36 shows an example of the handling of a dynamic Activation Trigger received on short notice (less than M time units before its activation time).

The figure, Dynamic Activation Triggers Delivered at Last Minute, shows a dynamic event activation time above the time line, and a time shortly preceding the event activation time when the ACR Ingest Module learns of the event actuation. The arrows below the time line show the times of individual frames. As soon as the ACR Server receives the Activation Trigger from the ACR Ingest Module, it can send the Activation Trigger to all receivers that are currently viewing the segment associated with the Activation Trigger (as identified by the <locator_part> of the Trigger). For each receiver it adjusts the event_time of the Trigger to a <delay_time> relative to the frame corresponding to the most recently submitted signature from the receiver.

Figure 37:
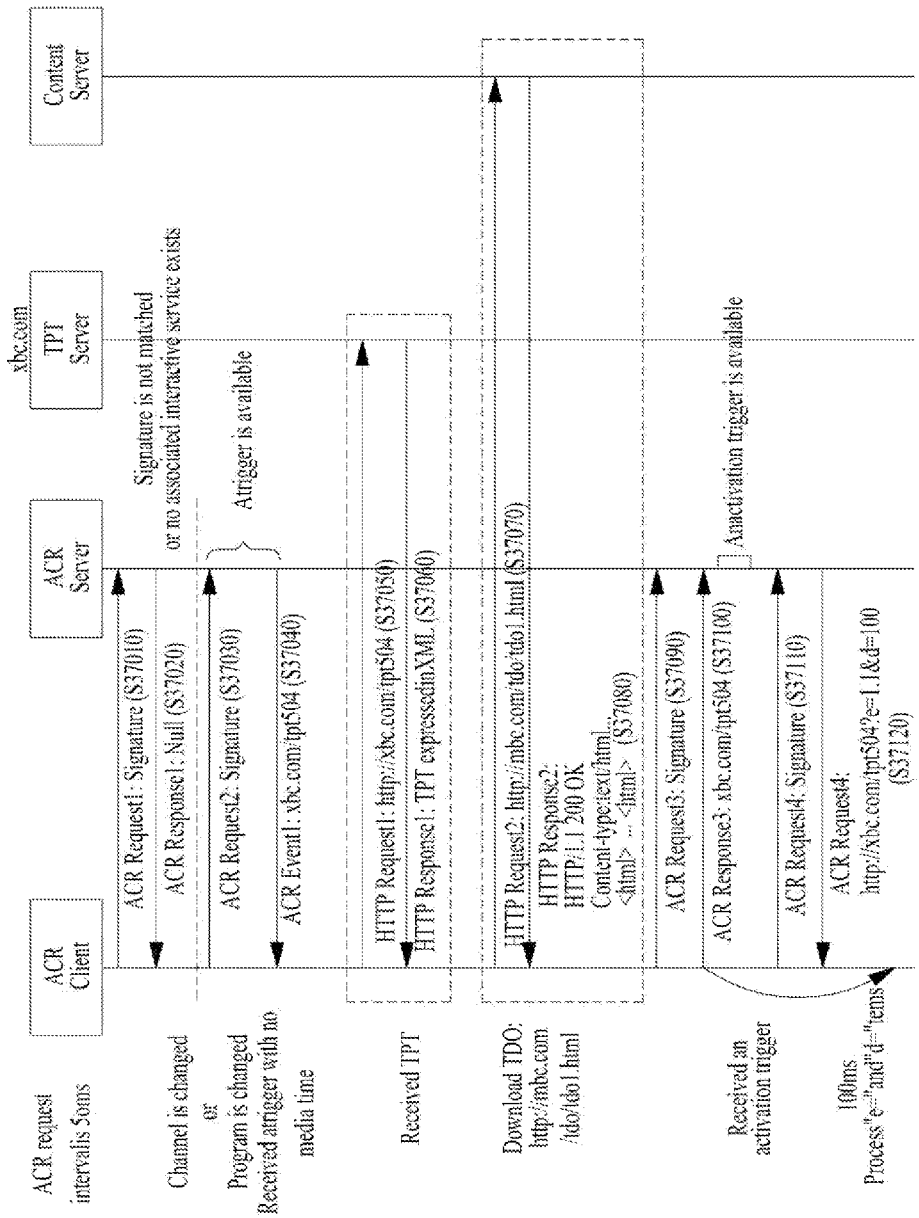
FIG. 37 is a sequence diagram between an ACR client and other servers in a request/response case.

FIG. 37 shows a sequence diagram between an ACR client and other servers in a request/response ACR case.

FIG. 37 shows a sequence diagram according to an embodiment of effectively transmitting a trigger and a TPT according to the operation protocol of the ACR server and the receiver (ACR client) in the request/response model.

An exemplary operation of the request/response model in the order of request and response will now be described.

The sequence diagram between the ACR client and other servers in a request/response ACR case may include ACR request 1 (S37010), ACR response 1 (S37020), ACR request 2 (S37030), ACR response 2 (S37040), HTTP request 1 (S37050), HTTP response 1 (S37060), HTTP request 2 (S37070), HTTP response 2 (S37080), ACR request 3 (S37090), ACR response 3 (S37100), ACR request 4 (S37110) and/or ACR response 4 (S37120).

ACR request 1 (S37010) is a step in which the receiver transmits the signature of a currently viewed program to a server. The server may be the above-described ACR server. The signature may be a fingerprint signature or a watermark.

ACR response 1 (S37020) is a step in which the ACR server returns NULL when the signature is not recognized or a related interactive service is not present. This may be a case corresponding to the above-mentioned case in which a NULL response is returned.

ACR request 2 (S37030) is a step in which, when the channel or program is changed, the receiver transmits the signature of the changed program to the ACR server.

ACR response 2 (S37040) is a step in which the ACR server returns a trigger (e.g. xbc.com/tpt504) including an address by which an interactive service related to the corresponding program can be obtained. This step may correspond to a case in which the signature is recognized and a related interactive service is present, unlink ACR response 1 (S37020). That is, a trigger is available in this step. In this case, the returned trigger may be a time based trigger having no information about media time.

HTTP request 1 (S37050) is a step in which the receiver requests the TPT server (e.g. http://xbc.com/tpt504) to provide a corresponding TPT using the address received in ACR response 2 (S37040) through the http protocol.

HTTP response 1 (s37060) is a step in which the TPT server transmits the TPT represented in XML at the request of the receiver.

HTTP request 2 (S37070) is a step in which the receiver requests the content server to provide an application such as TDO using the http protocol. The receiver can parse TDO related information included in the TPT. The TDO related information may be the URL of the content server through which a TDO can be downloaded. A request can be sent using the URL of the content server.

HTTP response 2 (S37080) is a step in which the content server transmits the corresponding TDO at the request of the receiver.

ACR request 3 (S37090) is a step in which the receiver sends the signature of a frame of the currently viewed program to the ACR server.

ACR response 3 (S37100) is a step in which the ACR server returns a trigger (e.g. xbc.com/tpt504) including an address through which an interactive service related to the corresponding program can be obtained. In this case, the signature is recognized and the related interactive service is present, unlike ACR response 1 (S37020). That is, a trigger is available in this step.

ACR request 4 (S37110) is a step in which the receiver transmits the signature of a frame of the currently viewed program to the ACR server.

ACR response 4 (S37120) is a step in which the ACR server transmits an activation trigger related to the interactive service related to the signature transmitted from the receiver. A specific event can be activated at a specific time according to the activation trigger.

Figure 38:
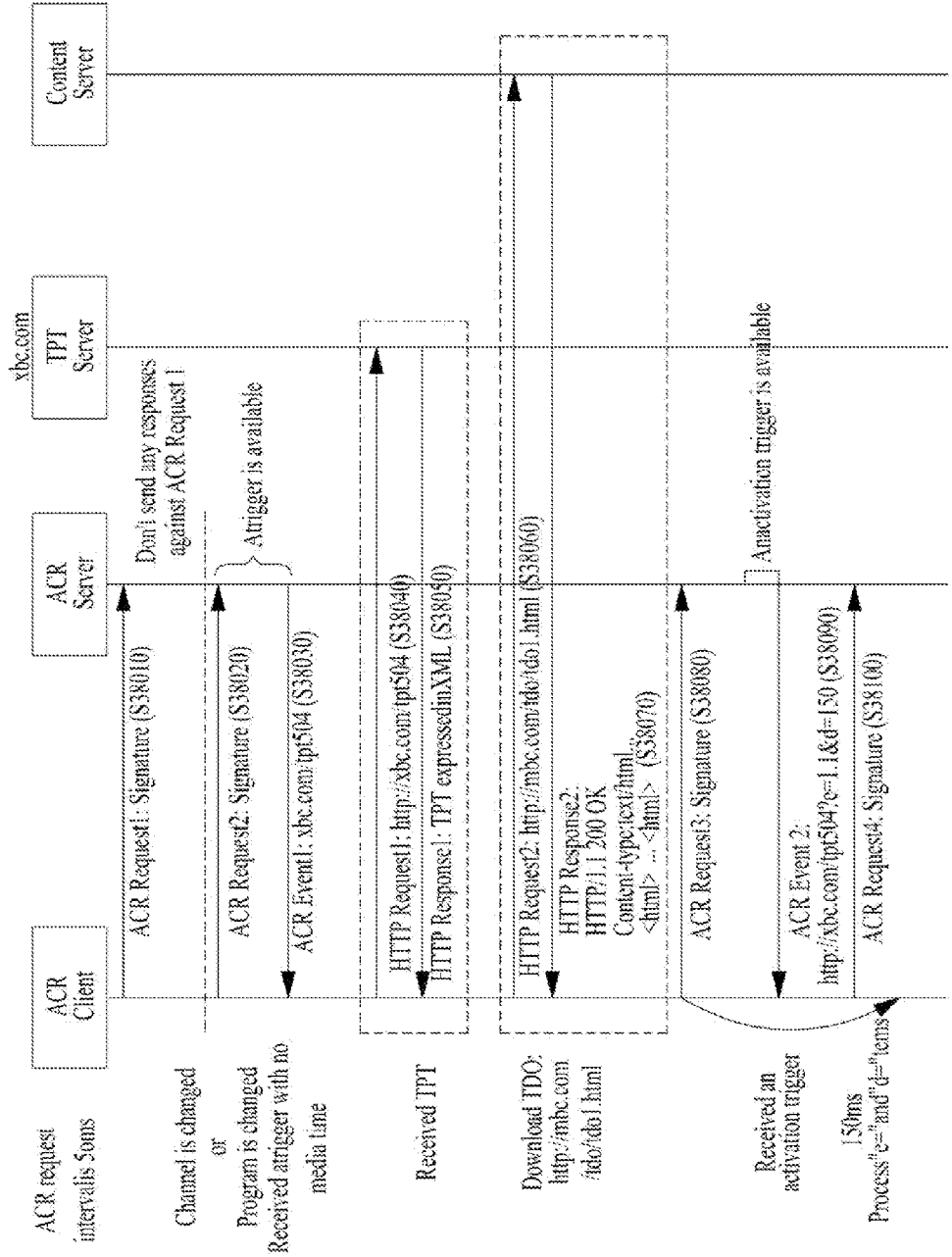
FIG. 38 is a sequence diagram between an ACR client and other servers in an event-driven ACR case.

FIG. 38 shows a sequence diagram between the ACR client and other servers in an event-driven ACR case.

FIG. 38 shows a sequence diagram according to an embodiment of effectively transmitting a trigger and a TPT according to the operation protocol of the ACR server and the receiver (ACR client) in an event-driven model.

An exemplary operation of the event-driven model in the order of request, response to the request and event will now be described.

The sequence diagram between the ACR client and other servers in an event-driven ACR case may include ACR request 1 (S38010), ACR request 2 (S38020), ACR event 1 (S37030), HTTP request 1 (S38040), HTTP response 1 (S38050), HTTP request 2 (S38060), HTTP response 2 (S38070), ACR request 3 (S38080), ACR event 2 (S38090) and/or ACR response 4 (S38100).

ACR request 1 (S38010) is a step in which the receiver transmits the signature of a currently viewed program to a server. The server may be the above-described ACR server. The signature may be a fingerprint signature or a watermark. Here, when the signature is not recognized or a related interactive service is not present, the ACR server may send no response to ACR request 1 without returning NULL, unlike the sequence of FIG. 37.

ACR request 2 (S38020) is a step in which, when the channel or program is changed, the receiver transmits the signature of the changed program to the ACR server.

ACR event 1 (S38030) is a step in which the ACR server returns a trigger (e.g. xbc.com/tpt504) including an address by which an interactive service related to the corresponding program can be obtained. This step may correspond to a case in which the signature is recognized and a related interactive service is present. That is, a trigger is available in this step. In this case, the returned trigger may be a time based trigger having no information about media_time.

HTTP request 1 (S38040) is a step in which the receiver requests the TPT server (e.g. http://xbc.com/tpt504) to provide a corresponding TPT using the address received in ACR event 1 (S38030) through the http protocol.

HTTP response 1 (s38050) is a step in which the TPT server transmits the TPT represented in XML at the request of the receiver.

HTTP request 2 (S38060) is a step in which the receiver requests the content server to provide an application such as TDO using the http protocol. The receiver can parse TDO related information included in the TPT. The TDO related information may be the URL of the content server through which a TDO can be downloaded. A request can be sent using the URL of the content server.

HTTP response 2 (S38070) is a step in which the content server transmits the corresponding TDO at the request of the receiver.

ACR request 3 (S38080) is a step in which the receiver sends the signature of a frame of the currently viewed program to the ACR server.

ACR event 2 (S38090) is a step in which the ACR server transmits an activation trigger related to the interactive service related to the signature transmitted from the receiver. A specific event can be activated at a specific time according to the activation trigger.

ACR request 4 (S38100) is a step in which the receiver transmits the signature of a frame of the currently viewed program to the ACR server.

Figure 39:
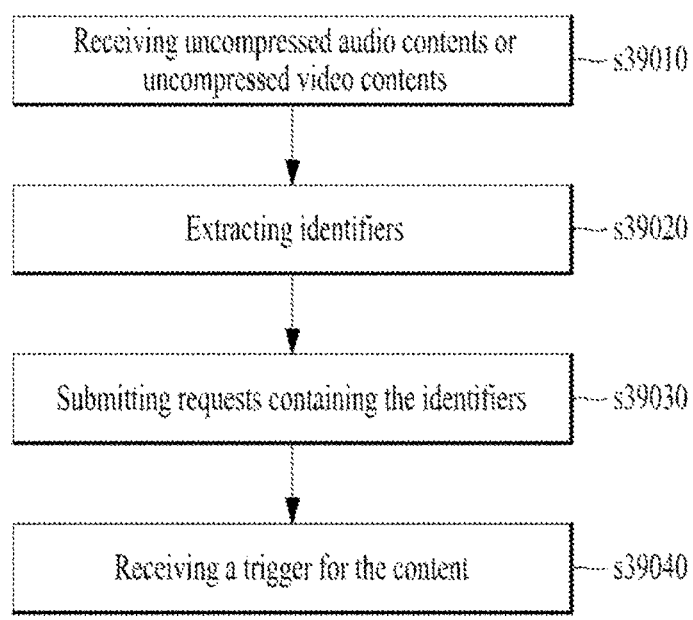
FIG. 39 is a diagram showing an embodiment of a method of processing an interactive service at a receiver in an event driven model.

FIG. 39 is a diagram showing an embodiment of a method of processing an interactive service at a receiver in the event driven model.

An embodiment of a method of processing an interactive service at a receiver in the event driven model may include receiving uncompressed audio content or uncompressed video content (S39010), extracting identifiers (S39020), submitting requests containing the identifiers (S39030) and/or receiving a trigger for the content (S39040).

Receiving uncompressed audio content or uncompressed video content (S39010) is a step in which the receiver receives uncompressed audio content or uncompressed video content from an external decoding unit.

Here, the external decoding unit may be the above-described STB. The STB will be described in detail later.

The uncompressed audio content or uncompressed video content may be audio/video content transmitted from the above-described STB (external decoding unit) to the receiver.

The external decoding unit may decompress A/V content received from an MVPD or the like and deliver the decompressed A/V content to the receiver. The receiver may receive the uncompressed audio content or uncompressed video content from the external decoding unit and display the received content to a viewer. The uncompressed audio content or uncompressed video content may have been processed according to the above-mentioned ACR ingest module. That is, the ACR ingest module can compute signatures (fingerprints) of frames, in the case of a fingerprinting ACR system, or insert watermarks including codes into frames, in the case of a watermarking ACR system that is based on codes. Here, frames may relate to audio/video content before being decoded/decompressed by the STB. The ACR ingest module can store, in the database, the media_time of each frame associated with a signature or code, together with other metadata.

Extracting identifiers (S39020) is a step in which the receiver periodically extracts identifiers from a plurality of frames of the received uncompressed audio content or uncompressed video content.

An identifier may identify a frame of the received content. The identifier may be a fingerprint signature or a watermark code. The present embodiment is not limited to fingerprinting or watermarking.

Here, 'extracting' is a process of periodically extracting identifiers from a plurality of frames of the received uncompressed audio content or uncompressed video content and may correspond to the above-described 'computing the signature', 'extracting the watermark' and 'generating the signature'.

In addition, 'extracting' may be an operation performed in the above-described ACR client. However, this is an exemplary and the spirit of the present invention is not limited thereto and 'extracting' may be performed in other modules according to intention of a designer. The ACR client may be disposed in the receiver.

In extracting identifiers (S39020), an identifier corresponding to a single frame may be extracted. Extracting may be periodically performed. Extracted identifiers may be sent to the ACR server, as described above. The ACR server may match the received identifiers with records in a database, as described above. The ACR server and the database may be the above-described ACR server and database. The records in the database may be records previously stored by the ACR ingest module.

In an embodiment of the present invention, an identifier extraction cycle may be 5 seconds. The identifier extraction cycle may be changed according to intention of the designer.

Submitting requests containing the identifiers (S39030) is a step in which requests including the extracted identifiers are sent to a server.

The extracted identifiers may be fingerprint signatures or watermark codes. The present embodiment is not limited to fingerprinting or watermarking.

Here, a request may include an identifier. The receiver may periodically transmit a request to a server. A single request may include a single identifier. A period may be changed by the designer.

The server may be the above-described ACR server. The server may receive a request and match the request with records in a database. The ACR server and database may be the above-mentioned ACR server and database. The records in the database may be records previously stored by the ACR ingest module.

Receiving a trigger for the content (S39040) is a step in which a trigger is received from the server according to whether or not the requests and identifiers sent to the server are matched to records in the database or triggers present in matched records.

The receiver does not receive a response in any case for the above-described requests. The receiver can receive the trigger when a new segment is detected or when an event activation needs to be communicated to the receiver. In other cases, the receiver may not receive the trigger. However, the receiver may receive the trigger in cases other than the above-mentioned case according to intention of the designer.

Here, the segment may be the above-described interactive service segment.

The new segment may refer to a segment to be used after the current application parameter table or TPT.

Here, when event activation needs to be communicated to the receiver may mean a case in which event activation is scheduled or a case in which an event that needs to be activated is not yet activated.

The trigger may relate to the content received by the receiver from the STB.

The content may be the content received from the STB.

Here, the trigger can indicate the current time of the content and reference a particular interactive event in an application parameter table or signal that the event is to be executed now or at a specified time in the future.

Here, the application parameter table can include information about at least one application.

The server may be the above-described ACR server. The database may be the above-described database. The identifiers may be fingerprint signatures or watermark codes. The present embodiment is not limited to fingerprinting or watermarking.

The server may match the received requests/identifiers with records in the database. The requests/identifiers may be matched to records previously stored in the database by the ACR ingest module. When an identifier is matched to an identifier stored in the database, the server may receive the record related to the identifier from the database. In this case, the record may include a time based trigger or an activation trigger. Which trigger is included in the record may depend upon which trigger is previously inserted into the record by the ACR ingest module. Upon reception of the record from the database, the server may send the received trigger or triggers to the receiver. Here, the server can send the trigger or triggers only in the above-limited specific case unlike the request/response model. In other cases, the server may transmit no response to the receiver.

In the embodiment of the present invention, the trigger can be a time based trigger when the identifier corresponds to the new segment, and the time based trigger can be used to enable the receiver to obtain a new application parameter table associated with the new segment. The time based trigger may conform to the above-described time based trigger operation.

In the embodiment of the present invention, the trigger can be an activation trigger whenever the event is due to be activated, and the activation trigger sets an activation time for the event. The activation trigger may conform to the above-described activation trigger operation. The activation trigger may be applied to an event of an application to cause activation at a specific time. A viewer can be provided with an interactive service through event activation. In the case of activation trigger delivery according to an embodiment of the present invention, an interactive server can be provided in the above-described ACR environments, that is, when the receiver has Internet connections and access to uncompressed audio and video from a broadcast stream.

In the embodiment of the present invention, the activation trigger can be applied once, when the receiver receives more than one activation trigger for same event activation. As described above, the receiver can receive a plurality of activation triggers for the same event activation. According to an embodiment of the present invention, identifiers may be periodically extracted and transmitted to the server. Here, a plurality of activation triggers can be received as responses to periodic requests. In this case, the activation triggers have the same "t=" term and thus the receiver can recognize that the activation triggers are duplicates and apply only one activation trigger, as described above.

In the embodiment of the present invention, the activation trigger can be received ahead of the time when the receiver needs to apply the activation trigger. By doing so, the event can be activated at the correct activation time. This embodiment may correspond to the above-described static activation.

In the embodiment of the present invention, the event can be activated immediately upon receipt of the activation trigger, when the activation trigger is received after the activation time. This embodiment may correspond to the above-described dynamic activation. When the server recognizes the activation late such that the server cannot transmit the activation trigger to the receiver, the server can wait for the next request of the receiver and then send the activation trigger as a response to the next request. In this case, the activation trigger may indicate past activation time. Here, the receiver can apply the activation trigger as soon as the receiver receives the activation trigger.

In the embodiment of the present invention, the method of processing an interactive service may further include immediately downloading a new application parameter table. The receiver immediately downloads the new application parameter table unless the receiver has already retrieved the new application parameter table using URL information delivered with the application parameter table, when the trigger includes an application parameter table identifier which identifies the new application parameter table. As described above, when the receiver receives a trigger having a new application parameter table identifier, the receiver can obtain new information in provision of an interactive service with respect to a related segment by downloading the new application parameter table (e.g. TPT). In an embodiment of the present invention, the receiver can request an application parameter table server to provide a new application parameter table using the http protocol and download the new application parameter table. Here, the application parameter table may be in XML or binary format according to an embodiment of the present invention. The application parameter table identifier may be the above-described locator_part. Here, the URL information may be the above-described URLList.

In the embodiment of the present invention, the time can be a media time, and the media time can be a parameter referencing a point in the playout of a content item.

In the embodiment of the present invention, the application is a Declarative Object, a Triggered Declarative Object, a Non-Real Time Declarative Object or an Unbound Declarative Object.

In the embodiment of the present invention, a communication session may be closed unless a request and a response are transmitted and received. The communication session is not kept open between request instances. The receiver may receive a response through a communication session when the communication session is kept open.

In the embodiment of the present invention, the server instead of the receiver may send a message first. That is, it is possible for the server (e.g., ACR server) to transmit messages to the client (e.g., receiver) at any time.

In the embodiment of the present invention, the server may not need extra intelligence. The server may merely deliver information found from the database to the receiver (e.g. ACR client). The ACR ingest module may take charge of intelligence with respect to operation of the present invention.

Figure 40:
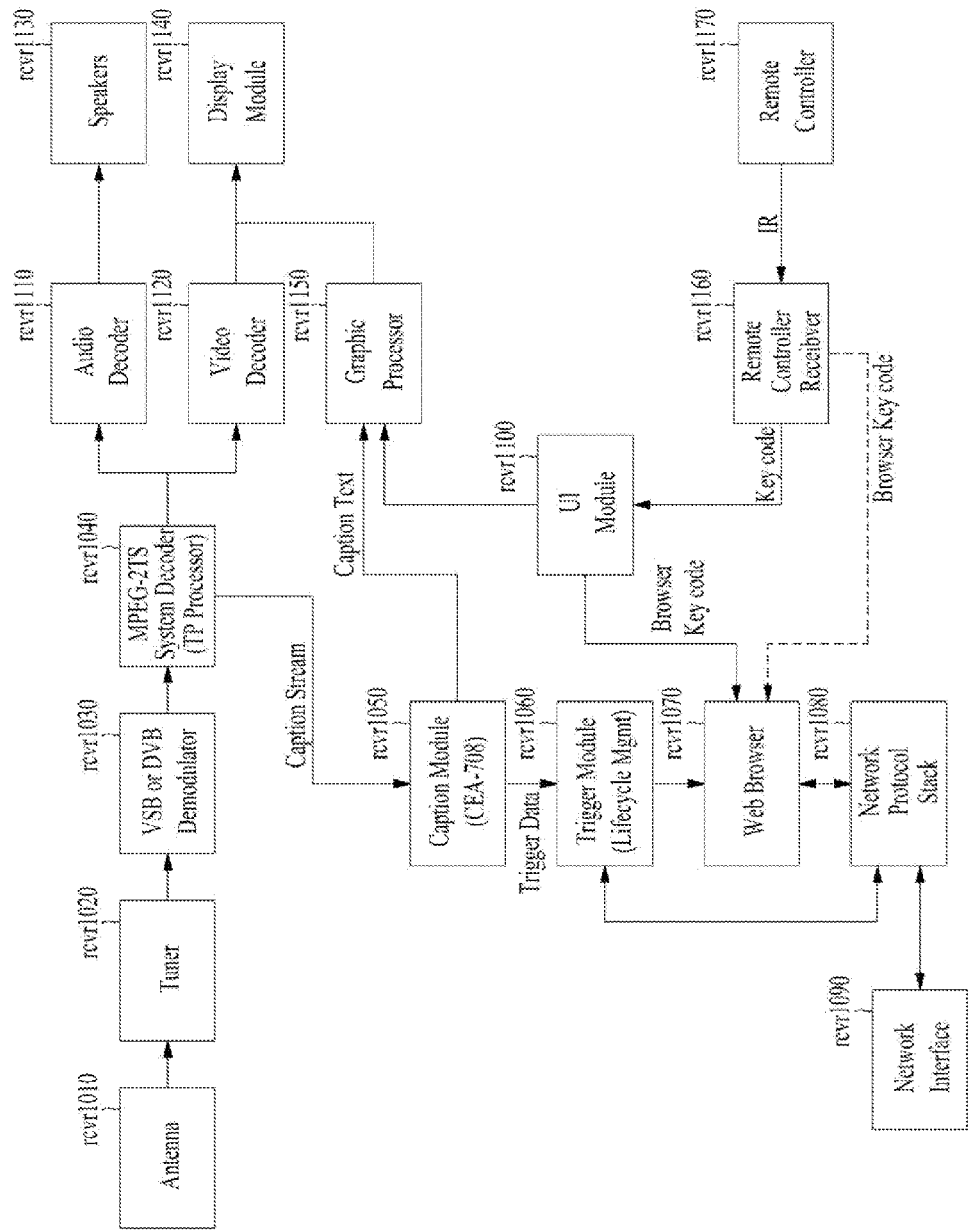
FIG. 40 is a diagram showing the structure of a receiver according to an embodiment of the present invention.

FIG. 40 is a diagram showing the structure of a receiver according to an embodiment of the present invention.

In the embodiment of the present invention, the receiver may include an antenna rcvr1010, a tuner rcvr1020, a VSB or DVB demodulator rcvr1030, an MPEG-2TS System Decoder rcvr1040, a caption module rcvr1050, a trigger module rcvr1060, a web browser rcvr1070, a network protocol stack rcvr1080, a network interface rcvr1090, a UI module rcvr1100, an audio decoder rcvr1110, a video decoder rcvr1120, a speaker rcvr1130, a display module rcvr1140, a graphic processor rcvr1150, a remote controller receiver rcvr1160 and/or a remote controller rcvr1170.

The antenna rcvr1010 may receive a broadcast signal according to a broadcast stream. Here, the antenna rcvr1010 may be one generally used in the technical field.

The tuner rcvr1020 may seek or tune to a channel of the receiver and may include a radio frequency amplifier, a local oscillator, a frequency conversion and input circuit, a seeker, etc. The tuner rcvr1020 may be one generally used in the technical field.

The VSB or DVB demodulator rcvr1030 may modulate a VSB signal or a DVB signal. The VSB or DVB demodulator rcvr1030 may restore the modulated VSB or DVB (e.g., OFDM-modulated signal) to an original signal. The demodulation process of the VSB or DVB demodulator rcvr1030 may be one generally used in the technical field.

The MPEG-2TS System Decoder rcvr1040 decodes the transport stream (TS) of the demodulated signal. The MPEG-2TS System Decoder rcvr1040 may obtain and deliver a caption stream from the transport stream to the caption module rcvr1050. The MPEG-2TS System Decoder rcvr1040 may send the decoded audio and video signal to the audio/video decoder rcvr1120.

The caption module rcvr1050 may receive the caption stream. The caption module rcvr1050 may monitor service #6 or other services and determine whether service #6 or services for transmitting the trigger is selected and sent to the trigger module rcvr1060 or whether caption text is processed and displayed on a screen. Trigger data may be delivered to the trigger module rcvr1060. Other caption services may be subjected to caption text processing and sent to the graphic processor rcvr1150.

The trigger module rcvr1060 may parse trigger, TPT and/or AMT information and process the parsed data. The trigger module rcvr1060 may access the network via the network protocol stack rcvr1080 using the URI information value of the trigger. The URI information value may be the address of the HTTP server. The trigger module rcvr1060 may analyze the TPT file content to obtain the TDO URL. In addition, the trigger module rcvr1060 may parse the AMT to process data. Other information may be obtained through parsing. After the AMT message has been received, the TDO URL corresponding to the web browser is delivered according to a predetermined time and operation or the currently operating TDO may be stopped at a predetermined time. This corresponds to a TDO action and the trigger module rcvr1060 may send a command to the web browser to operate. The operation of the trigger module rcvr1060 related to the present invention will be described in detail below.

The web browser rcvr1070 may receive the command from the trigger module rcvr1060, a browser key code from the UI module rcvr1100 and a browser key code from the remote controller receiver rcvr1160 and communicate with the network protocol stack rcvr1080.

The network protocol stack rcvr1080 may communicate with the trigger module rcvr1060 and the web browser to access the server via the network interface rcvr1090.

The network interface rcvr1090 performs common connection of several other apparatuses or connection of a network computer and an external network. The network interface may be connected to the server to download a TDO, a TPT, an AMT, etc. Here, operation of the network interface rcvr1090 may be operation of the network interface rcvr1090 one generally used in the technical field. Operation of the network interface rcvr1090 related to the present invention will be described in detail below.

The UI module rcvr1100 may receive information input by a viewer using the remote controller rcvr1170 through the remote controller receiver rcvr1160. If the received information is related to a service using the network, the browser key code may be delivered to the web browser. If the received information is related to currently displayed video, the signal may be delivered to the display module rcvr1140 via the graphic processor rcvr1150.

The audio decoder rcvr1110 may decode the audio signal received from the MPEG-2TS System Decoder rcvr1040. Thereafter, the decoded audio signal may be sent to the speaker and output to the viewer. Here, the audio decoder rcvr1110 may be one generally used in the technical field.

The video decoder rcvr1120 may decode the video signal received from the MPEG-2TS System Decoder rcvr1040. Thereafter, the decoded video signal may be sent to the display module rcvr1140 to be output to the viewer. Here, the video decoder rcvr1120 may be one generally used in the technical field.

The speakers rcvr1130 may output the audio signal to the viewer. The speaker may be one generally used in the technical field.

The display module rcvr1140 may output the video signal to the viewer. The display module rcvr1140 may be one generally used in the technical field. Operation of the display module rcvr1140 related to the present invention will be described in detail below.

The graphic processor rcvr1150 may perform graphic processing with respect to the caption text received from the caption module rcvr1050 and the viewer input information received from the UI module rcvr1100. The processed information may be delivered to the display module rcvr1140. The graphic processor rcvr1150 may be one generally used in the technical field.

The remote controller receiver rcvr1160 may receive information from the remote controller rcvr1170. At this time, the key code may be delivered to the UI module rcvr1100 and the browser key code may be delivered to the web browser.

The remote controller rcvr1170 delivers the signal input by the viewer to the remote controller receiver rcvr1160. The remote controller rcvr1170 may receive viewer input for changing a virtual channel. In addition, the remote controller may receive information selected by the viewer with respect to the application. The remote controller rcvr1170 may deliver the received information to the remote controller receiver rcvr1160. At this time, the information may be remotely delivered using infrared (IR) light at a distance out of a predetermined range.

Figure 41:
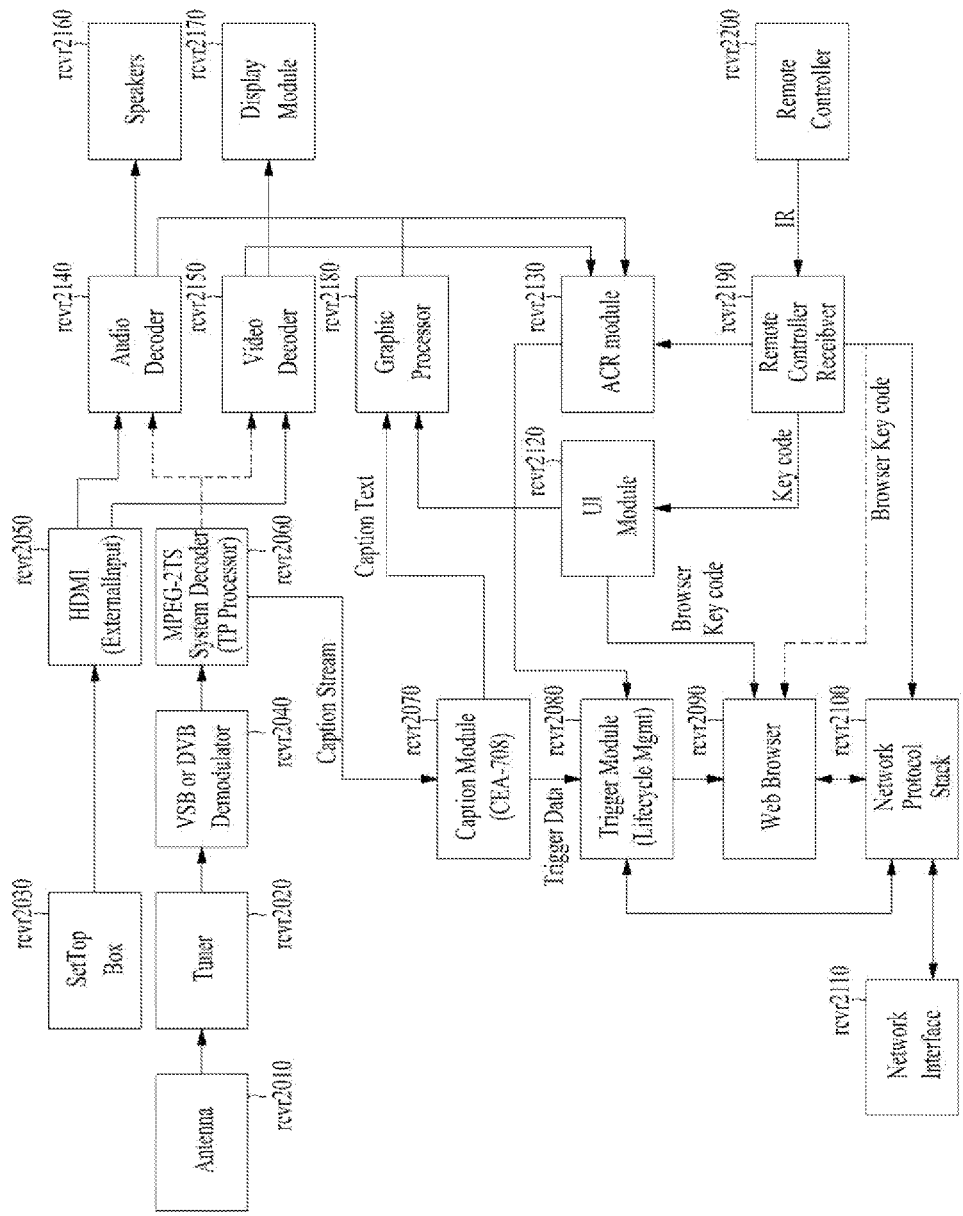
FIG. 41 is a diagram showing the structure of a receiver according to an embodiment of the present invention in the case in which a set top box receives a broadcast via a high definition multimedia interface (HDMI) or an external interface.

FIG. 41 is a diagram showing the structure of a receiver according to an embodiment of the present invention in the case in which a set top box receives a broadcast via a high definition multimedia interface (HDMI) or an external interface.

In the embodiment of the present invention shown in FIG. 41, the receiver may include an antenna rcvr2010, a tuner rcvr2020, a Set-Top Box rcvr2030, a VSB or DVB demodulator rcvr2040, a HDMI RCVR2050, a MPEG-2 TS system decoder rcvr2060, a caption module rcvr2070, a trigger module rcvr2080, a web browser rcvr2090, a network protocol stack rcvr2100, a network interface rcvr2110, a UI module rcvr2120, an ACR module rcvr2130, an audio decoder rcvr2140, a video decoder rcvr2150, a speaker rcvr2160, a display module rcvr2170, a graphic processor rcvr2180, a remote controller receiver rcvr2190 and/or a remote controller rcvr2200.

In this case, since video and audio of a broadcast stream is raw data, a trigger included in a caption stream may not be received. Details of the present invention will be described below.

Here, the modules excluding the Set-Top Box rcvr2030, the HDMI rcvr2050 and the ACR module rcvr2130 are similar to the modules described in the embodiment of FIG. 40 in terms of the role.

The Set-Top Box rcvr2030, the HDMI rcvr2050 and the ACR module rcvr2130 will now be described.

The Set-Top Box rcvr2030 may restore a compressed signal received from the video server through a digital network to an original video and audio signal. The TV may be an Internet user interface.

The HDMI rcvr2050 may be a high-definition multimedia interface which is a non-compression digital video/audio interface standard. The HDMI rcvr2050 may provide an interface between the Set-Top Box rcvr2030 and an AV apparatus, that is, the audio decoder rcvr2140 and the video decoder rcvr2150.

The ACR module rcvr2130 may automatically recognize broadcast content from the audio decoder rcvr2140 and the video decoder rcvr2150. Based on the currently recognized content, a query may be sent to the ACR server via the trigger module rcvr2080 and the network interface rcvr2110 to receive the TPT/AMT for the trigger.

Figure 42:
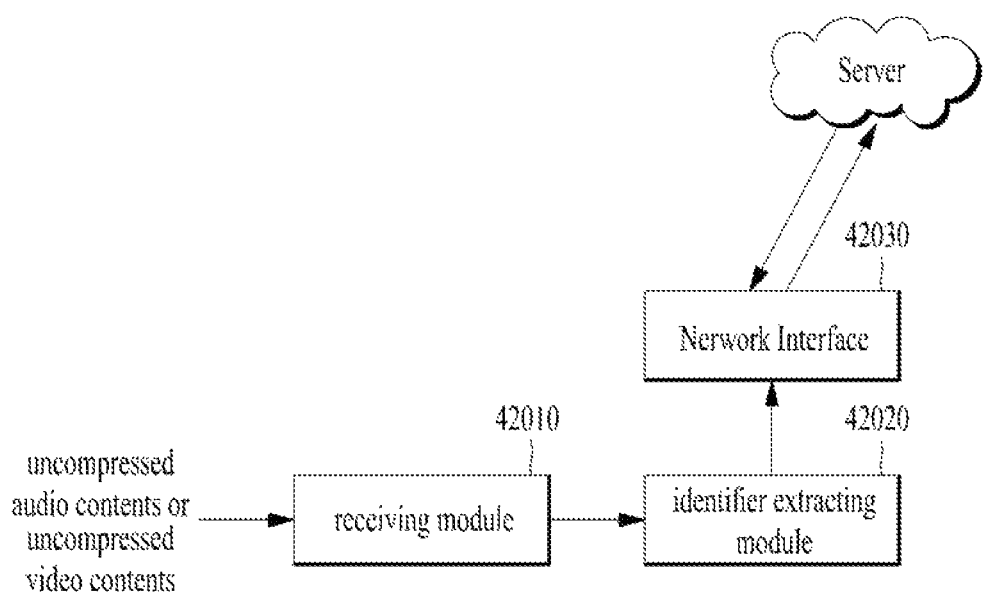
FIG. 42 is a diagram showing an embodiment of an apparatus for processing an interactive service in an event driven model.

FIG. 42 is a diagram showing an embodiment of an apparatus for processing an interactive service in an event driven model.

An embodiment of the apparatus for processing an interactive service in an event driven model according to the present invention may include a receiving module 42010, an identifier extraction module 42020 and/or a network interface 42030.

The receiving module 42010 receives uncompressed audio content or uncompressed video content from an external decoding unit.

The external decoding unit may be the above-described STB.

The uncompressed audio content or uncompressed video content may be audio/video content transmitted from the above-described STB (external decoding unit) to a receiver.

Here, the receiving module 42010 may correspond to the HDMI of FIG. 41. The receiving module 42010 may be a module that is not shown in FIG. 40 or FIG. 41. The receiving module 42010 may be modified by the designer.

The external decoding unit may decompress A/V content received from an MVPD or the like and deliver the decompressed A/V content to the receiving module 42010. The uncompressed audio content or uncompressed video content may have been processed according to the above-mentioned ACR ingest module. That is, the ACR ingest module can compute signatures (fingerprints) of frames, in the case of a fingerprinting ACR system, or insert watermarks including codes into frames, in the case of a watermarking ACR system that is based on codes. Here, frames may relate to audio/video content before being decoded/decompressed by the STB. The ACR ingest module can store in the database the media_time of each frame associated with a signature or code, together with other metadata.

The identifier extraction module 42020 periodically extracts identifiers from a plurality of frames of the uncompressed audio content or uncompressed video content received by the receiving module 42010.

An identifier may identify a frame of the received content. The identifier may be a fingerprint signature or a watermark code. The present embodiment is not limited to fingerprinting or watermarking.

Here, 'extracting' is a process of periodically extracting identifiers from a plurality of frames of the received uncompressed audio content or uncompressed video content and may correspond to the above-described 'computing the signature', 'extracting the watermark' and 'generating the signature'.

The identifier extraction module 42020 periodically extracts an identifier corresponding to a single frame. Extracted identifiers may be sent to the ACR server, as described above. The ACR server may match the received identifiers with records in a database, as described above. The ACR server and the database may be the above-described ACR server and database. The records in the database may be records previously stored by the ACR ingest module.

The identifier extraction module 42020 may correspond to the ACR module of FIG. 41. Otherwise, the identifier extraction module 42020 may be a module that is not shown in FIG. 40 or FIG. 41. The receiving module 42020 may be modified by the designer.

In the embodiment of the present invention, an identifier extraction cycle may be 5 seconds. The identifier extraction cycle may be changed according to intention of the designer.

The network interface 42030 sends requests including the extracted identifiers to the server and receives a trigger from the server according to whether or not the requests and identifiers sent to the server match records in the database or triggers present in matched records. Here, the network interface 42030 may receive a trigger based on a request.

The network interface 42030 may correspond to the network interface of FIG. 41. Otherwise, the network interface

42030 is a module that is not shown in FIG. 40 or FIG. 41. The network interface 42030 may be modified by the designer.

The extracted identifiers may be fingerprint signatures or watermark codes. The present embodiment is not limited to fingerprinting or watermarking.

Here, a request may include an identifier. The network interface 42030 may periodically transmit a request to the server. A single request may include a single identifier. A period may be changed by the designer.

The server may be the above-described ACR server. The server may receive a request and match the request with records in a database. The ACR server and database may be the above-mentioned ACR server and database. The records in the database may be records previously stored by the ACR ingest module.

The network interface 42030 does not receive a response in any case for the above-described requests. The network interface 42030 can receive the trigger when a new segment is detected or when an event activation needs to be communicated to the apparatus. In other cases, the apparatus may not receive the trigger. However, the apparatus may receive the trigger in cases other than the above-mentioned case according to intention of the designer.

Here, the segment may be the above-described interactive service segment.

The new segment may refer to a segment to be used after the current application parameter table or TPT.

Here, communication of an event activation to the receiver may mean a case in which event activation is scheduled or a case in which an event that needs to be activated is not activated yet.

The trigger may relate to the content received by the receiving module 42010 from the STB.

The content may be the content received from the STB.

Here, the trigger can indicate the current time of the content and reference a particular interactive event in an application parameter table or signal that the event is to be executed now or at a specified time in the future.

Here, the application parameter table can include information about at least one application.

The server may be the above-described ACR server. The database may be the above-described database. The identifiers may be fingerprint signatures or watermark codes. The present embodiment is not limited to fingerprinting or watermarking.

The server may match the received requests/identifiers with records in the database. The requests/identifiers may be matched to records previously stored in the database by the ACR ingest module. When an identifier is matched to an identifier stored in the database, the server may receive the record related to the identifier from the database. In this case, the record may include a time based trigger or an activation trigger. Which trigger is included in the record may depend upon which trigger is previously inserted into the record by the ACR ingest module. Upon receipt of the record from the database, the server may send the received trigger or triggers to the network interface 39030.

In the embodiment of the present invention, the trigger can be a time based trigger when the identifier corresponds to the new segment, and the time based trigger can be used to enable the receiver to obtain a new application parameter table associated with the new segment. The time based trigger may conform to the above-described time based trigger operation.

In the embodiment of the present invention, the trigger can be an activation trigger whenever the event is due to be activated, and the activation trigger sets an activation time for the event. The activation trigger may conform to the above-described activation trigger operation. The activation trigger may be applied to an event of an application to cause activation at a specific time. A viewer can be provided with an interactive service through event activation. In the case of activation trigger delivery according to an embodiment of the present invention, an interactive server can be provided in the above-described ACR environments, that is, when the receiver has Internet connections and access to uncompressed audio and video from a broadcast stream.

In the embodiment of the present invention, the activation trigger can be applied once, when the apparatus receives more than one activation trigger for same event activation. As described above, the apparatus can receive a plurality of activation triggers for the same event activation. According to an embodiment of the present invention, identifiers may be periodically extracted and transmitted to the server. Here, a plurality of activation triggers can be received as responses to periodic requests. In this case, the activation triggers have the same "t=" term and thus the apparatus can recognize that the activation triggers are duplicates and apply only one activation trigger, as described above.

In the embodiment of the present invention, the activation trigger can be received ahead of the time when the receiver needs to apply the activation trigger. By doing so, the event can be activated at the correct activation time. This embodiment may correspond to the above-described static activation.

In the embodiment of the present invention, the event can be activated immediately upon receipt of the activation trigger or when the activation trigger is received after the activation time. This embodiment may correspond to the above-described dynamic activation. When the server recognizes the activation late such that the server cannot transmit the activation trigger to the apparatus, the server can wait for the next request of the apparatus and then send the activation trigger as a response to the next request. In this case, the activation trigger may indicate a past activation time. Here, the apparatus can apply the activation trigger as soon as the apparatus receives the activation trigger.

In the embodiment of the present invention, the network interface 42030 is further configured to download a new application parameter table immediately, unless the apparatus has already retrieved the new application parameter table using URL information delivered with the application parameter table, when the trigger includes an application parameter table identifier which identifies the new application parameter table. As described above, when the apparatus receives a trigger having a new application parameter table identifier, the apparatus can obtain new information in provision of an interactive service with respect to a related segment by downloading the new application parameter table (e.g. TPT). In an embodiment of the present invention, the apparatus can request an application parameter table server to provide a new application parameter table using the http protocol and download the new application parameter table. Here, the application parameter table may be in XML or binary format according to an embodiment of the present invention. The application parameter table identifier may be the above-described locator_part. Here, the URL information may be the above-described URLList.

In the embodiment of the present invention, the time can be a media time, and the media time can be a parameter referencing a point in the playout of a content item.

In the embodiment of the present invention, the application is a Declarative Object, a Triggered Declarative Object, a Non-Real Time Declarative Object or an Unbound Declarative Object.

In the embodiment of the present invention, a communication session may be closed unless a request and a response are transmitted and received. The communications session is not kept open between request instances. The receiver may receive a response through a communication session when the communication session is kept open.

In the embodiment of the present invention, the server instead of the receiver may send a message first. That is, it is possible for the server (e.g., ACR server) to transmit messages to the client (e.g., apparatus) at any time.

In the embodiment of the present invention, the server may not need extra intelligence. The server may merely deliver information from the database to the network interface 42030. The ACR ingest module may take charge of intelligence with respect to operation of the present invention.

Embodiments respectively described with reference to figures may be combined to implement a new embodiment. In addition, those skilled in the art can design recording media which are readable by a computer storing programs for executing the above-described embodiments without departing from the scope of the present invention.

The apparatus and method according to the present invention are not limited to the above-described embodiments and the embodiments can be selectively combined and modified in various manners.

The method of processing an interactive service related to broadcast programs to which the present invention is applied may be implemented as codes that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave, e.g., data transmission through the Internet. In addition, codes, which are distributed in computer devices connected over a network and can be read by a computer in a distributed manner, are stored and executed in the computer-readable recording medium.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Both apparatus and method inventions are mentioned in this specification and descriptions of both of the apparatus and method inventions may be complementarily applicable to each other.

Various embodiments have been described in the best mode for carrying out the invention.

The present invention is available to a series of broadcast service provision fields.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device for processing an interactive service, the display device comprising:
    a receiving module to receive an uncompressed audio content or an uncompressed video content from an external decoding unit;
    a signature extraction module to extract signatures from frames of the received content;
    a network interface to send the extracted signatures to an ACR (Auto Content Recognition) server, to be checked against a database of signatures of frames in order to recognize the frames represented by the signatures, wherein the frames represented by the signatures are identified by the ACR server,
    wherein the network interface receives a time base trigger from the ACR server, wherein the type of trigger is decided by the ACR server based on the frames represented by the signatures,
    wherein the time base trigger establishes a time base for activations of events, wherein the time base is synchronized with the frames,
    wherein the network interface retrieves an application parameter table using information in the time base trigger,
    wherein the application parameter table includes information about at least one of applications,
    wherein the information about at least one of applications include first IDs (identifiers) identifying each of the applications, and information about at least one of the events,
    wherein the information about at least one of the events include second IDs identifying each of the events, and information about at least one of data to be used for the corresponding event,
    wherein the information about at least one of data include third IDs identifying each of the data,
    wherein the network interface receives an activation message table along with the application parameter table,
        wherein the activation message table includes activation messages for activating the events at activation times relative to the established time base,
        wherein each of the activation messages include first attributes, second attributes, third attributes and timing information,
        wherein the first attribute matches the first ID to identify the application targeted by the activation message,
        wherein the second attribute matches the second ID to identify the event targeted by the activation message,
        wherein the timing information indicates start of time period for the event targeted by the activation message, and wherein the third attribute matches the third ID to identify the data to be used for the event targeted by the activation message;
    a display module to output supplementary information related to the content;
    an user interface (UI) module to receive signal, related to the supplementary information through a remote controller; and
    a web browser module to receive a browser key code from the UI module and the remote controller,
        wherein when the supplementary information is related to a service using a network, the browser key code is delivered to a web browser, and
        wherein when the supplementary information is related to a currently displayed video, signal corresponding to the currently displayed video is delivered to the display module.

2. The display device of claim 1, wherein the network interface to further receive an activation message table along with the application parameter table,
> wherein the activation message table includes activation messages for activating the events at activation times relative to the established time base.

3. The display device of claim 2, wherein each of the activation messages include first attributes, second attributes and timing information,
> wherein the first attribute matches the first ID to identify the application targeted by the activation message,
> wherein the second attribute matches the second ID to identify the event targeted by the activation message, and
> wherein the timing information indicates start of time period for the event targeted by the activation message.

4. The display device of claim 3, wherein the application parameter table further includes third IDs identifying data to be used for the event,
> wherein the activation message further includes third attributes, and
> wherein the third attribute matches the third ID to identify data to be associated with the event targeted by the activation message.

5. The display device of claim 1, wherein the time is a media time,
> wherein the media time is a parameter referencing a point in the playout of a content item.

6. The display device of claim 1, wherein the application is a Declarative Object, a Triggered Declarative Object, a Non-Real Time Declarative Object or an Unbound Declarative Object.

7. The display device of claim 1, the display device further comprising:
> an automatic content recognition (ACR) module to automatically recognize broadcast content from an audio decoder and/or a video decoder included in the display device.

8. The display device of claim 1, the display device further comprising a web browser to access the network through the network interface based on the signal related to the supplementary information.

9. The display device of claim 1, further comprising a caption module to process caption text and transmit the processed caption text to a graphic processor for displaying the processed caption text.

10. The display device of claim 1, wherein the supplementary information includes information related to broadcast content to be displayed when the supplementary information is available based on the broadcast content.

11. A method of processing an interactive service in a display device, the method comprising:
> receiving by a receiving module an uncompressed audio content or an uncompressed video content from a tuner or a setup box;
> extracting by a signature extraction module signatures from frames of the received content;
> sending requests containing the signatures of the frames to an ACR (Auto Content Recognition) server to identify the uncompressed content, wherein the frames represented by the signatures are identified by the ACR server by being checked against a database of signatures of frames;
> receiving by the network interface a time base trigger for the content from the ACR server, wherein the types of the triggers are decided by the ACR server based on the frames represented by the signatures; wherein the time base trigger establishes a time base for activations of events, wherein the time base is synchronized with the frames;
> retrieving by the network interface an application parameter table using information in the time base trigger,
> wherein the application parameter table includes information about at least one of applications,
> wherein the information about at least one of applications include first IDs (identifiers) identifying each of the applications, and information about at least one of the events,
> wherein the information about at least one of the events include second IDs identifying each of the events, and information about at least one of data to be used for the corresponding event,
> wherein the information about at least one of data include third IDs identifying each of the data,
> wherein the retrieving an application parameter table further includes,
>> receiving an activation message table along with the application parameter table,
>> wherein the activation message table includes activation messages for activating the events at activation times relative to the established time base, wherein each of the activation messages include first attributes, second attributes, third attributes and timing information,
>> wherein the first attribute matches the first ID to identify the application targeted by the activation message,
>> wherein the second attribute matches the second ID to identify the event targeted by the activation message,
>> wherein the timing information indicates start of time period for the event targeted by the activation message, and
>> wherein the third attribute matches the third ID to identify the data to be used for the event targeted by the activation message;
> displaying by a display module supplementary information related to the content;
> receiving by a user interface (UI) module signal related to the supplementary information through a remote controller; and
> receiving by a web browser module a browser key code from the UI module and the remote controller,
> wherein when the supplementary information is related to a service using a network, the browser key code is delivered to a web browser, and
> wherein when the supplementary information is related to a currently displayed video, signal corresponding to the currently displayed video is delivered to the display module.

12. The method of claim 11, wherein the retrieving an application parameter table further includes receiving an activation message table along with the application parameter table, wherein the activation message table includes activation messages for activating the events at activation times relative to the established time base.

13. The method of claim 12, wherein each of the activation message include first attributes, second attributes and timing information,
> wherein the first attribute matches the first ID to identify the application targeted by the activation message,
> wherein the second attribute matches the second ID to identify the event targeted by the activation message, and
> wherein the timing information indicates start of time period for the event targeted by the activation message.

14. The method of claim 13, wherein the application parameter table further includes third IDs identifying data to be used for the event, wherein the activation message further includes third attributes, and wherein the third attribute matches the third ID to identify data to be associated with the event targeted by the activation message.

15. The method of claim 11, wherein the time is a media time, wherein the media time is a parameter referencing a point in the playout of a content item.

16. The method of claim 11, wherein the application is a Declarative Object, a Triggered Declarative Object, a Non-Real Time Declarative Object or an Unbound Declarative Object.

17. The method of claim 11, wherein an automatic content recognition (ACR) module automatically recognizes broadcast content from an audio decoder and/or a video decoder included in the display device.

18. The method of claim 11, the method further comprising:

accessing by a web browser the network through the network interface based on the signal related to the supplementary information.

19. The method of claim 11, wherein a caption module processes caption text and transmit the processed caption text to a graphic processor for displaying the processed caption text.

20. The method of claim 11, wherein the supplementary information includes information related to broadcast content to be displayed when the supplementary information is available based on the broadcast content.

* * * * *